US009533526B1

(12) United States Patent
Nevins

(10) Patent No.: US 9,533,526 B1
(45) Date of Patent: Jan. 3, 2017

(54) GAME OBJECT ADVANCES FOR THE 3D PRINTING ENTERTAINMENT INDUSTRY

(71) Applicant: Joel Nevins, Vero Beach, FL (US)

(72) Inventor: Joel Nevins, Vero Beach, FL (US)

( * ) Notice: Subject to any disclaimer, the term of this patent is extended or adjusted under 35 U.S.C. 154(b) by 606 days.

(21) Appl. No.: 13/903,562

(22) Filed: May 28, 2013

Related U.S. Application Data

(60) Provisional application No. 61/690,040, filed on Jun. 15, 2012, provisional application No. 61/795,842, filed on Oct. 27, 2012, provisional application No. 61/807,199, filed on Apr. 1, 2013, provisional application No. 61/816,370, filed on Apr. 26, 2013.

(51) Int. Cl.
G06F 19/00 (2011.01)
B42D 15/00 (2006.01)
G06F 17/50 (2006.01)

(52) U.S. Cl.
CPC .............. *B42D 15/00* (2013.01); *G06F 17/50* (2013.01)

(58) Field of Classification Search
None
See application file for complete search history.

(56) References Cited

U.S. PATENT DOCUMENTS

| | | |
|---|---|---|
| 2,886,325 A | 5/1959 | Long |
| 3,677,399 A | 7/1972 | Tatar |
| 3,822,901 A | 7/1974 | Seidman |
| 4,140,317 A | 2/1979 | Ramney |
| 4,512,581 A | 4/1985 | Levine |
| 4,575,087 A | 3/1986 | Sinclair |
| 4,612,220 A | 9/1986 | Baxter |
| 4,840,275 A | 6/1989 | Faiola |
| 4,951,404 A | 8/1990 | Lithwick |
| 5,098,327 A | 3/1992 | Ferrero |
| 5,133,496 A | 7/1992 | Davidson |
| 5,156,698 A * | 10/1992 | Roberts ..................... A63F 9/10 156/108 |
| 5,173,220 A | 12/1992 | Reiff |

(Continued)

OTHER PUBLICATIONS

Roger Highfield, Can Reindeer Fly?, published1998-2004, pp. 288-289, Phoenix/Orion Books, London, UK.

(Continued)

*Primary Examiner* — Kenny Lin

(57) ABSTRACT

Embodiments describe constructing game-related objects through additive manufacturing systems. At least one construction configuration for building a game-related object is advanced at least partly due to at least one game task result being attained by a user and/or due to when an object is constructed and/or arranged to be built. Several embodiments demonstrate select game task results leading to determined construction configurations instead of alternative construction configurations, causing, for instance, a differing design, complexity, function, and/or number of constructed object portions. Game task results in certain embodiments lead to multiple distinct portions of one or more objects being constructed concurrently and/or successively, at one or more locations. Selected methods and systems disclose objects constructed as awards, puzzles, other assembly challenges, educational challenges, wagering elements, electronic game elements, in multiple inseparable portions, and/or for other entertainment purposes.

74 Claims, 37 Drawing Sheets

(56) References Cited

U.S. PATENT DOCUMENTS

| | | | | |
|---|---|---|---|---|
| 5,232,088 | A * | 8/1993 | Leondidis | A63F 9/1044 206/223 |
| 5,243,174 | A | 9/1993 | Veeneman | |
| 5,261,703 | A | 11/1993 | Lenkoff | |
| 5,316,345 | A | 5/1994 | Madison | |
| 5,354,097 | A | 10/1994 | Tel | |
| 5,407,076 | A | 4/1995 | Sabet | |
| 5,510,066 | A | 4/1996 | Fink | |
| 5,513,117 | A | 4/1996 | Small | |
| 5,683,112 | A | 11/1997 | McQueeny | |
| 5,728,414 | A | 3/1998 | Terrasi | |
| 5,807,437 | A | 9/1998 | Sachs | |
| 5,815,964 | A | 10/1998 | Douglas | |
| 5,852,889 | A | 12/1998 | Rinaldi | |
| 5,864,972 | A | 2/1999 | Gamache | |
| 5,915,734 | A | 6/1999 | Minehart | |
| 5,965,079 | A | 10/1999 | Manners | |
| 6,062,978 | A | 5/2000 | Martino | |
| 6,146,567 | A | 11/2000 | Sachs | |
| 6,162,476 | A | 12/2000 | Shorin | |
| 6,175,823 | B1 | 1/2001 | Van Dusen | |
| 6,325,292 | B1 | 12/2001 | Sehr | |
| 6,336,631 | B1 * | 1/2002 | Volkert | A63F 9/10 273/157 A |
| 6,401,002 | B1 | 6/2002 | Jang | |
| 6,405,095 | B1 | 6/2002 | Jang | |
| 6,453,300 | B2 | 9/2002 | Simpson | |
| 6,493,970 | B1 | 12/2002 | McCarthy | |
| 6,550,617 | B1 | 4/2003 | Elva | |
| 6,574,523 | B1 | 6/2003 | Hanna | |
| 6,585,927 | B2 | 7/2003 | Grigg | |
| 6,588,129 | B1 | 7/2003 | Holland | |
| 6,594,644 | B1 | 7/2003 | Van Dusen | |
| 6,685,186 | B2 | 2/2004 | Wilson | |
| 6,703,105 | B2 | 3/2004 | Grigg | |
| 6,776,340 | B2 | 8/2004 | Murokh | |
| 6,813,594 | B2 | 11/2004 | Guertin | |
| 6,817,122 | B1 | 11/2004 | Bokis | |
| 7,024,807 | B2 | 4/2006 | Street | |
| 7,130,817 | B2 | 10/2006 | Karas | |
| 7,159,866 | B2 | 1/2007 | Selph | |
| 7,216,092 | B1 | 5/2007 | Weber | |
| 7,266,533 | B2 | 9/2007 | Karas | |
| 7,275,683 | B2 | 10/2007 | Lazarowicz | |
| 7,314,179 | B1 | 1/2008 | Halbur | |
| 7,370,076 | B2 | 5/2008 | Friedman | |
| 7,427,066 | B1 | 9/2008 | Goodwin | |
| 7,438,224 | B1 | 10/2008 | Jensen | |
| 7,478,143 | B1 | 1/2009 | Friedman | |
| 7,506,872 | B2 | 3/2009 | Uzuanis | |
| 7,512,552 | B2 | 3/2009 | Karas | |
| 7,591,418 | B2 | 9/2009 | Halbur | |
| 7,614,548 | B2 | 11/2009 | Schultz | |
| 7,658,993 | B2 | 2/2010 | Dronzek | |
| 7,687,271 | B2 | 3/2010 | Gelbart | |
| 7,734,719 | B2 | 6/2010 | Friedman | |
| 7,748,607 | B2 | 7/2010 | Borkowski | |
| 7,766,222 | B2 | 8/2010 | Halbur | |
| 7,789,297 | B2 | 9/2010 | Birkeland | |
| 7,810,719 | B2 | 10/2010 | Clegg | |
| 7,819,403 | B2 | 10/2010 | Andre | |
| 7,883,004 | B2 | 2/2011 | Halbur | |
| 7,891,122 | B2 | 2/2011 | Lauer | |
| 7,900,827 | B2 | 3/2011 | Albers | |
| 7,917,243 | B2 | 3/2011 | Kozlak | |
| 7,918,391 | B2 | 4/2011 | Clegg | |
| 7,959,025 | B2 | 6/2011 | Salice | |
| 7,959,068 | B2 | 6/2011 | Halbur | |
| 8,005,756 | B2 | 8/2011 | Phillips | |
| 8,016,193 | B2 | 9/2011 | Haugen | |
| 8,024,876 | B2 | 9/2011 | Bettin | |
| 8,047,425 | B2 | 11/2011 | Holt | |
| 8,061,619 | B2 | 11/2011 | Halbur | |
| 8,070,054 | B2 | 12/2011 | Halbur | |
| 8,070,473 | B2 | 12/2011 | Kozlak | |
| 8,086,494 | B2 | 12/2011 | Dooley | |
| 8,091,781 | B2 | 1/2012 | Albrecht | |
| 8,096,467 | B2 | 1/2012 | Clegg | |
| 8,152,058 | B2 | 4/2012 | Halbur | |
| 8,186,599 | B2 | 5/2012 | Fleischer | |
| 8,321,782 | B1 * | 11/2012 | Broucek | A63F 13/12 273/153 R |
| 8,412,588 | B1 * | 4/2013 | Bodell | G06Q 10/06 700/119 |
| 2002/0092214 | A1 | 7/2002 | Girdler | |
| 2003/0047350 | A1 | 3/2003 | Forbes | |
| 2003/0232636 | A1 | 12/2003 | Ionescu | |
| 2004/0088893 | A1 | 5/2004 | Mahoney | |
| 2004/0159978 | A1 | 8/2004 | Nielsen | |
| 2004/0195766 | A1 * | 10/2004 | Selph | A63F 9/0613 273/153 R |
| 2004/0249748 | A1 | 12/2004 | Schultz | |
| 2005/0093232 | A1 * | 5/2005 | Stout | A63F 9/10 273/153 R |
| 2005/0230460 | A1 | 10/2005 | Ristau | |
| 2006/0052892 | A1 * | 3/2006 | Matsushima | G06F 17/50 700/98 |
| 2006/0157554 | A1 | 7/2006 | Halbur | |
| 2006/0188145 | A1 * | 8/2006 | Song | G06Q 30/00 382/154 |
| 2006/0271462 | A1 | 11/2006 | Harmon | |
| 2007/0023531 | A1 | 2/2007 | Halbur | |
| 2007/0071902 | A1 | 3/2007 | Dietrich | |
| 2007/0276808 | A1 | 11/2007 | McGushion | |
| 2007/0282697 | A1 | 12/2007 | Kirby | |
| 2008/0006966 | A1 | 1/2008 | Mannella | |
| 2008/0084026 | A1 * | 4/2008 | Duncan | A63F 9/10 273/157 R |
| 2008/0111816 | A1 * | 5/2008 | Abraham | G06Q 30/06 345/420 |
| 2008/0249657 | A1 | 10/2008 | Wendland | |
| 2009/0008875 | A1 | 1/2009 | Wu | |
| 2009/0108163 | A1 | 4/2009 | Child | |
| 2009/0140042 | A1 | 6/2009 | Clegg | |
| 2009/0173443 | A1 | 7/2009 | Kozlak | |
| 2009/0254453 | A1 | 10/2009 | Sanguinetti | |
| 2009/0308920 | A1 | 12/2009 | Holt | |
| 2010/0049632 | A1 * | 2/2010 | Friedman | G06Q 30/0601 705/26.1 |
| 2010/0223655 | A1 | 9/2010 | Zheng | |
| 2011/0016757 | A1 | 1/2011 | Beckett | |
| 2011/0106697 | A1 | 5/2011 | Roberts | |
| 2011/0117268 | A1 | 5/2011 | Batchelder | |
| 2011/0148040 | A1 | 6/2011 | Bianco | |
| 2011/0174876 | A1 | 7/2011 | Clegg | |
| 2011/0257941 | A1 * | 10/2011 | Magro | G06F 17/5004 703/1 |
| 2011/0313878 | A1 * | 12/2011 | Norman | G06Q 30/0621 705/26.5 |
| 2012/0025462 | A1 * | 2/2012 | Knowlton | A63F 9/10 273/157 R |

OTHER PUBLICATIONS www.ponoko.com/design-your-own/products/cube-lock-pl-1051, 3 pages printed from website on Apr. 27, 2012, published by ponoko.com, Oakland, CA, US, and Wellington, New Zealand.

* cited by examiner

FIG. 5

Detect through at least one computer processor (120) the activating of at least one input interface (110) to transfer data from at least one computer storage medium (130) to construct an object unknown to the receiving party on the receiving party's additive manufacturing machinery (150).

Perform a computerized operation responsive to detecting the activating of at least one input interface (110), the operation directing the at least one processor (120) to retrieve from the at least one computer storage medium (130) data to be transferred to the receiving party's additive manufacturing machinery (150).

Constructing the object utilizing the receiving party's additive manufacturing machinery (150), the construction process revealing the object to the receiving party.

FIG. 25A
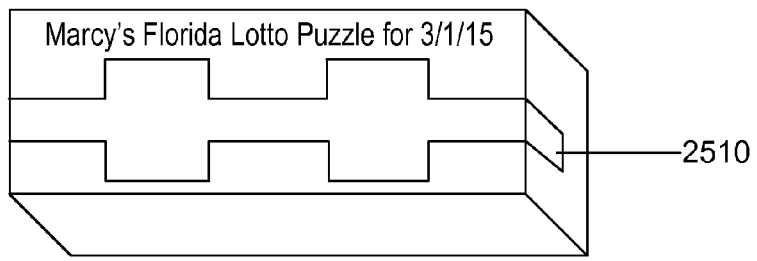
FIG. 25B
FIG. 26A
| 7 | | Drawing at 11pm. |
|---|---|---|
| Sara's | Megaball | Numbers |
| | 5      0 | 1 |
FIG. 26B
| 3 | 5      0 | 6 |
|---|---|---|
| 2 | 3  Good Luck, Sara!  3 | 1 |
| 1 | 2      5 | 7 |

FIG. 30
FIG. 31
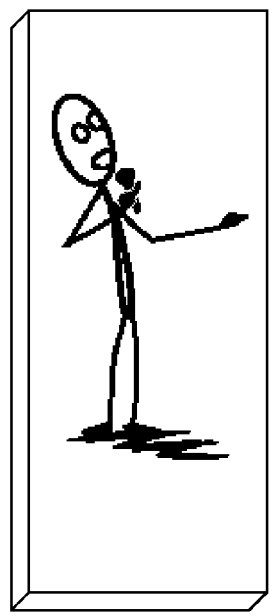
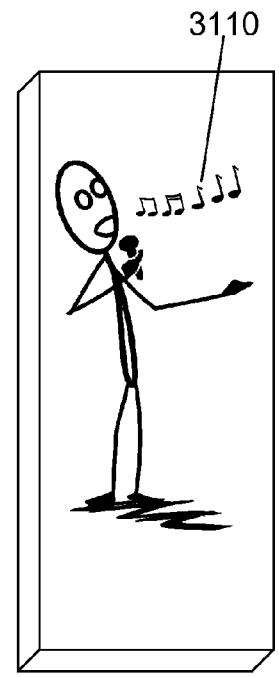
3110
FIG. 32
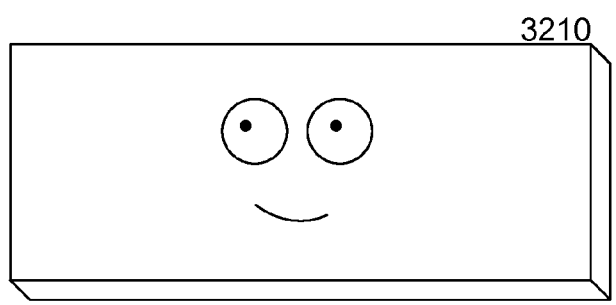
3210
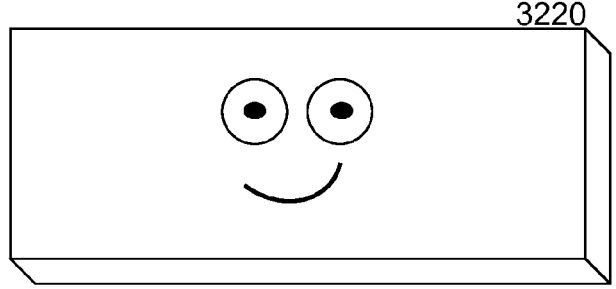
3220

FIG. 40

Detect through at least one computer processor (120) the activating of at least one input interface (110) to transfer data from at least one computer storage medium (130) to construct an object at least partially unknown to the customer on a business establishment's additive manufacturing machinery (150).

Perform a computerized operation responsive to detecting the activating of at least one input interface (110), the operation directing the at least one processor (120) to retrieve from the at least one computer storage medium (130) data for utilization by the business establishment's additive manufacturing machinery (150).

Constructing the object utilizing the business establishment's additive manufacturing machinery (150) and the retrieved data, the construction process revealing the object to the customer.

Optionally, the additive manufacturing object constructed further comprises at least one of the following:

- A toy;
- A fashion accessory accompanying a fashion purchase;
- A result of the customer's purchase of at least one product and/or service;
- A free or subsidized benefit for the customer.

FIG. 46
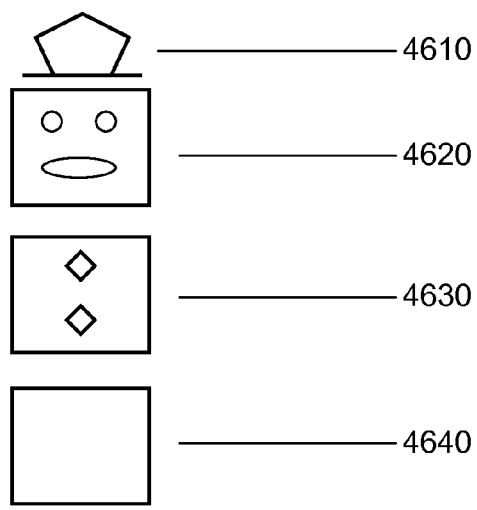
— 4610
— 4620
— 4630
— 4640
FIG. 47
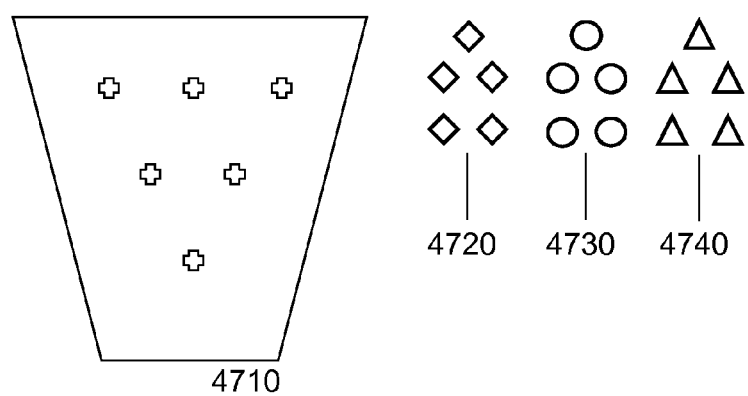
4720  4730  4740
4710
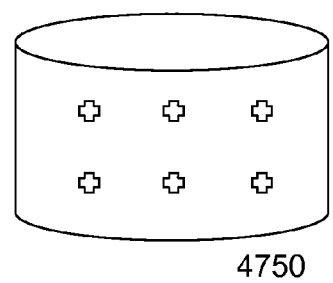
4750

FIG. 52

Detect through at least one computer processor (120) the activating of at least one input interface (110) to transfer data from at least one computer storage medium (130) to construct at least a first portion of an object in coordination with a media presentation on a receiving party's additive manufacturing machinery (150).

Perform a computerized operation responsive to detecting the activating of at least one input interface (110), the operation directing the at least one computer processor (120) to retrieve from at least one computer storage medium (130) data to be transferred to the receiving party's additive manufacturing machinery (150).

Constructing the at least a first portion of the object utilizing the receiving party's additive manufacturing machinery (150), the at least a first portion constructed during at least one predetermined period to coordinate with instructions provided by the media presentation, wherein at least one input interface (110) further serves to at least partially automate the construction process.

Optionally further constructing one or more additional portions of the object utilizing the receiving party's additive manufacturing machinery (150), the one or more additional portions similarly constructed during at least one predetermined period to coordinate with instructions provided by the media presentation.

Prior to the at least partially automated construction of one or more object portions, optionally allowing the receiving party to take at least one of the following actions:

- Authorize a construction;
- Decline a construction;
- Choose a construction;
- Substitute a construction;
- Customize a construction.

Detect through at least one computer processor (120) the activating of at least one input interface (110) to transfer data from at least one computer storage medium (130) to construct via an additive manufacturing system (100) an object that includes at least one expandable component.

↓

Perform a computerized operation responsive to detecting the activating of at least one input interface (110), the operation directing the processing unit (120) to retrieve from computer storage medium (130) data to be transferred to the additive manufacturing system (100) to initiate the construction of the expandable object..

↓

Constructing the object utilizing the additive manufacturing system (100), the object's at least one expandable component optionally constructed in the unexpanded position, the construction process further incorporating at least one of the following procedures:

- Enabling the at least one expandable component to cool, strengthen, and/or otherwise cure, independently and/or through at least one curing component associated with the additive manufacturing system (100).

- Expanding the at least one expandable component utilizing at least one component associated with the additive manufacturing system (100), and optionally attaching the at least one expandable component to at least one comparatively rigid component also constructed at least in part by the additive manufacturing system (100).

- For expandable objects that are inflatable, leaving open at least one aperture for inserting air, helium, and/or other content to generate an inflatable environment, wherein the at least one aperture optionally includes at least one valve. Then optionally inserting air, helium, and/or other content into the inflatable object through one or more apertures, the content inserted manually and/or by utilizing at least one component associated with the additive manufacturing system (100). Then optionally continuing construction of the inflatable object utilizing the additive manufacturing system (100), the optional additional construction activated to finish sealing the object.

FIG. 56

Detect through at least one computer processor (120) the activating of at least one input interface (110) to transfer data from at least one computer storage medium (130) to construct one or more three-dimensional interior structures within a main three-dimensional object to be built on the receiving party's additive manufacturing machinery (150).

Perform a computerized operation responsive to detecting the activating of at least one input interface (110), the operation directing the processing unit (120) to retrieve from computer storage medium (130) data to be transferred to the receiving party's additive manufacturing machinery (150).

Constructing the one or more three-dimensional interior structures within the unfinished main three-dimensional object under construction utilizing the receiving party's additive manufacturing machinery (150), wherein if *multiple* three-dimensional interior structures are optionally constructed those multiple interior structures are constructed successively and/or concurrently primarily within the space of the main unfinished three-dimensional object.

Further constructing the main three-dimensional object utilizing the receiving party's additive manufacturing machinery (150), the final construction of the main three-dimensional object leading to the partial and/or complete concealment of the one or more three-dimensional interior structures.

FIG. 57

Detect through at least one computer processor (120) the activating of at least one input interface (110) by at least one sending party to transfer data from at least one computer storage medium (130) to construct at least one object at least partly unknown to that at least one sending party on at least one receiving party's additive manufacturing machinery (150).

Perform a computerized operation responsive to detecting the activating of the at least one input interface (110), the operation directing the at least one processing unit (120) to retrieve from computer storage medium (130) data to be transferred to the at least one receiving party's additive manufacturing machinery (150).

Constructing the at least one object utilizing the at least one receiving party's additive manufacturing machinery (150), the at least one object at least partially unknown to the at least one sender, the construction process optionally leading to at least one of the following outcomes:

- A revealing of information about the object to one or more sending parties during and/or following construction in an automated and/or manual manner.
- Constructing on the at least one receiving party's machinery (150) at least one object and/or object portion that is designed to be joined to and/or operated with at least one object and/or object portion constructed by the at least one sending party on the at least one sending party's own system(s) (e.g., similar to 100).
- Constructing on the at least one receiving party's machinery (150) at least one object and/or object portion that is designed to access, and/or be accessed by, at least one other object and/or object portion constructed by the at least one sending party on the at least one sending party's own system(s) (e.g., similar to 100).
- Enabling at least one third-party to select the at least one object to be constructed on the at least one receiving party's machinery (150) and further optionally enabling that at least one third-party to select at least one related object to be constructed on the at least one sending party's system(s) (e.g., similar to 100), wherein the at least one related optional object constructed by the sending party is configured to be joined to the at least one object constructed by the receiving party.

GAME OBJECT ADVANCES FOR THE 3D PRINTING ENTERTAINMENT INDUSTRY

CROSS-REFERENCE TO RELATED APPLICATIONS

The current patent application claims the benefit of this inventor's initial provisional patent application U.S. 61/690,040, filed on Jun. 15, 2012, and identically titled "Advances Associated with the Construction and Delivery of Additive Manufacturing Objects." The current application further claims the benefit of this inventor's following three additional provisional patent applications: U.S. 61/795,842, filed on Oct. 27, 2012; U.S. 61/807,199, filed on Apr. 1, 2013; and U.S. 61/816,370, filed on Apr. 26, 2013.

FEDERALLY SPONSORED RESEARCH

Not applicable.

SEQUENCE LISTING OR PROGRAM

Not applicable.

BACKGROUND

Field

This application relates to the construction and delivery of objects in the emerging field of additive manufacturing.

Background of the Invention

The field of additive manufacturing—often referred to as "3D printing," "direct digital manufacturing," and "rapid manufacturing"—is poised for enormous growth in the coming decades.

Fulfilling the promise of "replicators" envisioned long ago in the science fiction realm, additive manufacturing devices utilize computerized files (e.g., computer-aided design files or, simply, "CAD files") to design and help build objects through one or more additive layering techniques.

Yet most innovations in the field to date have centered on advances in construction methods for use by professional manufacturers.

Among several interesting and relevant developments in the field, in U.S. Pat. No. 6,401,002, Jang teaches utilizing both liquid-based and powder-based build technologies to construct one or more objects. Jang's "multiple channel" process speeds manufacturing, permits the manufacture of colorful objects, and allows for an object to be created in a plurality of segments.

In U.S. 2011/0117268, Batchelder of Stratasys, Inc., a leading producer of additive manufacturing equipment, discloses encoding the exterior of build materials with markings able to be read by sensors. The markings are intended to identify material colors, material composition, and the level of remaining materials.

U.S. Pat. No. 5,173,220 (Reiff), U.S. Pat. No. 7,917,243 (Kozlak), U.S. Pat. No. 8,070,473 (Kozlak), and U.S. 2007/0071902 (Dietrich) teach embedding separate ID tag inserts into the build operations for additive manufacturing objects.

In turn, in an effort to construct more accurate and refined products, Nielsen 2004/0159978 teaches varying the concentration of material to reduce the "terracing" effect in additive manufacturing objects.

While the 3D printing field is advancing rapidly, particularly in relation to the professional manufacture of additive manufacturing objects, other key aspects in the field have largely been ignored. In particular, advances related to objects manufactured directly by consumers have, for the most part, been overlooked, as have advances associated with objects manufactured in retail establishments for consumers. Along these lines, Terry Wohlers, regarded as a leading expert in the field, indicated in a September 2008 interview in RapidToday.com that additive manufacturing will remain primarily a domain of professional manufacturers, with consumers possibly utilizing additive manufacturing to build toys and educational project—but not necessarily on a transformative scale. Wohlers stated in relation to broad at-home uses such as building replacement parts, "Even if you had a 3-D printer at home you probably would not be able to build the part due to a lack of material, dimensional accuracy, or color." Those same limitations based on prior technologies were likewise thought to adversely affect the ability to build versatile and aesthetically pleasing toys. Concurring with these concerns, Robert Mitchell an IT expert with *Computerworld*, recognized in Dec. 21, 2011, "Some analysts doubt that the at-home 3D printer market will ever emerge. Instead, they say, service bureaus will build those custom parts or toys for you, whether it's a custom figurine or a part for your vacuum cleaner." Yet Mitchell indicates that 3D printing could be on the verge of breaking out of its niche; Mitchell also quotes Wohlers as conceding that "the demand for 3D printed products among non-professionals is developing. It will be much larger than the professional market."

In more recent months, the immense promise of the consumer-printing market is finally starting to be recognized, with Wohlers himself recently quoted in the Jan. 9, 2012 edition of Businessweek.com as now stating that "toys might be a big success. [A 3D printer] could be the last toy you ever buy your child. It's a multi-billion dollar market." Similarly, Abraham Reichental, CEO of leading additive manufacturer 3D Systems, states in this same article that "this technology is going to end up in your kids' bedrooms and on the factory floor." Potentially beating the larger manufacturers to the punch, an upstart company called Origo is hoping to distribute one of the first toy-oriented 3D printers, a low-cost device launching within the next 18 months.

In sum, the prior patent literature in the field had mainly emphasized additive manufacturing by professionals, and 3D printing experts are only beginning to recognize the vast potential of direct manufacture by consumers. This inventor believes the consumer 3D printing market to be far more substantial than even the sizable toy industry—and that creative advances for transforming the way we manufacture a variety of goods have been neglected in the sector. These creative advances pertain to the construction of additive manufacturing objects by consumers, as well as to the innovative delivery of 3D printed objects to consumers in their homes and via business establishments. This in-depth patent disclosure focuses on these breakthroughs.

SUMMARY

Objects and computer-implemented methods provide advances in additive manufacturing, with aspects of several embodiments relating to entertainment, compensation, and the novel delivery of objects to receiving parties.

In accordance with one basic embodiment described, additive manufacturing material is transformed into an additive manufacturing object partially or fully unknown to the receiving party on the receiving party's additive manufacturing system, wherein construction reveals the object to the receiving party. Additional aspects related to the above and other embodiments include enabling a sending party to commence the direct or indirect transfer of object build data to the receiving party. The object ordered built may be at least partly unknown to the sending party. Digital delivery of the object may optionally be facilitated by a third-party. Other aspects include enabling the receiving party to identify the sending party through constructed objects; enabling the receiving party to request and/or receive more information prior to authorizing the unknown object's construction on the receiving party's additive manufacturing system; and/or enabling the receiving party to select in advance predetermined build parameters via related inputs for object data delivered by other parties.

Aspects of various embodiments further include enabling a receiving party to be reimbursed in one or more stages for material costs for objects constructed on the receiving party's additive manufacturing system. The objects constructed may, for example, comprise a friend's gift, a free product sample, a reward for viewing advertising, and/or a benefit for a product under warranty. The reimbursement may include a cash credit and/or materials credit, and may be automated and/or provided manually. Objects ordered built by other parties that meet predetermined reimbursement parameters may be constructed automatically on the recipient's machinery. Related compensation may also be provided on behalf of the receiving party for intellectual property fees and/or machinery costs. If the receiving party is provided the option to construct the object on a third-party's additive manufacturing system, compensation may optionally be made by the sending party to the third-party, and may also include compensation processing and/or delivering the constructed object to the receiving party. The receiving party may be provided the option to construct portions of objects on both their own system and on at least one third-party's system, with the compensation provided as appropriate by the sender to the respective parties. The receiving party may compensate the third-party for fees not covered by the sending party. As another aspect, reimbursement may be made to the receiving party for constructing a failed build, wherein the reimbursement may include a credit associated with materials used by the receiving party and/or a credit associated with authorization fees paid by the receiving party relating to the defective object constructed. Focusing on a different aspect, the materials detected as being available to the recipient may cause a change in the object constructed and optionally the related reimbursement provided.

Alternatively, in lieu of receiving material-related reimbursement, receiving parties may be provided replacement materials in accordance with aspects of the above-described embodiments. These replacement materials may optionally be delivered by a supplier predetermined by the receiving party and/or the materials may be delivered as part of the receiving party's recurring additive manufacturing materials order. The replacement materials are optionally provided following the automated detection that the receiving party's additive manufacturing system lacks the preferred one or more materials to construct the desired object(s).

In accordance with various embodiments, multiple receiving parties' 3D printers may receive requests to build similar or like objects—and may optionally be reimbursed for the printing of those objects. Other aspects include changing the design and/or function of the object based on the proximity of receiving parties, when the object is constructed, when the object is ordered, and/or based on the location of the object's construction. Social network platforms may be utilized to initiate the build of objects, and predetermined objects are designed collaboratively for a recipient by multiple social network users. In select embodiments, object builds may be requested by, but unknown to, the sending party—with third-parties selecting the first object portion(s) for construction on the recipient's machinery. Optionally, the first object portion(s) are revealed electronically to the sending party proximate to their construction by the receiving party. Alternatively, the third-party also optionally constructs second object portion(s) on the sending party's machinery, with the first and second object portions configured to be physically joined and/or otherwise operated together.

In accordance with various embodiments described, additive manufacturing material is transformed into an object during the additive manufacturing process, with the object including temporarily-viewable indicia constructed on at least one exposed interior—and/or unfinished exterior—surface of the object using at least one integrated step of the additive manufacturing process. The indicia may include at least one textual message, at least one design, and/or at least one identification mark. Select indicia may appear and change during at least one portion of the build process to, for example, dynamically entertain or inform the user. Select indicia optionally disappear from view during portions of the build process and/or once the final additive manufacturing material is added to the finished object. Indicia may be depicted by contrasting colors, materials, empty cavities, and/or build patterns. The indicia may be utilized for entertainment, instruction, advertising, social occasion messages, and/or for identification purposes.

Several of the objects created utilizing the various embodiments described in this disclosure include financial transaction products, social occasion messages, puzzle objects, deliberately-breakable objects, sample objects, wagering products, coupon products, contest products, lockable objects, game-oriented objects, expandable objects, and awards associated with answering trivia and educational questions.

Select objects are created in successive and/or concurrent builds to task users with assembling the portions into at least one unified object as an entertainment challenge. These objects may be at least partly known to the receiving party—or fully unknown to further enhance the surprise or assembly challenge. Optionally, at least one portion of an object may be configured to join with a next successive portion, while at least one other object portion of that object is configured to not join with a next successive portion—thereby posing an increased challenge.

Other aspects of various embodiments comprise coordinating the construction of objects with media presentations, including television shows, electronic books, arts and crafts presentations, fictional media presentations, and/or other media. For instance, objects constructed may reveal information not yet disclosed in a fictional story and/or supplemental information not disclosed at all in the associated media presentation. Focusing on another aspect, the construction of craft object portions may optionally be automatically synchronized to instructions provided to viewers by a host on an associated televised program, with the speed of the viewer's printing leading to modifications in the televised program. Further aspects of various embodiments include constructing additive manufacturing objects as a benefit associated with the ordering of other products and/or services from a business establishment, wherein the 3D printed objects are optionally coordinated with traditionally-manufactured merchandise. Objects may be constructed in multiple portions at multiple locations at least in part for entertainment purposes, wherein, for instance, users subsequently assemble the multiple portions obtained from multiple locations to create at least one unified object. Objects may be built with barriers—or otherwise constructed strategically—to conceal select content from users during the construction process.

Temporarily-viewable interior three-dimensional structures may be displayed within unfinished objects to entertain and/or inform users during the additive manufacturing process. Multiple temporarily-viewable structures may be built concurrently and/or successively. The structures may be combined with text and/or used to tell a story. Multiple objects under construction concurrently may feature temporarily-viewable interior structures built as a synchronized presentation. Temporarily-viewable structures may optionally be utilized to display temporary advertising, demonstrate object samples, and/or provide social occasion greetings.

Other embodiments, features, and combinations are described and shown in the specification, the drawings, and especially the claims.

BRIEF DESCRIPTION OF THE DRAWINGS

The accompanying drawings, in which like reference numerals represent like parts, are incorporated into and constitute a part of the specification. The present embodiments are illustrated by way of example, and not limitation, in the figures.

FIG. 5 is a flow chart illustrating a basic computer-implemented process for constructing an object unknown to the receiving party on the receiving party's additive manufacturing system, including associated machinery.

FIGS. 25A, 25B, 26A, and 26B illustrate examples of gaming and contest products designed as various puzzle objects utilizing additive manufacturing machinery.

FIGS. 27A, 27B, 27C, 27D, 28, 29A, 29B, 29C, 29D, 29E, 30, 31, and 32 illustrate a variety of examples related to constructing indicia on an additive manufacturing object's exposed interior (and exterior) surfaces, with select indicia temporarily-viewable during construction of the unfinished objects.

FIG. 40 is a flow chart showing one configuration for the computer-implemented processes involved in constructing an object for a customer utilizing the business establishment's additive manufacturing machinery, wherein the object is at least partially unknown to the customer.

FIGS. 44, 45, and 46 illustrate constructing portions of various additive manufacturing objects utilizing multiple additive manufacturing machines.

FIG. 47 demonstrates constructing portions of additive manufacturing objects in coordination with instructions provided by media presentations, including televised programs.

FIG. 52 is a flow chart illustrating various computer-implemented processes for constructing one or more portions of an object in coordination with at least one related media presentation.

FIG. 55 is a flow chart illustrating computer-implemented methods for constructing objects with expandable features.

FIG. 56's flow chart exemplifies the computer-implemented methods included when constructing one or more additional three-dimensional structures within a main three-dimensional object.

FIG. 57 is a flow chart depicting computer-implemented methods for constructing at least one object at least partly unknown to at least one sending party on at least one receiving party's additive manufacturing system.

DETAILED DESCRIPTION

Objects constructed utilizing additive manufacturing machinery and systems are described, along with associated computer-implemented methods. Aspects of several embodiments involve the novel delivery of objects to the receiving party, reimbursing the receiving party for material costs associated with the receiving party's construction of additive manufacturing objects, the sending party's compensating of at least one third-party for construction costs for objects provided to the receiving party, and constructing objects in other innovative ways for functional and design purposes—including for entertainment. Other aspects relate to utilizing additive manufacturing objects to surprise the receiving party and/or the sending party, to challenge the receiving party, and/or to otherwise engage the receiving and/or sending parties in unique ways. Additional aspects involve constructing indicia and temporarily-viewable three-dimensional structures within the interior of additive manufacturing objects, for functional and design purposes, with the indicia and three-dimensional structures—for instance—presented on the exposed interior surfaces of an unfinished object to entertain and/or inform users during that object's construction. Further aspects include coordinating the construction of additive manufacturing objects with fictional and non-fictional media presentations, including stories and televised presentations. Other aspects are detailed throughout this disclosure.

Figure 1:
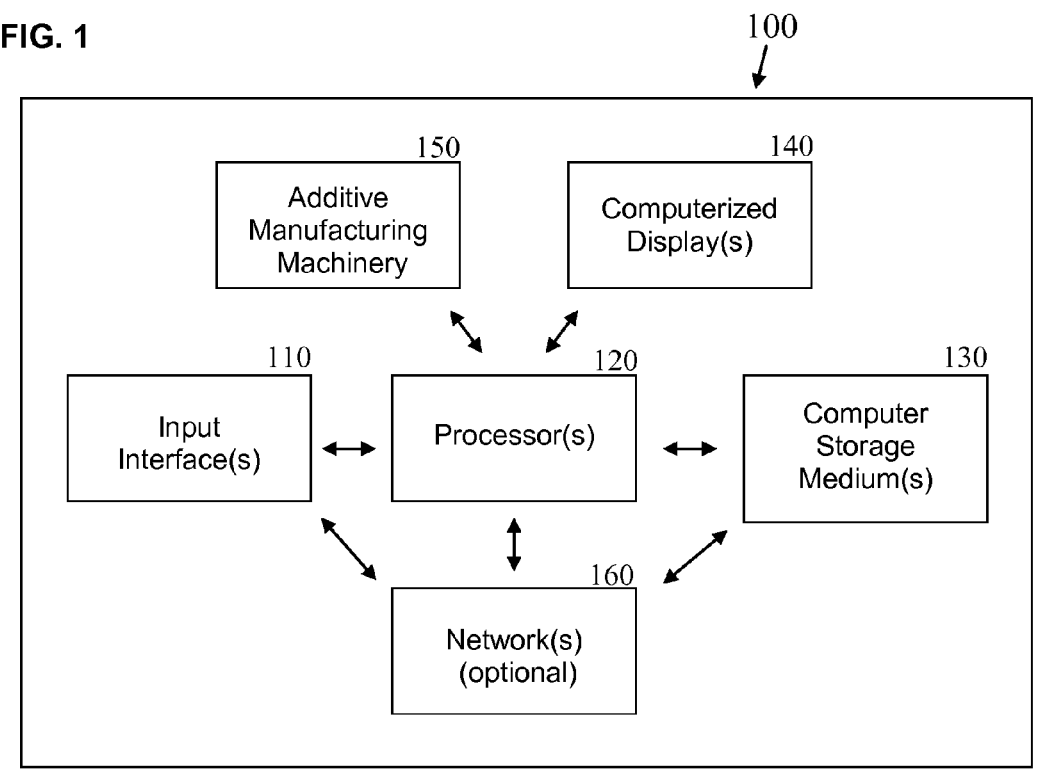
FIG. 1 illustrates an example of an arrangement for a computer-implemented additive manufacturing system used to construct objects, in accordance with several embodiments described in this disclosure.

FIG. 1 depicts an example of an additive manufacturing system 100 utilized to process the construction of objects. The additive manufacturing system 100 includes or is associated with one or more input interfaces 110, one or more processors 120, one or more computer storage mediums 130, one or more computerized displays 140, one or more additive manufacturing machines 150 (also called in this disclosure "additive manufacturing machinery" and "additive manufacturing devices"), and optionally one or more networks 160.

In various examples, components of the additive manufacturing system 100 are built into the additive manufacturing machinery 150, are separate from the additive manufacturing machinery 150, or both. In several instances, utilizing a computerized display 140 is optional or even unnecessary. In various cases, multiple additive manufacturing systems 100 may be utilized in combination to construct one or more objects.

The one or more input interfaces 110 include in various examples manual user input controls and/or automated controls. For instance, the user can input controls manually using a mouse, cursor, touch screen, keyboard, touchpad, microphone, audio circuitry, and/or speakers. Alternatively, the user can input controls in a manual and/or automated fashion using eye movement sensors, body movement sensors, audio sensors, and brain activity sensors. In another example, the user can program input-associated controls in advance to work through at least one processor 120 to trigger at a predetermined date and/or time the at least partially automated construction of objects utilizing the additive manufacturing machinery 150. As another alternative, the input interface 110 may be at least partly activated by one or more parties other than the receiving party via one or more networks 160. The receiving party is also referred to in this disclosure as a "recipient," and is—unless otherwise noted—the one or more parties for whom an object is being constructed. A receiving party may also be referred to as a "user," with that latter term likewise applied throughout this application as appropriate to others, including sending parties.

The one or more processors 120 are, for instance, central processing units, microprocessors, microcontrollers embedding various computer components into a single integrated chip, and/or other such processors that are customarily utilized by one or more computerized machines. In some examples, the one or more processors 120 may be integrated into the additive manufacturing machinery 150 as well as into an associated or overall additive manufacturing system 100.

The one or more computer storage mediums 130 include any combination of non-volatile memory (e.g., ROM) and volatile memory (e.g., RAM). Examples of these computer storage mediums include hard drives, flash drives, server-oriented memory accessed through cloud computing, CDs, DVDs, and/or memory sticks or cards. In one example, software is stored on one or more computer storage mediums 130 to help direct the manual or automated construction of objects utilizing the additive manufacturing machinery 150.

The one or more computerized displays 140 include any combination of displays based on LCDs (liquid crystal displays), LEDs (light-emitting diodes), OLEDs (organic light-emitting diodes), plasma technology, digital light processing, nano-technology-based displays such as FED-NEDs and QLEDs, electronic paper (e.g., Gyricon, electrophoretic displays such as E-Ink, electrowetting displays, and other emerging bistable display technologies), or other types of computerized displays 140. An alternative type of display 140 utilized may be those commonly associated with computerized projectors, including projector-oriented displays 140 disclosed through Google's Project Glass or MIT's Sixth Sense Project.

The at least one network 160 optionally utilized can be the Internet or it can be an interactive satellite, cable, or broadcast television network, a cell phone network, a private network, and/or other communications network. If one or more networks are utilized, the networks are, for instance, connected to at least one server and/or database to help send commands via the input interface(s) 110 and/or directly to the processor(s) 120 to help advance the construction of objects. Alternatively, a cloud computing system is engaged, whereby at least part of at least one additive manufacturing system 100 is remote to the associated additive manufacturing machinery 150, and whereby the at least one remote additive manufacturing system 100 communicates with the associated additive manufacturing machinery 150 through the at least one network 160.

Additive manufacturing machines 150 are often referred to as "3D Printers." The machinery 150 uses "additive processes" to lay down materials to create three-dimensional objects. Additive manufacturing differs from traditional "subtractive" manufacturing processes that take a block of material, for example, and carve an object from that block. Other terms often utilized for additive manufacturing are, according to *Wikipedia*, "additive fabrication, additive processes, additive techniques, additive layer manufacturing, layer manufacturing and freeform fabrication." Firms such as Stratasys sometimes refer to the process as "direct digital manufacturing." A variety of methods are used in the additive manufacturing process. For instance, Stratasys uses a "fused deposition modeling" method, a trademarked term which is generically often referred to as "fused filament fabrication." Examples of other additive manufacturing processes include selective laser sintering, direct metal laser sintering, stereolithography, laminated object manufacturing, electron beam melting, and powder bed and inkjet head 3D printing. Some processes—such as fused filament fabrication and selective laser sintering—heat materials to soften them in preparation for building objects. Methods such as stereolithography lay liquids that are then "cured" through the use of additional materials. With laminated object manufacturing, layers are sliced to desired shapes and then joined. As mentioned previously, in U.S. Pat. No. 6,401,002, Jang teaches utilizing both liquid-based and powder-based build technologies, and additional developments are continuing to advance this young and fast-growing field.

Figure 2:
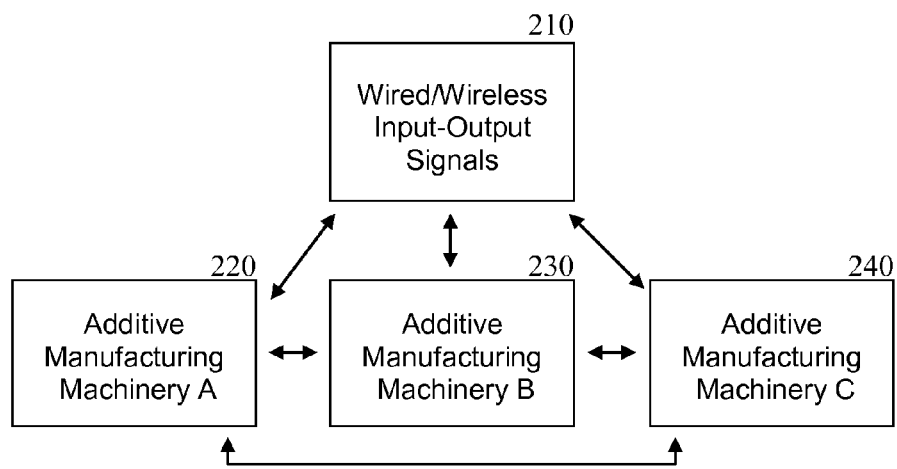
FIG. 2 is an example of a computer-implemented arrangement for processing input-output signals for building one or more objects utilizing multiple additive manufacturing machines operated by the same user and/or by different users.

FIG. 2 illustrates one arrangement for processing input and/or output signals 210 for multiple additive manufacturing machines. The signals 210 may be sent through wired means and/or wireless means. If using wireless means, the arrangement may include a transmitter and receiver coupled to Bluetooth or wireless local area networks (WLAN), cell phone networks, television subscriber networks, WiFi, other such networks for wireless devices, or any combination thereof.

Each of the additive manufacturing machines (220, 230, and 240) depicted in the FIG. 2 example might be connected to the single additive manufacturing system 100 diagrammed in FIG. 1 through one or more wired/wireless input-output signals 210. Optionally, the multiple additive manufacturing machines (220, 230, and 240) are connected to each other (as shown), and/or to multiple additive manufacturing systems 100 similar to the single system 100 diagrammed in FIG. 1. Or the multiple machines may be connected individually to their own systems 100. As well, following these illustrative examples, the input-output signals 210 in FIG. 2 can be connected to, or be a part of, the input interface(s) 110 shown in FIG. 1. Moreover, each of the additive manufacturing machines (220, 230, and 240) may be interdependent components of a single overall machine, or each of the machines (220, 230, and 240) may be separate, independent devices able to be joined to work in unison. Also, although three interconnected additive manufacturing machines (220, 230, and 240) are illustrated in FIG. 2, in actual use a greater or lesser number of machines may be interconnected.

Figure 3:
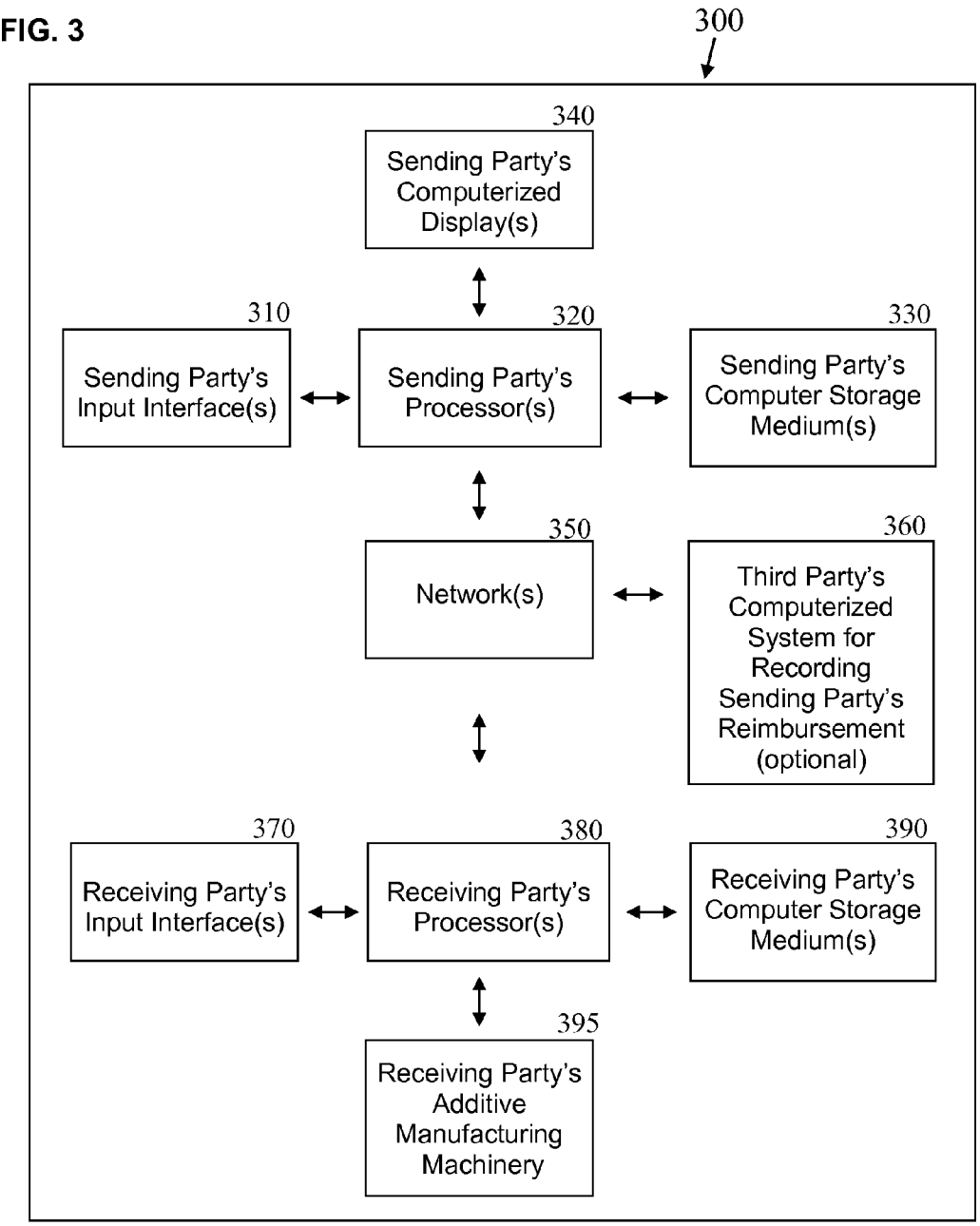
FIG. 3 is an example of an arrangement for utilizing the sending party's computer-implemented inputs to reimburse the receiving party at least indirectly for objects constructed on additive manufacturing machinery by the receiving party.

FIG. 3 illustrates a configuration for a reimbursement-related additive manufacturing system 300 associated with constructing additive manufacturing objects. In this example, the system 300 utilizes the sending party's one or more computer-implemented inputs 310 to activate the reimbursing of the receiving party at least indirectly for one or more objects constructed by the receiving party on the receiving party's additive manufacturing machinery 395. This reimbursement-related additive manufacturing system 300 also incorporates a sending party's processor(s) 320, a sending party's computer storage medium(s) 330, a sending party's computerized display(s) 340, and at least one network 350 to send data at least indirectly from the sending party through the receiving party's input interface(s) 370 to the receiving party's processor(s) 380, the receiving party's additive manufacturing machinery 395, and/or the receiving party's computer storage medium(s) 390. This relationship allows the sending party to at least partially arrange the building of an object on the receiving party's additive manufacturing machinery 395 while allowing the sending party to also at least indirectly reimburse the receiving party for associated material costs. In addition, the sending party and the receiving party can optionally connect through at least one network 350 to a third party's computerized system 360. In this optional scenario, the third-party system is designed at least in part to record the sending party's reimbursement of material costs incurred by the receiving party in relation to building the associated at least one object. This same described system 300 can optionally include multiple sending parties and/or multiple receiving parties, as well as the direct reimbursement to the at least one receiving party. The computer-implemented method associated with this reimbursement-related additive manufacturing system 300 will be described in detail later in this disclosure.

Figure 4:
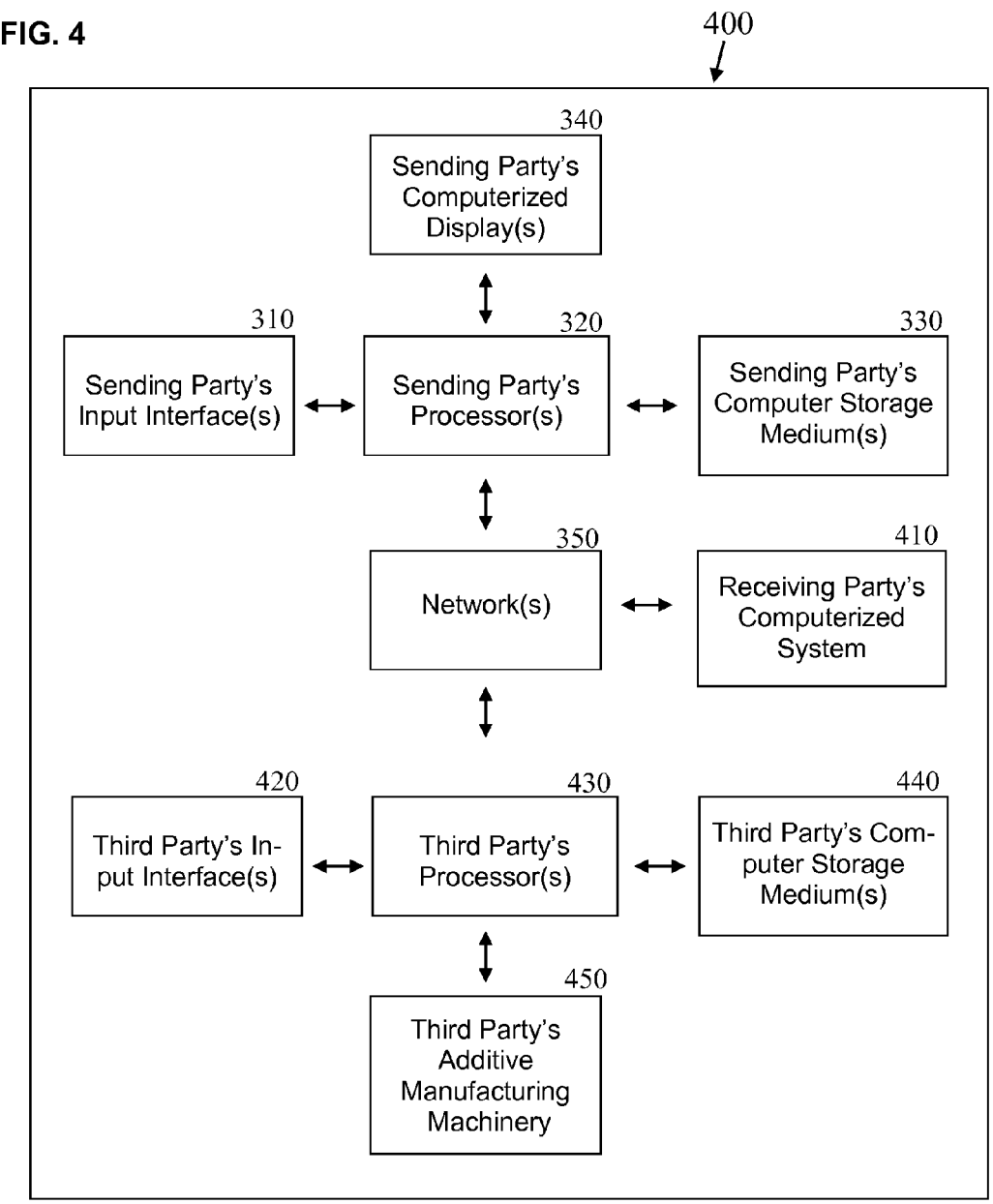
FIG. 4 illustrates an arrangement for the sending party's providing a computer-implemented option to the receiving party to have an additive manufacturing object constructed directly by the receiving party and/or by a third-party, with the sending party at least partially compensating for associated construction costs.

Similar to FIG. 3's example, FIG. 4 illustrates a compensation-related additive manufacturing system 400 associated with the receiving party's choice to construct additive manufacturing objects on a third-party's additive manufacturing machinery 450. In this example, the sending party uses the sending party's input interface(s) 310 to activate the sending party's processor(s) 320, which then retrieves data from the sending party's computer storage medium(s) 330. The data is then transferred through the network(s) 350 to the receiving party's computerized system 410. The receiving party then has the choice to manufacture the at least one object on the receiving party's additive manufacturing machinery 395 (shown in FIG. 3—with the processes similar to those depicted in FIG. 3). Or, as is illustrated in FIG. 4, the receiving party can choose to instead select at least one third-party to manufacture the object in question, with the receiving party's inputs then, for instance, being forwarded via the at least one network 350, through the third-party's input interface(s) 420, and to the third-party's processor(s) 430, which then utilizes information included in the third-party's computer storage medium(s) 440. These steps then lead to the system's 400 commencing the object build on the third-party's additive manufacturing machinery 450. As well, the third-party's input interface(s) 420, processor(s) 430, and computer storage medium(s) 440 can be involved in receiving and processing compensation from the sending party for the costs and/or fees associated with constructing the additive manufacturing object for the receiving party. The computer-implemented methods associated with this compensation-related additive manufacturing system 400 example will be described in further detail later in this disclosure.

As basic alternatives to the FIG. 3 and FIG. 4 examples, the sending party could instead (or additionally) directly utilize a third-party's processor(s) 430 and/or other computerized components to activate the ordering of associated additive manufacturing objects, rather than having the sending party utilize a separate computerized system to order known and/or unknown objects. Separately, and to address one variation exemplified in FIG. 4, most or all of the sending party's inputs could be sent through the at least one network 350 to the third-party's computerized system (420, 430, 440, and 450), with the third-party's computerized system (420, 430, 440, and 450) then managing most or all subsequent communications—such as build inputs and compensation inputs—between the sending party and the receiving party's system 410.

While a variety of additional configurations and combinations can be implemented for the one or more additive manufacturing systems (100, 300, and 400) used to control the construction of additive manufacturing objects, the above details are intended to provide a helpful framework for those skilled in the art.

FIGS. 5 to 9 and 57 to 58 are flow charts exemplifying the computer-implemented steps involved in constructing objects utilizing several additive manufacturing methods described in this patent disclosure. Other variations and combinations can be applied to these seven flow charts—as well as to the additional flow charts included in this application—but these seven charts provide an outline for implementing several key computerized embodiments.

FIG. 5 shows several basic computer-implemented steps involved in constructing an object unknown to the receiving party on the receiving party's additive manufacturing machinery 150. In the FIG. 5 flow chart example, the at least one computer processor 120 detects the activating of at least one input interface 110 by at least one party, such as the receiving party. This activation then causes a computerized operation to be performed, the computerized operation directing the at least one processor 120 to retrieve from the at least one computer storage medium 130 data associated with the construction of the additive manufacturing object unknown to the receiving party. (The computer storage medium 130 containing the construction-related data may, for instance, be maintained by the receiving party or by another party, such as a vendor or other third-party facilitator.) The data retrieved is transferred to the receiving party's additive manufacturing machinery 150. The retrieved data is then employed to construct the object utilizing the receiving party's additive manufacturing machinery 150, with the construction process revealing the previously unknown object to the receiving party. The object may be completely unknown to the receiving party prior to construction or it may be partially unknown, as will be discussed in further depth in this disclosure. In various instances, the identity of the object's sending party may be known, unknown, or partially unknown to the receiving party. Moreover, the sending party's identity may be progressively revealed via clues to the receiving party during multiple discrete phases of the object's construction process. For instance, the design of the object being built first reveals the sender is the recipient's relative. It next reveals the sender loves knitting. And finally, as the object is nearly finished being built, it reveals the specific identity of the sender as the recipient's Aunt Maggie.

The FIG. 6 flow chart follows similar steps as those described above, except that FIG. 6 adds details and depicts a variety of alternatives to the basic configuration outlined above. For example, FIG. 6 points out that the activation of the inputs may be commenced through at least one network 160 used to transfer inputs from at least one sending party's computerized system, at least one third-party's computerized system, at least one social-network's computerized platform, and/or at least one vendor's computerized platform. The latter two examples demonstrate that a social network—like Facebook or Google Plus—or a vendor's website—like Amazon or eBay—can be utilized to originate the construction of objects on the receiving party's additive manufacturing machinery 150. The next computer-implemented step in the FIG. 6 example involves the receiving party's authorizing through at least one computer processor 120 the activating of at least one input interface 110 to enable the transferring of data from at least one computer storage medium 130 to construct the object that is at least partially unknown to the receiving party on the receiving party's additive manufacturing machinery 150. In the diagram depicted, the receiving party's authorization is further associated with at least one of the following parameters:

The receiving party provides manual authorization to enable the construction of another party's requested object;

The receiving party first receives additional information pertaining to the unknown object to be constructed so as to make a more informed decision about whether to provide authorization to construct the object. For example, the additional information may relate to the materials required—or the cost of the materials required—to construct the unknown object on the receiving party's machinery 150. Alternatively, the receiving party may receive information pertaining to the object's nature, shape, size, and/or at least one included element;

The receiving party requests additional information pertaining to the unknown object to be constructed, receives that requested information, then makes the decision about whether to provide authorization to construct the object;

The receiving party first receives information relating to the identity of the sender(s), then makes the decision about whether to provide authorization to construct the object. For instance, the information received may reveal the identity of the sender or it may reveal a clue about the identity, such as that the sender is a relative, a female, a lover of dogs, or a select type of LinkedIn contact;

Prior to receiving the authorization request for constructing the current object, the receiving party had selected predetermined build parameter inputs through at least one input interface 110 control, thereby at least partly automating the authorization process. For example, the receiving party may have chosen predetermined build parameters that automatically authorize object build requests from predetermined sending parties, for predetermined objects, for predetermined types of objects, and/or using predetermined materials—while automatically denying other requests that exceed the chosen parameters. Or, as a second example, the receiving party may have chosen build parameters that at least partly automate the construction on the receiving party's machinery 150 of objects ordered by all sending parties reimbursing a predetermined amount for material usage and/or by select sending parties reimbursing a predetermined amount for material usage. Or the receiving party may have chosen build parameters to at least partly automate the construction on the receiving party's 3D printer 150 of objects facilitated by predetermined third-parties. As another and very specific example, select objects from all parties could be automatically authorized, so that a collector of Star Wars objects sets predetermined build arrangements for anyone to build licensed Yoda characters on their machinery 150 meeting preferred criteria. Furthermore, various denied build requests could optionally permit the sending party to try to subsequently comply with the receiving party's one or more predetermined parameters, the compliance then potentially leading to an authorization to build the requested object.

Figure 6:
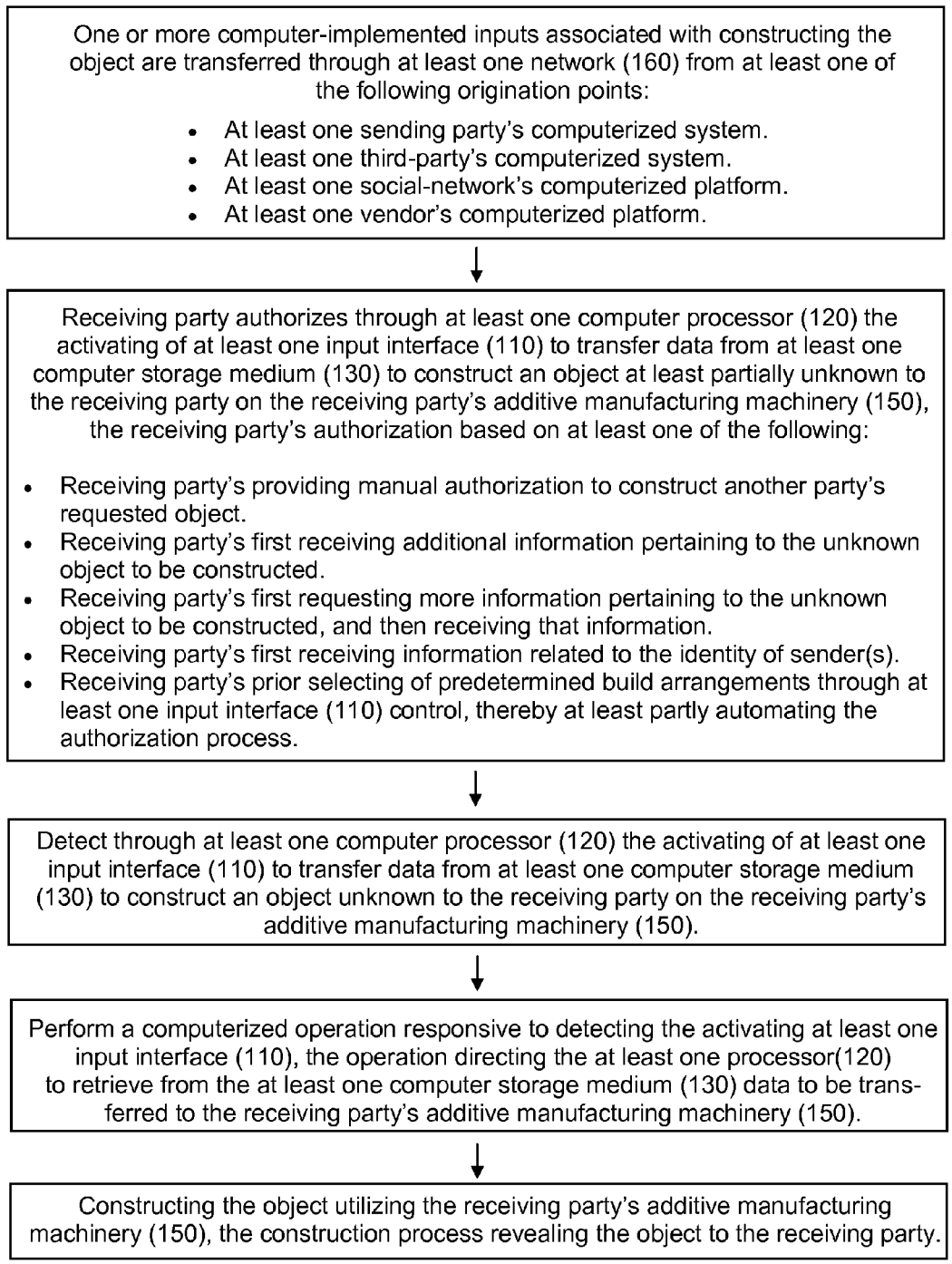
FIG. 6 builds upon the prior flow chart by further illustrating examples for activating several associated computer-implemented processes.

The remaining steps depicted in FIG. 6 parallel the processes depicted in FIG. 5.

Figure 7:
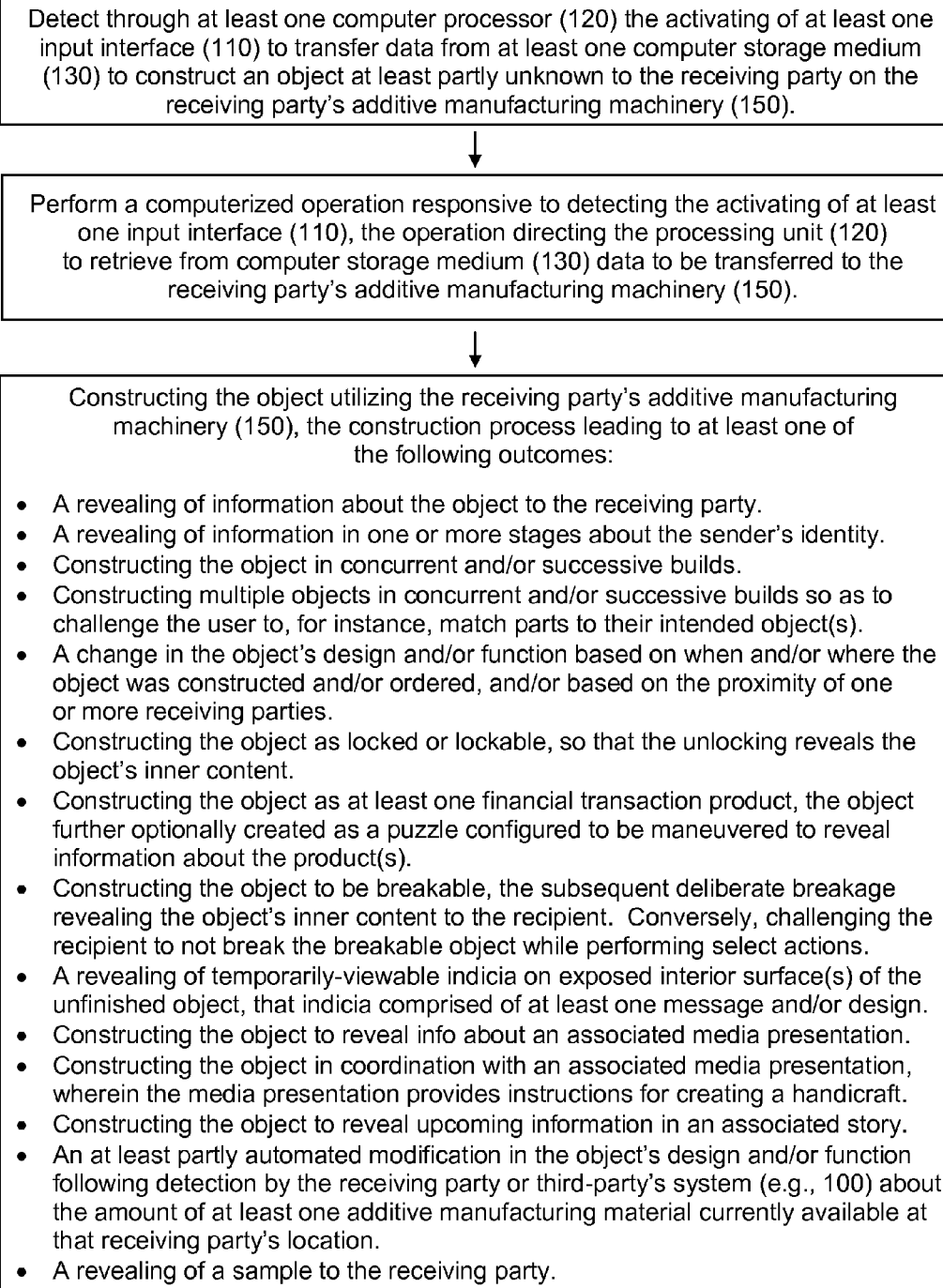
FIG. 7's flow chart supplements the prior two flow charts by illustrating examples of innovative practices for constructing objects at least partly unknown to the receiving party utilizing the receiving party's additive manufacturing machinery.

The FIG. 7 flow chart is intended to also parallel the processes depicted in FIG. 5, except that FIG. 7 illustrates examples of additional innovative practices related to constructing objects at least partially unknown to the receiving party utilizing the receiving party's additive manufacturing machinery 150. When building the additive manufacturing objects in FIG. 7, the construction process includes at least one of the following innovative practices:

A revealing of information about the object to the receiving party;

A revealing of information in one or more stages about the sender's identity—which is especially useful if the sender's identity was at least partially unknown to the receiving party prior to the object's construction;

Constructing the object in concurrent and/or successive builds;

Constructing multiple objects in concurrent and/or successive builds so that the user is, for instance, challenged to match constructed parts to their intended object(s). This leads to novel possibilities for creating puzzles, toys, and other objects;

A change in the object's design and/or function based on when and/or where the object was constructed and/or ordered, and/or based on the proximity of one or more receiving parties;

Constructing the object as locked or lockable, so that the unlocking reveals the object's inner content as at least one surprise. For example, the object may be built with one or even multiple locked components, and the user is required to unlock the locked components to access the object's protected content;

Constructing the object as at least one financial transaction product, the object further optionally created as a puzzle configured to be maneuvered to reveal information about that financial transaction product;

Constructing the object to be breakable, where the subsequent, deliberate breaking of the object by the recipient reveals the object's inner content, such as a surprise message or gift. Conversely, the object could be designed to be breakable, but the recipient could be challenged to perform select actions without causing breakage; success at avoiding breakage then optionally leads to a reward;

A revealing of indicia on at least one interior/unfinished surface of the object under construction, that indicia comprised of at least one message and/or design visible to the user during at least a portion of the object's construction, that indicia at least partly hidden (and optionally fully hidden) from the user's view once the object's construction is finished, that indicia intended to entertain and/or inform the user;

Constructing the object to reveal information about an associated media presentation—including fictional media presentations;

Constructing the object in coordination with an associated media presentation—such as a televised show or other video program—wherein the media presentation provides instructions for assembling and/or otherwise creating a handicraft. The construction may optionally be at least partially automated, so that the construction of multiple object portions of at least one craft object are constructed in multiple phases in synchronization with instructions provided by the associated media presentation;

Constructing the object to reveal upcoming information in an associated story;

An at least partly automated modification of the object's design and/or function following the detection by the receiving party and/or third party's system(s) (e.g., 100) of the amount of at least one additive manufacturing material currently available at that receiving party's location. For example, if the sending party initiates an object build that requires five ounces of a particular blue plastic, but the receiving party's machinery 150 is detected as having four ounces available, the predetermined modification could automatically change the object's size so only four ounces are needed, and/or the object's construction is changed to utilize black plastic—or black plastic within the object's interior followed by blue plastic on the object's exterior;

A revealing of a sample to the receiving party.

Additional information about these innovative practices will be discussed in depth in this patent disclosure in coordination with additional corresponding diagrams.

Jumping ahead for a moment, the FIG. 57 flow chart reverses the concept of FIG. 5, in that FIG. 57 centers on at least one object that is at least partly unknown—and optionally fully unknown—to the at least one sending party at the time of initiating the construction order on the recipient's machinery 150. That at least one object may be known, partially unknown, or fully unknown to the receiving party prior to construction. If at least partly unknown to the receiving party, then neither the recipient nor the sender will know the full nature of the object—or, optionally, anything about the object—prior to construction. As noted in FIG. 57, this particular construction process leads to a variety of interesting potential outcomes, including revealing information about the at least one object to one or more sending parties and/or joining object and/or object portions constructed by at least one receiving party with other objects and/or object portions constructed by the at least one sending party. Moreover, as indicated in FIG. 57, a third-party may choose one or more of the object portions to be constructed by the sending and/or receiving parties, with multiple parties' portions optionally configured to be physically joined and/or otherwise operated together. Alternatively, while the sending party initiates the request to construct the object, the third-party may choose the actual at least one object to be constructed by the receiving party, with the at least one object at least partly unknown to the sending party and the object then revealed electronically to the at least one sending party proximate to when the object is physically constructed by the receiving party's additive manufacturing system 100; as a result, if the object is also at least partly unknown to the receiving party, then the object is revealed electronically to the at least one sending party at the same time it is physically revealed to the receiving party. As a specific example for the embodiment outlined in the FIG. 57 flow chart, the sender's initiating of a request may cause the printing of a locked box shaped like a heart on the receiving party's system 100, while the sender discovers his own system (e.g., similar to 100) is printing the corresponding key. The sender does not know that his request to print at least one item on the receiving party's system 100 resulted in the printing of a locked box shaped like a heart—as a third-party chose the objects in this instance. But the key that was printed on the sender's own system acts in this example as an indicator that it's intended to unlock some kind of item that was printed at the sender's request on the recipient's system 100. Moreover, a third-party—e.g., Facebook, an iTunes 3D printing store, or an online hub for playing electronic games—may choose the printing of one or more of the paired items on behalf of the at least one sender. Similarly, at least one of the paired items may optionally be constructed by the third-party's additive manufacturing system.

Figure 8:
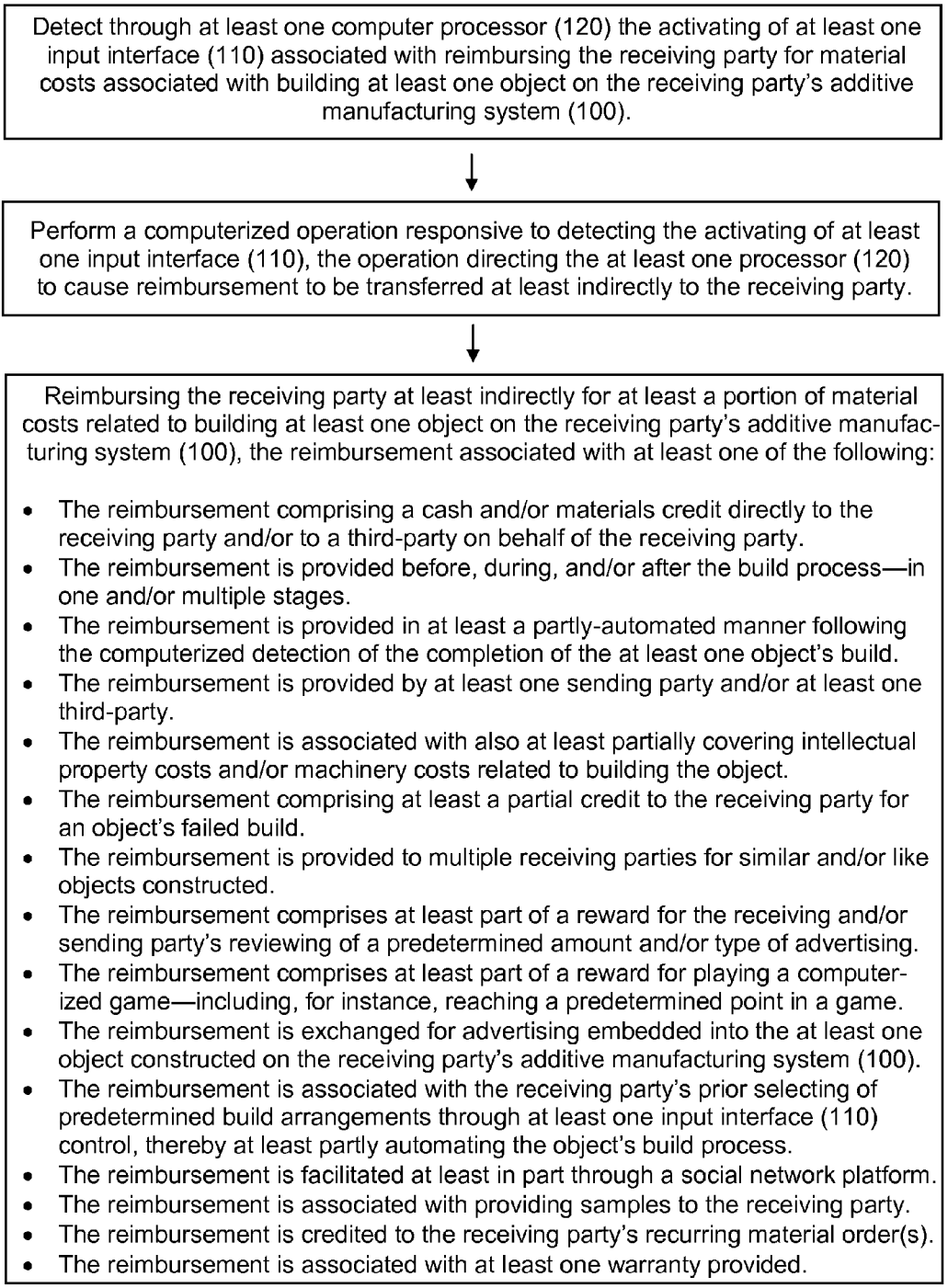
FIG. 8 is a flow chart exemplifying several computer-implemented processes for reimbursing the receiving party at least indirectly for at least a portion of material costs related to objects built by the receiving party's additive manufacturing machinery.

In turn, FIG. 8's flow chart illustrates the computer-implemented processes associated with reimbursing the receiving party at least indirectly for at least a portion of material costs related to building at least one object on the receiving party's additive manufacturing system 100. Reimbursement may be made by at least one sending party and/or at least one third-party. FIG. 8 commences by detecting through at least one computer processor 120 the activating of at least one input interface 110 associated with reimbursing the receiving party for material costs associated with building at least one object on the receiving party's additive manufacturing system 100. The receiving party's system may be similar to the system illustrated in FIG. 1. Or, for instance, it may resemble the systems shown in FIG. 2 or 3. The next step depicted in FIG. 8 involves performing a computerized operation responsive to detecting the activating of at least one input interface 110, the operation directing the processor(s) 120 to cause reimbursement to be transferred at least indirectly to the receiving party. The following step in FIG. 8 comprises providing reimbursement at least indirectly to the receiving party for at least a portion of material costs related to building at least one object on the receiving party's additive manufacturing system 100. That reimbursement is additionally associated with at least one of the following conditions:

- The reimbursement comprises a cash and/or materials credit made directly to the receiving party and/or to a third-party on behalf of the receiving party;
- The reimbursement is provided before, during, and/or after the build process—in one or multiple phases;
- The reimbursement is provided in at least a partly automated manner following the computerized detection of the completion of the at least one object's build process;
- The reimbursement is provided by at least one sending party and/or at least one third-party;
- The reimbursement is associated with also at least partially covering intellectual property costs and/or machinery costs related to building the object;
- The reimbursement comprises at least a partial credit to the receiving party for an object's "failed build";
- The reimbursement is provided to multiple receiving parties for similar and/or like objects constructed;
- The reimbursement comprises at least part of a reward for the receiving and/or sending party's reviewing of a predetermined amount of advertising. Or the reimbursement is a reward for the receiving and/or sending party's playing of a computerized game—including, for instance, reaching a predetermined point in a computerized game. For example, the sending party could review a predetermined amount of video ads and, as a reward, the receiving party is authorized to construct a licensed object without paying for related intellectual property costs and with the vendor or other third-party reimbursing for the receiving party's material costs incurred;
- The reimbursement is associated with the receiving party's prior selecting of predetermined build arrangements through at least one input interface (110) control, thereby at least partly automating the object's build process;
- The reimbursement is facilitated at least in part through a social network platform;
- The reimbursement is associated with providing at least one sample to the receiving party;
- The reimbursement to the receiving party for at least material costs is credited to the receiving party's at least one recurring order of materials, wherein the reimbursement comprises at least one of reducing the cost of the at least one recurring order and increasing the amount of materials delivered in the at least one recurring order;
- The reimbursement to the receiving party for at least material costs is provided as part of at least one warranty benefit. The warranty may relate to at least one device previously purchased by the receiving party. Electronic devices—such as computing devices or appliances—may especially benefit from this type of warranty. For example, if a recipient buys an electrical appliance and a related part goes bad, the appliance's standard warranty/guarantee and/or optional extra warranty purchased by the recipient optionally permits that recipient to build one or more replacement parts for that appliance on their home 3D printer 150, with the related material costs incurred by the buyer compensated by the warranty/guarantee provider.

As mentioned in the bulleted points above, reimbursement can be made as a cash and/or materials credit directly to the receiving party. Alternatively, it can be made to at least one third-party. The third party can optionally comprise a type of "ink bank" (or "additive manufacturing bank") that is designed, for instance, to arrange and record additive manufacturing material credits for receiving parties, sending parties, and/or third-parties. The "ink bank" may optionally be configured to maintain individual accounts for millions of receiving parties, creating a niche type of PayPal payment system specifically for the 3D printing industry. If the sending party gifts a licensed sculpture to the receiving party for construction on the receiving party's additive manufacturing system (e.g., systems 100 and 300), the sending party might choose to pay for associated intellectual costs as well as for material costs. As a result, for example, the sending party remits monies to at least one vendor to pay for intellectual costs associated with the receiving party's construction of the licensed sculpture. In turn, a portion of the sending party's monies is also forwarded to at least one "ink bank," which then credits the receiving party for the cost of materials that will be used (or were used) by the receiving party to construct the gifted object on the receiving party's machinery (e.g., 150 and 395). In one variation, the sending party's monies can all be forwarded to a single party that acts as both vendor and ink bank. Or the sending party's monies can all be sent to a vendor who then forwards a portion of funds to at least one separate "ink bank." Or the sending party's monies can be delivered separately to the at least one vendor and at least one ink bank. Other variations are feasible.

Note that the "ink" in the ink bank may be any one or more materials needed for the construction of the object gifted to the recipient. For instance, the compensation may relate to various filaments used in at least one fused deposition modeling construction process, and/or the compensation may relate to resins used via one of several stereolithography apparatus (SLA) techniques, and/or the compensation may relate to powders utilized in at least one selective laser sintering process. In this regard, "ink bank" is used as a generic term, though a "material bank," "print bank," or "build bank" may be an apt label.

The material credits can be provided at any time before, during, and/or after the build process. For example, the materials credit can be provided solely after the machine detects that the object has been completely built, or the credit can be provided step-by-step as each portion of the object is constructed, or the credit can be provided in three equal installments, one before, one during, and one after the build process. Or the credit can be provided before the receiving party commences the build process to allay the receiving party's concerns about material costs. In one scenario, the additive manufacturing machinery 150 or overall system 100 can even inform at least one party involved in the reimbursement process that the object was completed, thereby causing at least a portion of reimbursement to be credited at least indirectly to the receiving party. In turn, the receiving party's material costs for objects constructed can be paid for by multiple sending parties and/or multiple third-parties. Credits can be provided for all materials used in the corresponding build, or only for select types of materials utilized. In select circumstances, credits can be provided for a "like" material rather than for the actual material utilized by the receiving party. This optional procedure ensures that cost-conscious vendors and other parties offering material reimbursement aren't necessarily compensating for the receiving party's high-end material choices. As well, the material credit process can be modified if the receiving party is detected to be using recycled materials.

As indicated above, multiple portions of the reimbursement are optionally transferred at least indirectly to the receiving party during the corresponding multiple phases of the construction process for the at least one object, the notification of increasing reimbursement provided to the receiving party during construction. For example, as the related object is built on the recipient's additive manufacturing system 100, a computerized visual indicator may show the dollar amount of the reimbursement increasing, and optionally in real-time. This is provided for informational and/or entertainment purposes, showing in a satisfying manner to the recipient that his or her material reimbursement needs are being addressed step-by-step as the object is being built.

Addressing another related issue, reimbursement can be provided to the receiving party as a result of a "failed build," wherein an object constructed by the receiving party fails to meet quality controls and/or other predetermined build standards. The failed build credit can be for material costs incurred by the receiving party, for intellectual property costs, and/or for other associated construction costs. In one example, the receiving party pays licensing fees to a sending party to build a Winnie-the-Pooh sculpture and then proceeds to build the Pooh sculpture on the receiving party's additive manufacturing machinery 150. The Pooh sculpture is built incorrectly, and the receiving party's additive manufacturing system 100 delivers at least one computerized signal to the sending party's computerized system, letting the sending party know the process resulted in the object's "failed build." Alternatively, the receiving party manually notifies the sending party the build failed, optionally providing proof. Next comes the optional step of providing proof of destruction of the failed build. Proof of destruction is defined as providing evidence that the failed build object has been at least partially destroyed, rendered at least partially inoperable, and/or labeled in some manner as being defective. After that, the sending party's computerized system is configured to manually and/or automatically credit the receiving party at least in part for licensing fees, material costs, and/or other construction costs associated with the failed build. In lieu of being granted a monetary credit for licensing fees paid, in select instances the receiving party can be permitted to try to rebuild the Winnie-the-Pooh sculpture within a predetermined time without incurring additional licensing fees. As well, the receiving party can optionally be credited directly and/or indirectly for materials costs incurred as a result of having to build the Pooh sculpture twice. Furthermore, the failed build could cause the vendor or sending party's computerized system to reconfigure the at least one computerized file (e.g., CAD file) used to create the Pooh object so that the next attempt by the receiving party is more likely to result in a successful build. Or, for instance, the receiving party could be prompted to build a different Pooh sculpture offered by the vendor. As another example, a failed build resulting from the malfunctioning of the receiving party's machinery's 150 (e.g., due to lack of maintenance) could still result in a credit or, conversely, depending upon various usage terms, and the desires of the vendor and/or sender, at least a portion of the credit could be nullified.

As a follow-up to the predetermined build arrangements discussion relating to the FIG. 6 flow chart—these FIG. 8 reimbursement embodiments and examples may also be paired with one or more predetermined build arrangement inputs 110. These inputs 110 can optionally at least partly automate the future construction on the receiving party's additive manufacturing machinery 150 of at least one object sent by all sending parties, select sending parties, all sending parties reimbursing at least a predetermined amount for material usage, and/or select sending parties reimbursing at least a predetermined amount for material usage. Therefore, for instance, additive manufacturing objects gifted by a grandfather will optionally be constructed automatically on the receiving granddaughter's machinery 150, with the cost of the materials involved in constructing the gift fully covered by grandpa.

The reimbursement configuration examples described above may prove especially useful to vendors who wish to provide sample objects to large numbers of receiving parties, as those receiving parties will be more likely to build and try the samples—and become subsequent customers—if they are reimbursed at least in part for material costs. As a result, vendors of additive manufacturing products will engage a variety of methods to attract new and repeat customers. For example, by modifying charges for intellectual property costs and also reimbursing the customer at least in part for material costs, various vendors will provide free samples, reduced cost samples, miniature samples, first products in a set, unfinished products, portions of products, non-operational products, consumable products, edible products, licensed products, and/or other sample variations. To clarify, and assuming at least a first object (or at least a first portion of at least a first object) is free, for instance, the vendor might then optionally require the customer to provide payment for the next related item the customer wishes to construct.

The above-described reimbursement configurations may also be useful to computer software vendors who wish to reward users for engaging their computerized software, such as for reaching a predetermined point in a related computerized game.

Similarly, advertisers may enjoy a mutually beneficial arrangement with receiving and/or sending parties by enabling advertising-related parties to reimburse receiving and/or sending parties for material costs and/or other construction costs in exchange for the receiving and/or sending parties' reviewing of a predetermined amount of advertising. For instance, every time a user engages the Bing search engine or views a video ad or YouTube presentation, the user can be credited a corresponding amount for material costs and/or intellectual property costs. The credit can be useable at a predetermined future date or, for example, it can be used the next time the user decides to initiate the build of an additive manufacturing object licensed from all or select vendors. If the advertising-related party supplies a material credit, that credit can be applied directly to the user or, as was indicated in a prior example, to at least one "ink bank" account on behalf of that user. Furthermore, the various credits can be escalated by the advertising-related party the more the user engages selected advertising. Moreover, credits provided separately from a third-party to a sending party and to the receiving party may be combined to enhance the materials credit for an object built on the receiving party's machinery 150. These above-described configurations may also be adapted to other rewards programs; for example, if the receiving and/or sending party has a selected credit card rewards program, is an "Amazon Prime" member, spends a certain amount on Google Play, and/or watches a predetermined amount and/or type of advertising, a benefit for this participation may include at least one third-party's reimbursing the at least one receiving party for material expenses for select objects ordered built on the receiving party's additive manufacturing machinery 150.

Referring back to advertising, the constructed objects themselves may include the advertising that is exchanged for material costs and/or other construction costs that would otherwise have been borne by the recipient. For example, the receiving party needs to construct a stapler on additive manufacturing machinery 150; so he downloads a related, licensed CAD file from Google and, in exchange for Google-related advertising imprinted on the stapler's exterior and/or otherwise visible on that object's at least one finished surface, Google reimburses that receiving party for licensing costs and/or for the cost of the materials required to produce the stapler. That imprinted advertising may be non-electronic indicia displayed on the stapler and/or it may be electronic advertising with, for instance, at least a portion of that stapler's electronic display optionally constructed on the same 3D printer; in another example, the related advertising is displayed via the lenses of Google's computerized glasses whenever the user is seen using the associated stapler. As well, the non-electronic advertising discussed above may optionally be subject to a bidding process similar to Google's "Ad Words"; in this example, the highest bidder for placing an ad on that particular object built and/or for that particular customer profile secures the non-electronic ad on the respective receiving party's stapler.

As a variation to the embodiments described above, when a sender remotely requests that at least one object be constructed on a recipient's machine, one or more computer-implemented systems (e.g., FIG. 1 or 3) are optionally programmed to detect the materials available in the recipient's machine 150 and/or otherwise at the recipient's location. As a result of this computerized detection process, the data (e.g., the CAD file) for the at least one object built is optionally modified to adapt to the available materials identified. Moreover, if a lesser amount of desired materials are detected as being available than is preferred for this build order, then the size, color, and/or other features of the sender's remotely-ordered at least one object may be altered automatically and/or manually to better correlate with the detected available materials. Similarly, the build parameters may optionally be altered manually and/or automatically by the sender, recipient, and/or other party if the original build was designed to use more than a predetermined portion of the recipient's detected remaining materials, ensuring the recipient is left with an adequate supply of materials after construction of the gifted at least one object.

Relating to the above, the monetary reimbursement provided to the recipient for material expenses may be modified based on the type, amount, and/or cost of the actual materials used to create the gifted at least one object. For instance, a grandmother orders a metallic gold trophy built on her granddaughter's 3D printer 150, but the system detects that the child's printer 150 has available Lego-like plastic material. In this example, not only may the data files automatically adjust the parameters to optimize the build for plastic—but the reimbursement provided is also optionally adjusted to account for the actual plastic material used—rather than for the metallic material originally requested. Furthermore, the detection process of available materials may in select instances occur prior to the ordering and/or finalizing of the sender's order, so that the original order is more efficiently matched to the available materials detected.

As an alternative to the above, upon at least one computerized system's (e.g., 100 and 300) detecting that the desired materials are unavailable at the recipient's location, the preferred metallic gold materials may, for example, automatically be delivered to the recipient's home and/or other location in a quantity matching that needed to complete the build of the gifted at least one object—including optional excess materials to account for manufacturing inefficiencies.

Furthermore, in lieu of monetarily reimbursing the recipient for gifted objects built on the recipient's machine 150, the equivalent amount of material(s) may instead as a preferred rule be delivered (or otherwise provided) to the recipient prior to, during, and/or subsequent to the object build. Providing at least one replacement material to the receiving party would enable him or her to maintain an adequate supply of build materials even with a profusion of gifted objects constructed. Furthermore, the switching of reimbursement procedures between materials and cash/credit may optionally be configured to depend upon a variety of factors including, for instance, the size of a particular object remotely-ordered and/or the identity of the sender. On the same topic, at least one replacement material may be shipped, for instance, from a vendor or other supplier chosen by the seller or via the recipient's predetermined approved supplier list. As well, to reduce shipping fees for the sender and/or recipient the replacement material(s) may optionally be shipped to the recipient only when the amount ordered exceeds a predetermined threshold. Along the same lines, if the receiving party maintains with at least one supplier a recurring order of 3D print material(s) that are shipped automatically on a periodic basis, the sender's replacement material(s) may optionally be added manually and/or automatically to the recipient's standard reoccurring order. Addressing other options, the at least one replacement material may be provided to the receiving party as a warranty/guarantee benefit relating to at least one device previously purchased by or for the receiving party. Jumping ahead for a moment, FIG. 58 addresses these and other options for the computer-implemented method associated with replacement materials. For instance, as FIG. 58 indicates—and similar to the reimbursement methods previously discussed—the replacement material(s) may be provided as a reward for the receiving and/or sending party's reviewing of a predetermined amount of advertising. Or, for instance, the at least one replacement material being provided to the receiving party following detection by the at least one input interface 110 that the receiving party lacks the preferred material(s) to construct the at least one object on the receiving party's additive manufacturing system 100, whereby the replacement material(s) are then provided in advance of the object's construction. In one last example, at least one replacement material or other material sent to a recipient to build a surprise and/or gifted object may be deliberately enclosed within at least one different material, so that the receiving party is optionally unaware of the color, substance, and/or other features of at least one material to be used to construct the object until the actual construction is underway or completed; for example, a 10 kt gold material provided to the recipient to build an object is completely hidden within a red plastic material. The recipient therefore places what appears to be red plastic material into her 3D printer's 150 appropriate receptacle(s). The recipient may know the plastic encases the gold material or—to enhance the surprise—the recipient may be partially and/or completely unaware that a surprise material is contained within. As the gold material is then employed to commence a build, the red plastic is, for instance, stripped-away during the build process and discarded, recycled, and/or used to construct an associated jewelry box; in turn, the 10 kt gold material is utilized by the machine 150 to construct a gold heart pendant for the recipient. Or, for instance, both materials are utilized to create portions of the same object.

Figure 9:
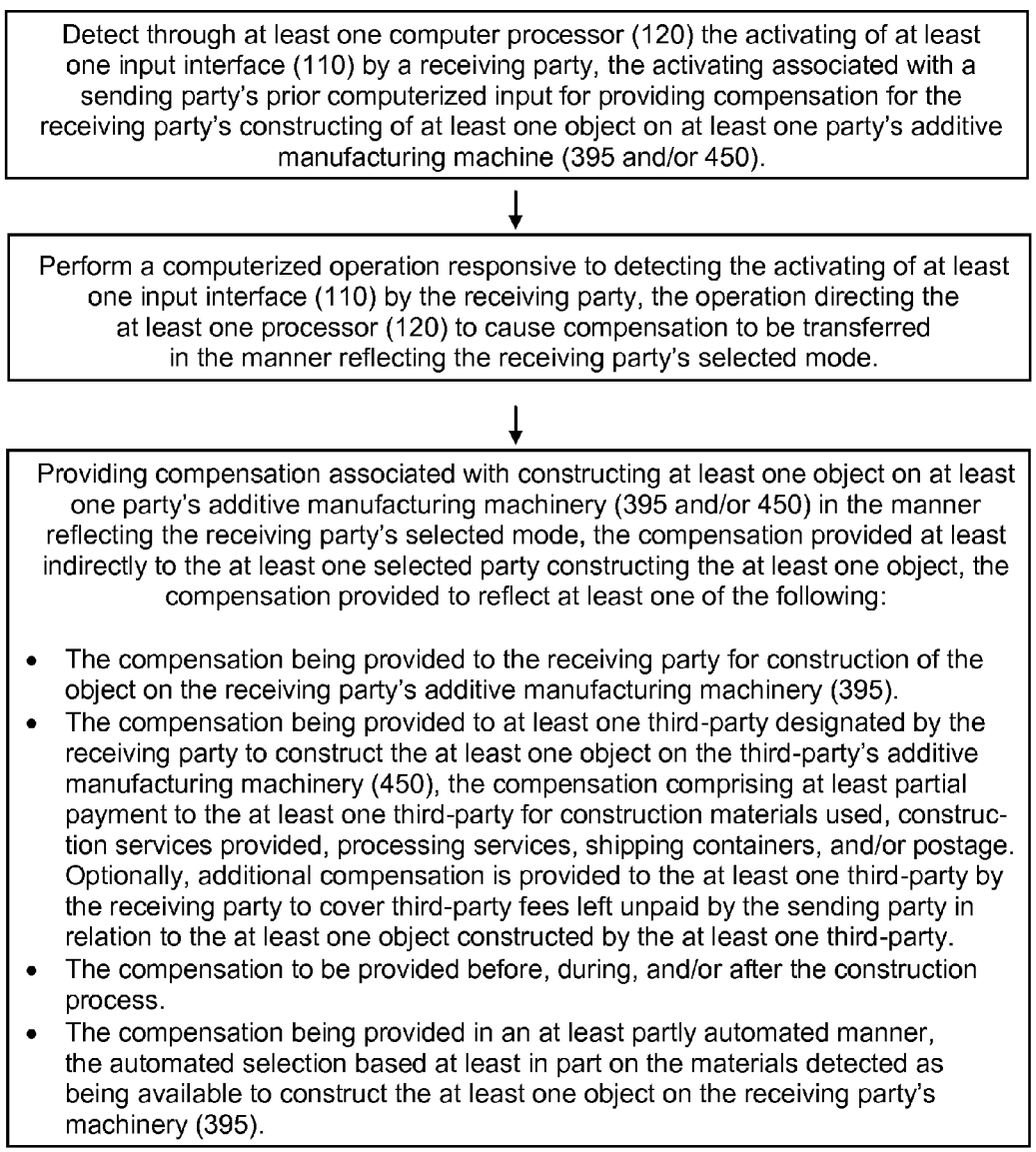
FIG. 9's flow chart illustrates the receiving party's being provided the option to be credited for building at least one object on the receiving party's additive manufacturing machinery and/or allowing related credits to be forwarded to at least one third-party in association with the at least one third-party's build of the at least one object.

The reimbursement-oriented, computer-implemented steps discussed previously in the FIG. 8 flow chart are similar to those depicted in FIG. 9, except that FIG. 9 centers on providing the receiving party the choice of building the object on the receiving party's additive manufacturing machinery 395, or of building the object on a third-party's additive manufacturing machinery 450. In turn, if the receiving party chooses to build the object on the receiving party's additive manufacturing machinery 395, then compensation is provided by the sending party (or another party) at least indirectly to the receiving party for associated construction costs incurred by that receiving party. In contrast, if the receiving party chooses to build the object on at least one third-party's additive manufacturing machinery 450, then compensation can be provided by the sending party (or other party) to the at least one third-party constructing the object. The compensation can pay all associated construction costs charged by the third-party—including the costs for materials, the cost for construction services provided (such as "build fees"), various processing services, shipping container charges, and/or postage. Alternatively, the compensation provided by the sender may only partially cover the associated fees and costs, with any uncovered fees paid for by the receiving party (or another party). In this latter example, the receiving party could optionally review a predetermined amount of advertising to resolve any uncovered fees. In a variation to the above examples, if the receiving party chooses at least one third-party to build the at least one object, the sending party may compensate the receiving party directly (or indirectly, such as through an "ink bank"), and the receiving party would then be responsible for paying associated build costs to the at least one third-party constructing the at least one object. In many instances, the receiving party is provided the above-described construction and associated compensation choices as a result of the sending party's prior selection of at least one computerized input through at least one computerized network 350—as was detailed in the discussion associated with FIG. 4. For example, the sending party orders via eBay a licensed "Snoopy" gift for the receiving party; that computerized order subsequently allows the receiving party to choose whether to construct the gift with the receiving party's machine 395 or with a third-party's machine 450, with the sending party having already entered the necessary computerized inputs to pay for the construction costs associated with the receiving party's eventual choice.

As FIG. 9 indicates, the receiving party may be permitted to choose at least one third-party to construct at least one portion of the object, while the receiving party is permitted to construct at least one different portion of the object on the receiving party's own machinery 395—with the sending party then transferring prorated (or otherwise appropriate) compensation to both the receiving party and the at least one third-party engaged in constructing portions of the same object. Furthermore, this duel reimbursement method may optionally be integrated into at least one warranty for a device (such as an electronic device) that was previously purchased by the receiving party. For example, the warranty provider reimburses both the receiving party and at least one third-party service bureau for constructing different portions of a malfunctioning object that is covered by that warranty provider's policy, the policy either included at no charge when the receiving party purchased the object or the coverage having been purchased by the receiving party as a supplement.

FIG. 9 also points to one additional variation, wherein compensation is provided to the chosen at least one party in an at least partly automated manner, the automated selection based at least in part on the materials detected as being available to construct the at least one object on the receiving party's additive manufacturing machinery 395. Therefore, for instance, if the receiving party's input interface(s) 110 on the receiving party's system 100 senses the recipient's machinery 395 does not have available the right materials to construct the object ordered by the at least one sending party, the receiving party's system 100 will automatically direct that the object—or predetermined portions thereof—be constructed on at least one third-party's machinery 450.

Although the above seven flow charts illustrate several key implementations, other variations and combinations are possible, as is described in greater depth throughout this patent disclosure and particularly as clarified in the appended claims.

FIGS. 10A, 10B, 10C, 11A, 11B, and 11C illustrate objects built utilizing additive manufacturing machinery 150, wherein the additive manufacturing system 100 is configured to change the design and/or function of at least one object based on when the at least one object is ordered and/or built by one or more receiving parties. Alternatively, the design and/or function can change depending upon when the at least one object is ordered by one or more sending parties and/or delivered by one or more third-parties. For example, if the sending party orders an object's computer-aided design file to be sent to the receiving party, the time that CAD file is ordered could change aspects of the CAD file and thus change aspects of the related object to be constructed. In each situation, the additive manufacturing system 100 is able to utilize date and/or time software to help determine the desired design and/or function of the at least one object. In various examples, the associated object constructed may be known, partially unknown, or fully unknown to the receiving party.

Addressing a related issue, subsequent object build request(s) by the at least one sending party to be constructed on the receiving party's additive manufacturing system 100 are optionally configured to be cancelled and/or added based on when and/or whether the receiving party had chosen to construct the current object. Similarly, for an object constructed in multiple successive and/or concurrent portions, at least one portion of that object is changed, cancelled, and/or added based on when and/or whether the user chose to construct at least one prior portion of that same object.

Figure 10A:
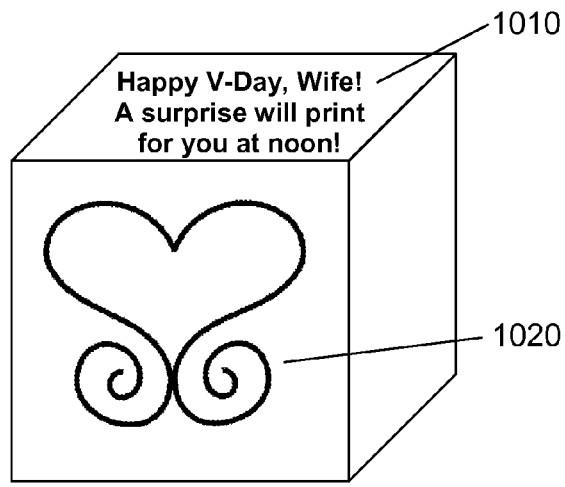
FIGS. 10A, 10B, 10C, 11A, 11B, and 11C are examples demonstrating how an additive manufacturing object can be designed to change based at least partly on when the object is ordered by the at least one sending party and/or received or constructed by the at least one receiving party.

In the FIG. 10A perspective drawing, an object is constructed on an additive manufacturing system 100 that notifies 1010 the receiving party—in this case, a spouse—that a surprise object will print for her later that same day. A design 1020 related to Valentine's Day is imprinted on the front face of the FIG. 10A object. Had the receiving party alternatively constructed the FIG. 10A object the day before, in one variation the additive manufacturing system 100 associated with a calendar could have changed the notification 1010 to instead read: "A surprise will print for you tomorrow at noon."

Figure 10B:
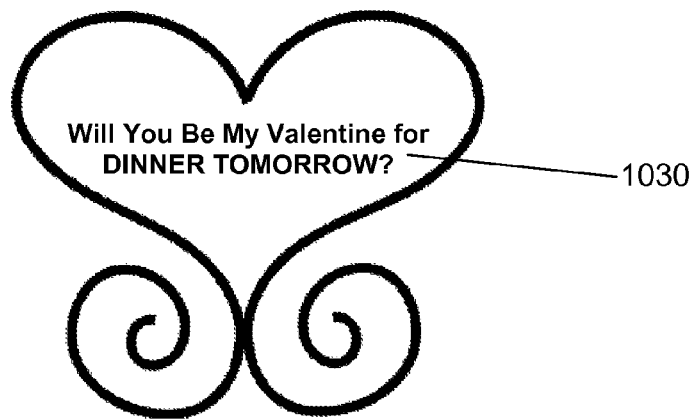

FIG. 10B represents the printing of the follow-up surprise object referred to above. FIG. 10B is an elevation view. Note that this FIG. 10B object constructed at noon refers to an invitation 1030 to the receiving party to have dinner the next evening. If the receiving party had instead authorized building the FIG. 10B object the next day, the additive manufacturing system 100 could have instead configured the object's invitation 1030 to read: "Will You be My Valentine for Dinner Tonight?"

Figure 10C:

Showing another variant, FIG. 10C's elevation view represents the third object in a row sent to the receiving party. In this example, each ensuing object constructed helps to build suspense and excitement for the receiving party. This third object's message 1040 reveals the romantic location of the Valentine's Day dinner. Note, too, that the FIG. 10C object is larger than the object depicted in 10B. This is to demonstrate that the size and shape of the objects constructed via additive manufacturing can also be changed depending upon when those objects are constructed and/or ordered.

As an alternative to the above, if the receiving party had decided not to print FIG. 10B the day before Valentine's Day, the next day the additive manufacturing system 100 could be configured to substitute delivery of the FIG. 10C object for 10B, so the receiving party skips receipt of the FIG. 10B object. Other variations are also feasible.

Figure 11A:
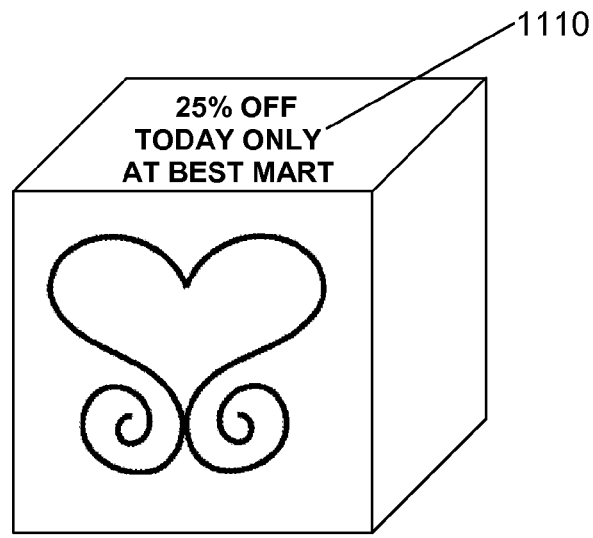

FIG. 11A demonstrates that the design and/or function of one or more objects associated with promotions and/or coupons can likewise change based on when those objects are constructed and/or ordered. For example, the receiving party is sent an email stating that they will receive a special coupon from a fictional "Best Mart." They are simply to authorize the printing of that coupon object on their additive manufacturing machinery 150. Once they do so, the three-dimensional object shown in FIG. 11A is constructed, and that object displays a message 1110 revealing the receiving party has been provided a 25% off coupon. Had the receiving party elected to print the object an hour or minute later or earlier, the sender's additive manufacturing system (e.g., 300) could have instead configured a 20% or 30% off coupon for the same recipient. In one variation to the above, all or some of the best coupons could optionally be constructed on a first-come, first serve basis, so that the earliest coupons printed are the most desirable. In another variation, winning a contest could be determined by when at least one party chooses to construct at least one related object.

Figure 11B:

Similarly, FIG. 11B represents at least a portion of a financial transaction product that was built on an additive manufacturing machine 150. In this elevation view example, the receiving party's spouse had purchased a $1,000 gift card for the receiving party to redeem on Valentine's Day at a fictional Best Jewelers. The related notification 1120 is displayed on the FIG. 11B object built by the receiving party. Had the receiving party constructed the object two days earlier, for instance, the additive manufacturing system (e.g., 100 or 300) could have instead configured the notification 1120 to read: "Valentine . . . Here's $1,000 to Spend on Tuesday, February 14$^{th}$, at Best Jewelers." FIG. 11B is intended as an additional example to demonstrate that the design and/or function of the financial transaction product (e.g., gift card) can be changed based on when the object is constructed and/or ordered—or, for instance, based on when the associated CAD file is delivered.

Figure 11C:
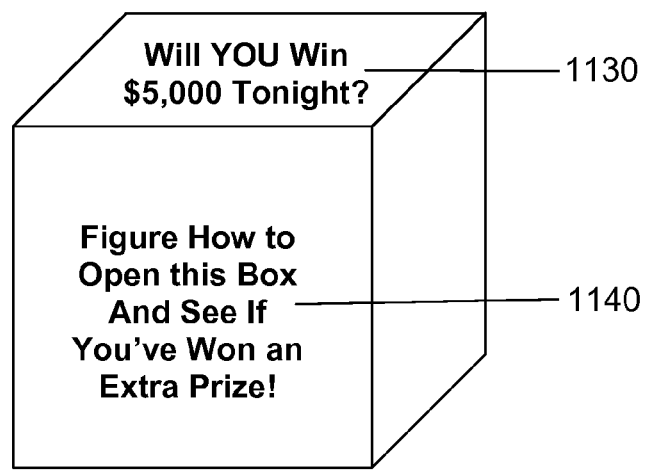

FIG. 11C's example incorporates a contest into a puzzle object constructed utilizing additive manufacturing machinery 150. The time-dated message 1130 configured by the sender's additive manufacturing system (e.g., 300) excites the receiving party about potentially winning a contest that same night while a second constructed message 1140 offers a separate challenge to win an additional prize. Had the object been ordered and/or constructed at a different time, the object could have included a different puzzle (or no puzzle and therefore no chance to win an additional prize). This example likewise shows how the function of an object can change based on when that object is designed, ordered, and/or constructed. It also shows one example for how a media presentation can be associated with the time-sensitive construction of an object. As a related option, the FIG. 11C object could instead be constructed in association with a lottery or even, for instance, an Internet wagering platform. For instance, the time and date the object's CAD file is ordered could optionally determine whether the receiving party wins the related lottery or wager. Taking a different approach, the FIG. 11C object can instead be constructed in association with a computerized game: specifically when the object is constructed and/or ordered serves at least in part to modify the game.

Figure 12:
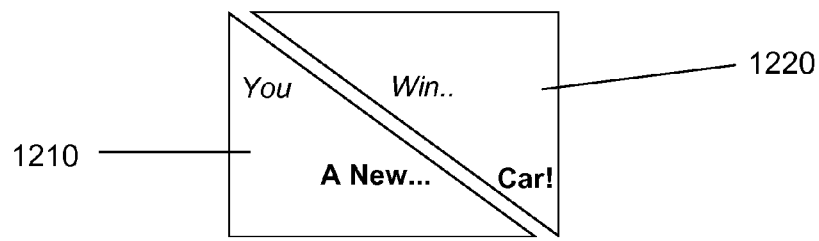
FIGS. 12, 13, and 14 illustrate examples relating to the concurrent and/or successive building of multiple portions of an object utilizing additive manufacturing machinery.
Figure 13:
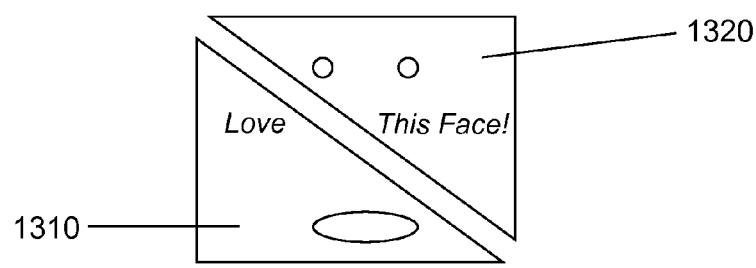
Figure 14:
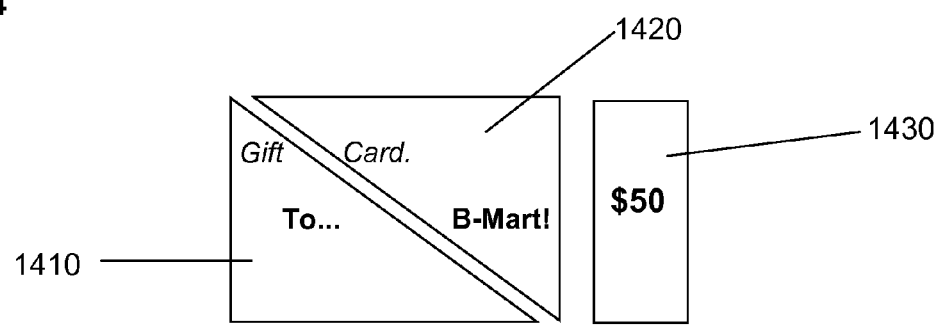

FIGS. 12, 13, and 14 are examples associated with the concurrent and/or successive building of multiple discrete portions of an object utilizing additive manufacturing machinery 150. As indicated by the following descriptions and examples, the object portions may be known, partially unknown, and/or fully unknown to the at least one receiving party. The corresponding object build(s) may be initiated by at least one sending party, third-party, and/or receiving party. The receiving party or other user is then tasked with assembling the multiple portions constructed into the unified object as an entertainment challenge.

FIG. 12 demonstrates how a single object can be constructed in separate builds on the receiving party's additive manufacturing machinery 150. The first build 1210 of, for example, a notification or puzzle could excite the receiving party while optionally not revealing the full nature of the object under construction. The second build 1220 then reveals the rest of the object, in this case letting the receiving party know they won a car. Although this diagram has been greatly simplified for patent application purposes, alternatively the object could be constructed in five, ten, or even in hundreds of successive builds. Alternatively, the object could be constructed in concurrent builds, so that the constructed portions (e.g., 1210, 1220, and any other associated portions) are built at the same time, yet in a deliberately disorganized arrangement. This is designed to require the receiving party to rearrange the pieces to assemble the object for play and/or for comprehending the message delivered. As well, the object can be constructed in a series of multiple concurrent builds. As still another option, an object could be constructed concurrently and successively, wherein, for instance, three builds are constructed simultaneously (and then pieced together by the receiving party), after which time four more builds are constructed one at a time and assembled, after which time five more builds are constructed simultaneously and assembled. In one configuration, the at least one additive manufacturing system (100 and 300) constructs the builds at predetermined time intervals, such as two-minutes apart. In another configuration, at least one build is constructed following authorization by the receiving party after, for instance, the receiving party successfully assembles the previous build's pieces. The builds could also be constructed as a game with, for example, successive builds constructed only after at least one computerized input 110 senses the receiving party had correctly assembled the previous build's pieces. As well, once the receiving party assembles the new piece(s), that party could be required to enter computerized inputs based on information gained from the assembly (or, for instance, based on answering at least one quiz question), after which time the game authorizes the next build to be constructed.

Note that these consecutive and/or successive build embodiments can be applied to the examples previously discussed in FIGS. 10A, 10B, 10C, 11A, 11B, and 11C. As a result, an object's design and/or function may optionally change based on when the user decided to construct one or more individual portions of an object.

Addressing another aspect of these embodiments, optionally at least one build constructed is designed to join with a next successive build constructed, while at least one other build constructed is designed to not join with a next successive build constructed. This assembly pattern is configured to enhance the entertainment challenge to the user as the user seeks to assemble portions of at least one object.

FIG. 13 shows how a puzzle object associated with imagery could be constructed through combining successive and/or concurrent builds utilizing additive manufacturing machinery 150. A first piece 1310 is constructed revealing part of a face and part of a social occasion message. A second piece 1320 is constructed separately (concurrently or successively) and the receiving party is given the enjoyment of assembling the two or more pieces to view the unified imagery and message. This same process could allow a hundred pieces to be built consecutively and/or successively so that the receiving party is further challenged to comprehend the at least one image presented on the assembled object. As well, letters or even parts of letters—rather than whole words—could be imprinted on a single puzzle piece to better conceal the overall message. Although the object in FIG. 13 has been greatly simplified for patent application purposes, far more complex objects could be constructed as three-dimensional toys, sculptures, models, greeting card sculptures, photograph-related gifts, and/or other desirable objects. Young users would especially be entertained by the opportunity to assemble toy cars, figurines, and even entire play sets utilizing the above-described methods.

FIG. 14 demonstrates how to apply the above-described methods of utilizing concurrent and/or successive builds to the construction of financial transaction products. In this example, a first build 1410 is constructed, revealing to the receiving party that he or she is receiving some kind of a gift. The second build 1420 constructed and assembled next to the first build 1410 reveals the receiving party is getting a gift card to a fictional "B-Mart." The third build constructed 1430 reveals the amount of the related gift card. Alternatively, the second build 1420 could be constructed last so as to further challenge the user assembling the gift—as the user would be unable to initially connect the builds. Through the FIG. 14 example, it becomes apparent that the very constructing of the financial transaction product comprises a form of entertainment designed to enhance enjoyment of the gift. As a variation on FIG. 14, the amount of the financial transaction product can be revealed to the user in multiple portions, and/or multiple other portions can be configured to reveal at which businesses the financial transaction product may be redeemed; the user then assembles these puzzle-like pieces to gain the desired information. Note that the portions of the builds depicted in FIGS. 12, 13, and 14 can be assembled in a permanent manner—unable to be disassembled—or they can be assembled in a temporary manner that allows the user the pleasure of reassembling the object whenever desired.

In the case of FIG. 14's financial transaction product, the gift card value identifiers required by the retailer might include an ID number, a magnetic strip, a machine-readable code, and/or another identifier. These one or more identifiers can be constructed into just one segment, into multiple selected segments, or even into all of the segments. If the user loses a piece of the gift card, a remaining piece can optionally still allow the user to redeem the gift card's value. At the same time, the retailer would want to dissuade multiple users from attempting to redeem multiple portions of the gift card separately. As was indicated above, one solution includes physically prohibiting the assembled card's disassembly. A second solution includes the retailer's checking the redemption of the associated financial transaction product electronically. A third solution includes requiring the user to physically bring the one or more required portions of the gift card to the store to redeem the associated value. If unable to present the one or more required portions, the user might be compelled to report the card as lost or stolen and/or follow other predetermined steps. Alternatively, and especially if the gift card is intended to be redeemed through the Internet or another electronic network, each portion could optionally be imprinted with the required info so that the user could still use the card if the other portions have been misplaced or thrown-out. As another option, the required info could also be imprinted electronically on an associated computer-implemented device so that the losing of one or even all of the physical gift card pieces doesn't necessarily translate into a losing the gift card's value—particularly if computerized records show that gift card's value wasn't previously redeemed.

Addressing a separate yet related issue, piece sizes for a variety of additive manufacturing objects and related components can be manually adjusted—or even automatically adjusted via the additive manufacturing system (e.g., 100 and 300)—to comply with predetermined safety parameters. Similarly, notices can be imprinted on objects to warn of small part hazards to children and pets. From another perspective, electronic notices to senders and/or recipients may optionally be issued automatically if object segment sizes, shapes, and/or other features fail predetermined safety standards. Moreover, if preferred, select notices may be adapted to individual recipients. For instance, a woman living alone may avoid receiving a notice that a 3D printed object she wishes to print poses a choking hazard; however, an additive manufacturing system (e.g., 100 and 300) in a house with known toddlers may be programmed to always issue notices when at least one select safety parameter is exceeded. As well, the toddlers' parents may optionally be enabled to adjust the print settings (and/or notice settings) to better correlate with the particular user; for example, the father is always able to print objects of any size and shape, while his toddler daughter is only able to independently print objects that meet predetermined safety standards for children her age.

Figure 15:
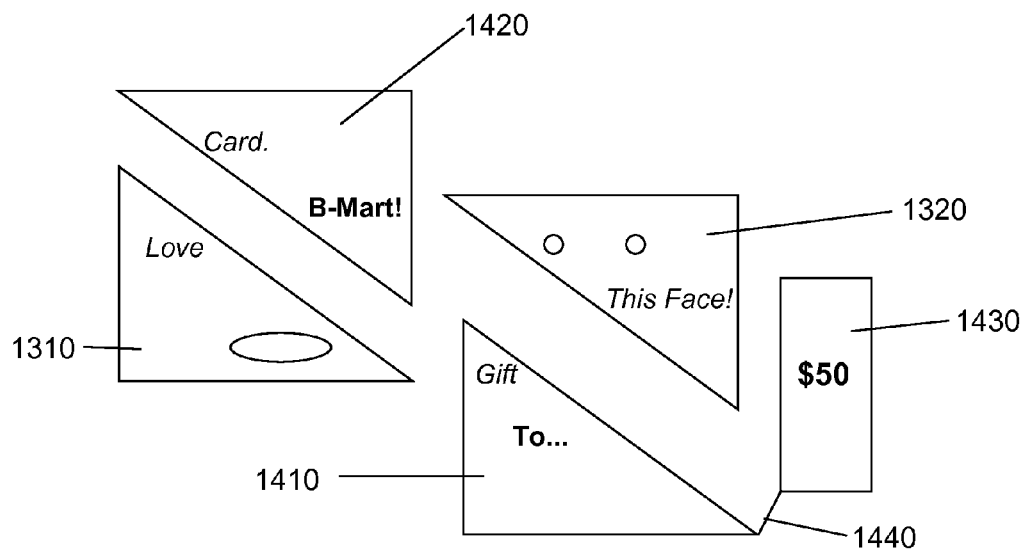
FIG. 15 illustrates the concurrent and/or successive building of multiple portions of multiple objects utilizing additive manufacturing machinery.

Building upon the prior examples, FIG. 15 demonstrates how multiple objects can be constructed with concurrent and/or successive builds so that the receiving party is further challenged to match individual portions with their respective objects. As an example, in a first build associated with FIG. 15, portions 1310 and 1420 are constructed on additive manufacturing machinery 150. In a second build portion 1320 is constructed—and in a third build portions 1410 and 1430 are constructed. Each portion can be constructed detached from the other portions and/or they can be affixed to one another through at least one attachment 1440—optionally similar to how pieces of a traditional, plastic model airplane kit often come attached to an overall plastic frame. The user is then tasked with matching these separate and/or separable portions to their respective objects as an entertainment challenge. Individual portions may match only one respective object—as is depicted in the FIG. 15 example. Conversely, portions may be configured to be joinable to multiple objects, leading to additional creative possibilities. Demonstrating the benefits of this latter variation, for example, additive manufacturing builds of plastic doll apparel can be attached to multiple figurines, with the clothing builds successively building upon one another so that a series of coats are built concurrently to follow a series of dresses built concurrently to follow a series of figurines built concurrently, giving a child the opportunity to match coats to dresses to figurines as desired or in adherence with a predetermined arrangement. Other variations are feasible for tasking the user with matching individual portions constructed consecutively and/or successively to their respective objects for correct assembly as a form of entertainment.

FIG. 15 may alternatively be configured to represent a single financial transaction product—with the numerous portions able to be joined to create a single two or three-dimensional object. In this example, multiple portions depicted reveal the amount of the gift card and/or multiple other portions reveal the businesses at which the product may be redeemed. Optionally, select portions revealing the amount may also reveal information about where the gift card may be redeemed.

As another puzzle-related example related to building concurrent and successive object portions, the design of as yet unprinted puzzle object portions are changed by the additive manufacturing system based on at least one associated input interface 110 that identifies the time it took the receiving party to join at least two prior portions of the puzzle object. For instance, puzzle portions about to be constructed are simplified after input sensors 110 identify prior portions as having been assembled more slowly by the user than a predetermined speed and/or more slowly than other previous pieces were assembled—indicating the user is having difficulty assembling the puzzle. In contrast, those puzzle portions are made more complex when prior portions were sensed as having been assembled more quickly. Teaching against the above, however, in certain embodiments, if two prior portions are sensed as having been assembled more quickly than a predetermined speed, the upcoming puzzle portions are changed so as to be easier to assemble—in this example creating an interactive game that rewards the user for speedy performances. For each of the above examples, in lieu of—or in addition to—changing the design of the unprinted puzzle portions, the speed of the printing of various puzzle pieces may be changed based on the same factors described.

In many of the above examples discussed, it's advantageous for the objects built in concurrent and/or successive portions to be at least partially unknown to the receiving party—or even fully unknown—as this helps to create suspense and excitement for the receiving party. At the same time, even if the objects are fully known by the receiving party (e.g., a puzzle specifically picked by that party), having the associated portions constructed separately—and, for instance, in a disordered state ready for assembly—creates its own form of pleasurable entertainment.

In another puzzle-related example, the puzzle object is comprised of multiple discrete puzzle pieces, and the puzzle object is correctly pre-assembled by the additive manufacturing system 100 in a first solved position. The user is then tasked with manually correctly re-assembling the multiple puzzle pieces into a second solved position as an entertainment challenge. Re-assembling the puzzle pieces into a second solved position may also reveal previously-hidden information to the user pertaining to a wager, financial transaction product, social occasion message, and/or other desired information.

Figure 16:
FIG. 16 is an example of building at least one additive manufacturing object in response to one or more computer-implemented queries such as trivia questions and/or educational questions.

FIG. 16 demonstrates that one or more additive manufacturing objects can be built in response to at least one receiving party's engaging of one or more computer-implemented queries. For example, if the receiving party responds correctly to ten trivia or educational questions, instead of—or in addition to—learning he responded right through an online message, a "first place ribbon" as pictured in FIG. 16 can be constructed on the receiving party's additive manufacturing machinery 150 to let the receiving party know he answered correctly. If he got nine questions correct, a "second place ribbon" could instead be constructed, and if he got two questions correct a "booby prize" trophy could instead be constructed. The object constructed therefore informs the receiving party how he fared responding to trivia and/or educational questions, while also (optionally) providing a surprise reward. The ribbon depicted in FIG. 16 can provide additional information about which questions the receiving party got right or, for instance, it can be paired with information provided on a computer-implemented display. In an alternative arrangement, in lieu of building a prize such as a ribbon or trophy, the object constructed could, for instance, comprise a revealing of information relating to the trivia or educational questions being displayed on at least one associated computer-implemented display. For instance, if a user is quizzed about who won the Heisman Trophy in 1963, once the user responds, in lieu of telling the user the right answer, a related statue of Roger Staubach in uniform is constructed on the user's additive manufacturing machinery 150. As these examples demonstrate, the suspense is often heightened if the object to be constructed in response to a query is at least partially unknown to the receiving party.

As an alternative to the above, an object constructed in response to computerized trivia and/or educational queries is configured to reveal through successive and/or concurrent discrete portions whether the receiving party responded correctly to at least selected queries, wherein at least one object portion constructed within a predetermined range of the completion of the additive manufacturing process reveals an award granted to the receiving party as a result of the receiving party's one or more responses to at least one query. Similarly, at least one object portion constructed within a predetermined range of the completion of the additive manufacturing process reveals an award granted to the receiving party as a result of the receiving party's response to at least one predetermined concluding query; for instance, if a user answers eight questions correctly and the desired trophy shown in FIG. 16 is partly built, the last two queries answered will determine whether the additive manufacturing machine will imprint a $1^{st}$, $2^{nd}$, or $3^{rd}$ place banner on the trophy being constructed.

Figure 17:
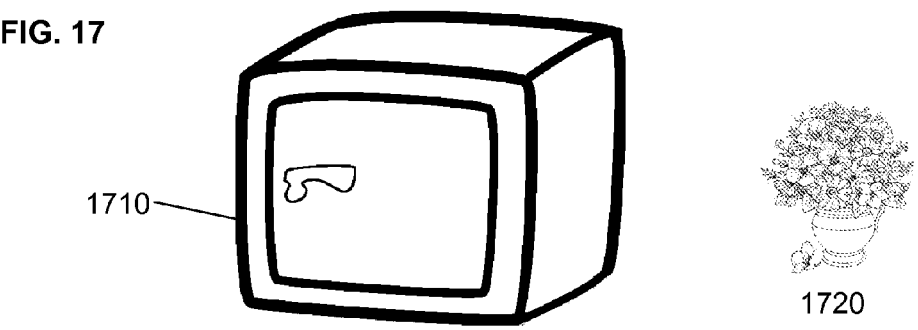
FIGS. 17 and 18 comprise examples associated with constructing locked and lockable objects utilizing additive manufacturing machinery.
Figure 18:
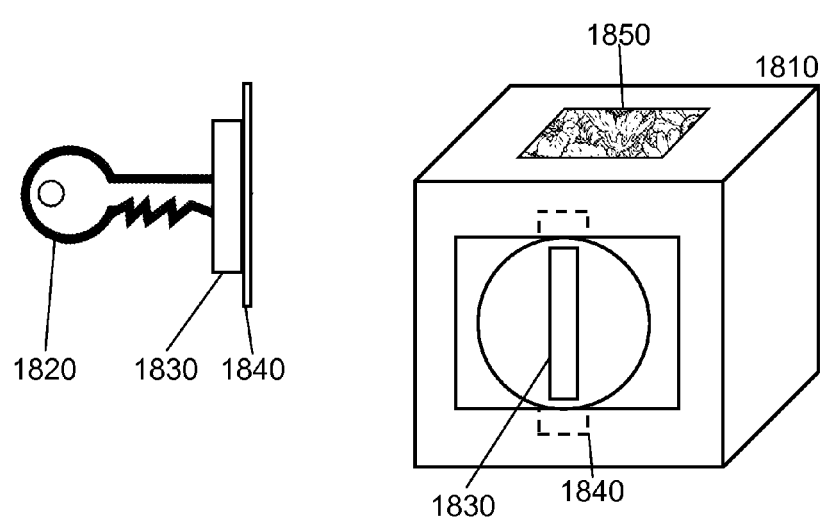

FIG. 17 and FIG. 18 show configurations for creating locked and lockable objects using additive manufacturing machinery 150. A lockable object is defined in this disclosure as an object constructed via additive manufacturing means that is able to be locked. A locked object is defined in this disclosure as the lockable object above that is further constructed by the system 100 in a locked configuration so that the receiving party constructing the object must first unlock the object to access one or more desired features; alternatively, the locked object constructed via additive manufacturing means may be constructed by a sending party or a third-party.

In FIG. 17, a locked "safe" object 1710 is constructed with a "vase" object 1720 hidden within it. (For patent application purposes, in FIG. 17 the unseen vase object 1720 hidden within the illustrated safe object 1710 is additionally shown outside the safe object 1710.) The receiving party then maneuvers an incorporated lock, combination, special lever, and/or other mechanism to unlock the "safe" object 1710 to view or otherwise gain access to the interior object 1720. Utilizing this configuration, the receiving party is able to be surprised by a hidden gift, such as an object or a message. Moreover, the receiving party is also entertained as a result of "unlocking" an outer object to get to an inner object or other content. For the same reason recipients derive pleasure from unwrapping paper to view a traditional gift, "unlocking" an additional manufacturing object to view a hidden gift likewise produces enjoyment.

FIG. 18 further demonstrates one way in which an object—such as the one depicted in FIG. 17—is configured in the locked position utilizing additive manufacturing machinery 150. In this example, a box 1810 is constructed in the locked position, and is to be opened with a key 1820. The key 1820 may be constructed on the same additive manufacturing machinery 150, different additive manufacturing machinery 150, and/or through traditional manufacturing (e.g., using subtractive technologies or injection molding). In either case, the key is inserted into a twistable opening 1830 within the box 1810. Turning that opening with the key 1820 then turns a simple lever 1840 that previously held the box's door shut. The door is then opened and the inner object or other content is accessed. In FIG. 18, an optional viewing area 1850 is shown. This viewing area reveals at least part of the (inaccessible) surprise to the receiving party prior to opening the locked object.

FIGS. 19A, 19B, 19C, 20A, 20B, 20C, and 20D jointly illustrate additional examples related to locked and lockable objects constructed utilizing additive manufacturing machinery. In particular, examples related to financial transaction products, coupons, and a variety of games and contests are depicted.

Figure 19A:
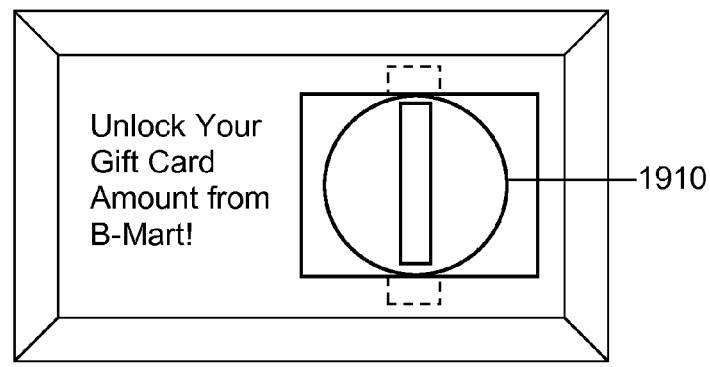
FIGS. 19A, 19B, 19C, 20A, 20B, 20C, and 20D jointly illustrate additional examples related to locked and lockable objects constructed with additive manufacturing machinery, especially in relation to financial transaction products, coupons, and a variety of games and contests. Financial transaction products are defined in this disclosure as comprising at least one of the following: gift cards, credit cards, debit cards, refillable financial cards, and prepaid cards.

FIG. 19A demonstrates a financial transaction product that includes a similar locking mechanism as that shown in FIG. 18, with the previously-described key 1820 able to be inserted into FIG. 19A's locking mechanism 1910. The FIG. 19A object may be constructed in a locked or unlocked position. If the sender is constructing the object, the sender might optionally prefer to construct the object in the unlocked position, so the sender can manually lock the object after verifying the accuracy of the object's inner content. A third-party might optionally prefer a similar arrangement. In contrast, if the receiving party is constructing the object on the receiving party's additive manufacturing machinery 150—perhaps as a gift from another party— to surprise the receiving party in many cases it is more advantageous to have the object built in the locked position.

As with the other lockable products described in this disclosure, the locked objects depicted in FIGS. 18 and 19A can include a very simplified lever lock or, for example, a slightly more complex ward lock utilizing notched keys. Alternatively, for instance, the additive manufacturing object can include a lock with a tubular key or magnetic key, or even a pin-and-tumbler design. To demonstrate one example relating to FIG. 18, the manufacturing machinery 150 can apply magnetic material to a front gate's lock lever 1840 under construction. In the locked position, this magnetized lever 1840 is positioned to keep the gate shut in the FIG. 18 container 1810. When a magnetic key is inserted into the opening 1830 associated with the front gate of the container 1810, the magnetic force of the key causes the magnetized lever 1840 to shift through magnetic attraction (or repellence), the front gate is unlocked, opened, and the inner contents are revealed. Alternatively, an even simpler magnetic key could simply attract the unhinged end of the gate, with the force of the key overcoming the force of an opposing latch designed by the additive manufacturing machinery 150. Many other variations are feasible. For further common-knowledge explanations about how key locks work, see these web pages, which are incorporated by reference as though fully set forth herein: www.en.wikipedia.org/wiki/Warded_lock, www.en.wikipedia.org/wiki/Skeleton_key, and www.en.wikipedia.org/wiki/Key_(lock).

Figure 19B:
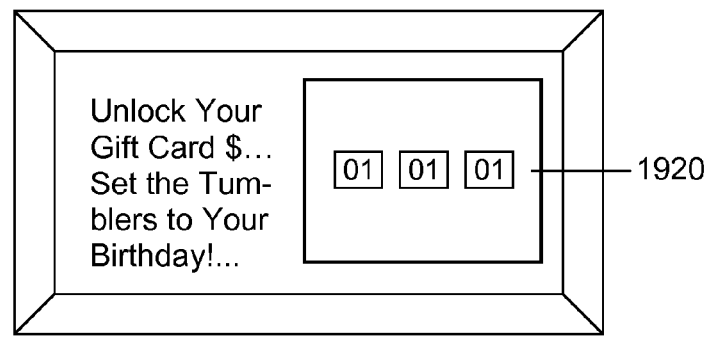

In lieu of utilizing a key, FIG. 19B shows the same financial transaction product incorporating a combination lock 1920 to secure the inner content. The combination lock 1920 produced via additive manufacturing machinery 150 can include, for instance, at least one cam, spring, spindle, fence, drive pin, wheel notch, and/or wheel fly—depending upon whether it's a single-dial lock, a multiple-dial lock, or another design. For further common-knowledge explanations about how combination locks work, see the information on the following web pages, which are incorporated by reference as though fully set forth herein: www.home.howstuffworks.com/home-improvement/household-safety/security/inside-lock.htm, www.home.howstuffworks.com/home-improvement/household-safety/security/combination-lock.htm, and www.en.wikipedia.org/wiki/Combination_lock. Furthermore, since the lock is often intended for entertainment purposes and not necessarily mainly for security, the inner workings of the combination lock can be greatly simplified when produced using additive manufacturing machinery 150. For example, a turning of the numbered dials depicted in FIG. 19B could comprise a turning of three simple and small rotating disks that include notches. The teeth on a corresponding inner pin then hooks into those notches when the disks are rotated to the correct numbers (or letters). This "multiple-dial lock" action then allows the shifting of a latch, enabling the gate to be swung open and the previously-concealed gift card information viewed. Alternatively, the turning of the dials in an example similar to FIG. 19B could comprise a turning of one or more simple screw locks; this unscrewing action likewise allows the gate that concealed the gift card information to be opened. This latter example is similar to the design of an adjustable wrench, only the screwing action in the gift card example is intended to reveal information and/or entertain rather than be applied to home or commercial maintenance.

Figure 19C:
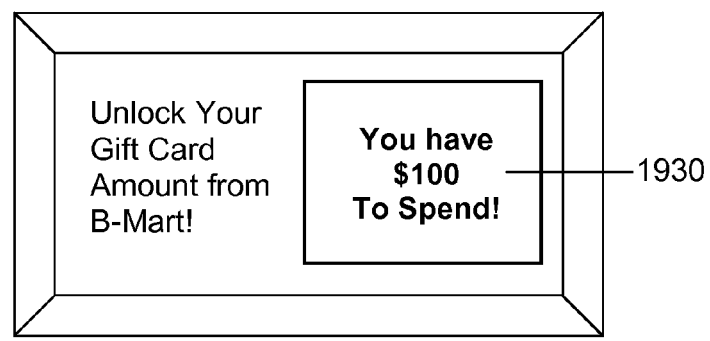

FIG. 19C shows the inner content of the financial transaction products pictured in FIGS. 19A and 19B. In FIG. 19C, the prior diagrams' lock(s) has been opened, revealing the amount gifted 1930 to the recipient.

Additive manufacturing machinery 150 can be used in another innovative way in relation to constructing financial transaction products. When a traditional financial transaction product such as a debit card is "refilled," the same card is often linked to a computerized system that recognizes the refilled card as having a new, updated value. The card itself may also (or instead) be embedded with new electronic data recording that updated value. Yet the traditional card's design remains mostly or even wholly unchanged after the refill process. In contrast, producing a financial transaction product on an additive manufacturing system (100 and 300) as described in this disclosure allows for new configurations. For example, the "refilled" additive manufacturing financial transaction product can easily be replaced with a different card or other financial transaction product manufactured on the user's machinery 150. Alternatively, an additional piece could be constructed via the retailer or user's machinery 150 that the user then affixes to the old card or other financial transaction product, as can be inferred via the FIG. 14 diagram. As another option, the old financial product could be augmented with additional material by, for instance, placing the product back in the retailer or user's additive manufacturing machinery 150. The newly-added material could comprise a design change and/or it can comprise a change in the shape and/or function of the product. When adding new material to change the function of the "old" financial transaction product, the "refilled" product can, for instance, include a new or transformed puzzle, game, toy, and/or contest. The refilling process can even be configured to lead to the additive manufacturing construction of associated collectable toys or other products that might otherwise be unattainable—making refilling especially attractive to select users. As the above examples demonstrate, refilling a financial transaction product via various additive manufacturing processes is able to change the design and/or function of the previously-constructed financial transaction product in multiple innovative ways.

Figure 20A:
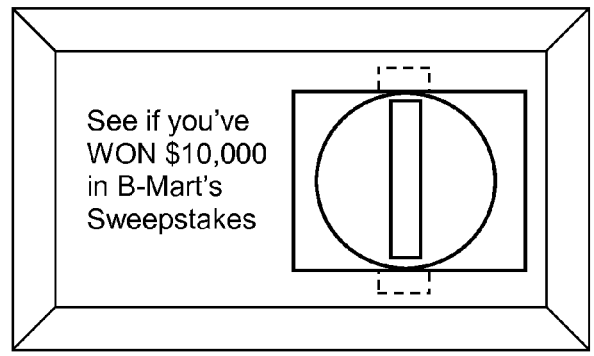

Addressing additional configurations, FIG. 20A demonstrates how the same locked object can be constructed in association with a contest, such as a sweepstakes. In this example, the user's unlocking the object reveals whether he or she won a prize.

Figure 20B:
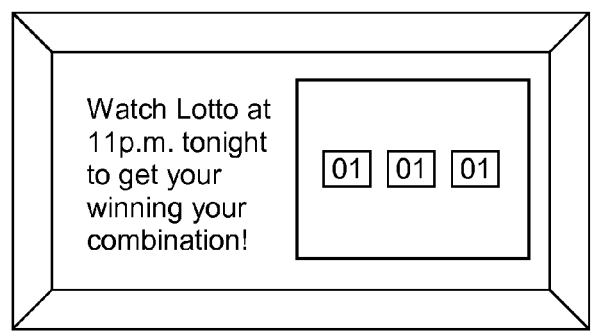

FIG. 20B similarly shows how the same locked object is constructed in association with a lottery. In this example, the 11 p.m. lottery program could even inform the recipient of the necessary one or more combination numbers needed to open his or her "ticket." After opening that ticket, additional information is then revealed to the recipient. That additional information may, for instance, reveal if the recipient had won a prize. Or that additional information might include lottery numbers which the user then matches with an accompanying media presentation to see if they've won a prize. Conversely, the combination numbers might themselves double as lottery numbers, with the maneuvering of combination numbers into a predetermined configuration revealing whether the recipient wins a prize. Other variations are also feasible.

Figure 20C:

FIG. 20C shows the locked objects described above being used for a promotion such as a coupon, wherein unlocking the object reveals a coupon level 2010.

Figure 20D:
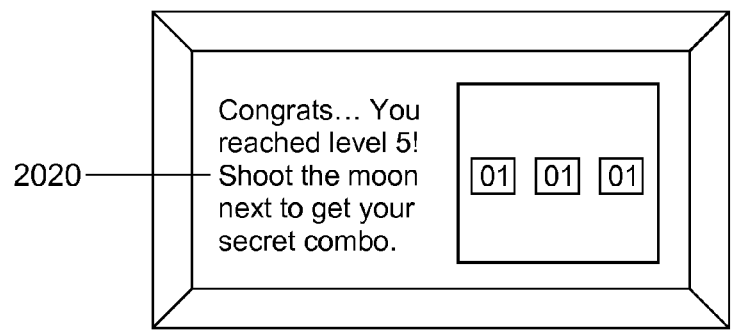

FIG. 20D teaches constructing a locked object as a reward for the user's reaching a predetermined point in a computerized game or other program. Following the locked object's instructions 2020, in this particular example the user further interacts with the computerized game to obtain the necessary information to unlock the locked object—though in other instances this step can be skipped or modified. Unlocking the object optionally further helps the user advance in the game or otherwise provides a reward.

As a variation to the above-described lockable and locked objects, multiple lockable and/or locked objects can be combined for entertainment and other purposes. For instance, a single locked object might include partial information hidden within; combining similar partial information from multiple coordinated locked objects then reveals whether the recipient has won a contest or the nature of a gift received. Alternatively, one locked object might contain a key, combination, and/or other information that enables the recipient to unlock additional locked objects—potentially leading to a chain of advancing surprises. On another subject relating to locked objects, a first user is authorized to construct a first locked object on the first user's additive manufacturing machinery 150; a second user, in turn, is then authorized to construct a key on the second user's additive manufacturing machinery 150, the second user's key configured to open the first locked object constructed by the first user. In this example, the first user is therefore at least partially dependent upon at least one other party to open the locked object. Building upon this, multiple second users can be authorized to construct keys or otherwise obtain the means to open the first user's object—or even multiple first users' objects. On a related subject, providing the means for the recipient to unlock a locked object might be associated with at least one party's first completing at least one physical, mental, and/or emotional action.

Figure 21:
FIG. 21 illustrates one way in which to conceal from the receiving party at least part of an additive manufacturing object under construction.

FIG. 21 demonstrates one example of how an object—including a locked object—can be built on the receiving party's additive manufacturing machine 150 without revealing at least a portion of the object's "surprise" content to the receiving party. The goal is to help keep surprises hidden from the recipient's view during construction. In the FIG. 21 example, assuming the user can see at least a portion of the object under construction by viewing the machinery 150 in action, the construction of the unfinished object 2110 is at least partially hidden by at least one barrier 2120 configured primarily or even specifically to conceal the object from the receiving party. This at least one barrier 2120 is likewise constructed by the additive manufacturing machinery 150. In the FIG. 21 example, prior to erecting the barrier 2120, the receiving party only had a limited sight of the object (from the left side), so that the barrier 2120 built was able to hide from view the interior of the object under construction. In alternative examples, multiple walls (and/or ceilings) can be built on multiple planes to conceal the one or more objects under construction. Moreover, the concealing one or more barriers can be modified to adapt to an individual 3D printer's design—as printers have differing apertures. The at least one barrier 2120 can be constructed of temporary and/or of permanent additive manufacturing materials. As an alternative "barrier" option, at least one outer portion (e.g., an outer wall) of an additive manufacturing object can be created to hide the object's "surprise" inner portion from the receiving party's view prior to construction of the inner portion. As a result, for instance, key portions of the locked box 1710 shown in the FIG. 17 example can be constructed by the machinery 150 prior to the machinery's 150 returning to create the inner content 1720, the building of which is then at least partially hidden by the now-constructed outer container 1710. The above methods of hiding at least portions of objects under construction can be applied to the gift cards shown in FIGS. 19A, 19B, and 19C—as well as to other additive manufacturing objects bearing surprises.

Instead of preserving a surprise, the barrier(s) erected for financial transaction products may be constructed from additive manufacturing material to prevent unauthorized access to the financial transaction product during at least a portion of the product's build process, with those barrier(s) removable following completion of at least a portion of the financial transaction product's construction. This surrounding or otherwise physically protecting of the financial transaction product during the construction process should enhance security for gift cards constructed at retailers and at users' homes. Moreover, to further increase security, construction of the financial transaction product can optionally be halted should the additive manufacturing system 100's at least one input sensor 110 detect an unauthorized attempt to remove the barrier(s) during at least a portion of the gift card's construction process.

In addition to the FIG. 21 example, in select instances, the additive manufacturing machinery 150 can itself be configured so that the receiving party doesn't see the object until the object is complete, with the machinery 150 optionally designed to keep all or only select objects from view. For instance, if the additive manufacturing system 100 is configured to inform the machinery 150 that one or more objects being constructed are surprises for the receiving party, the receiving party's machinery can physically close from view at least a portion of the construction area. For example, at least one outer gate can be erected, one or more machine barriers within the construction area can be raised, lighting can be altered, and/or other physical actions can be taken.

Figure 22:
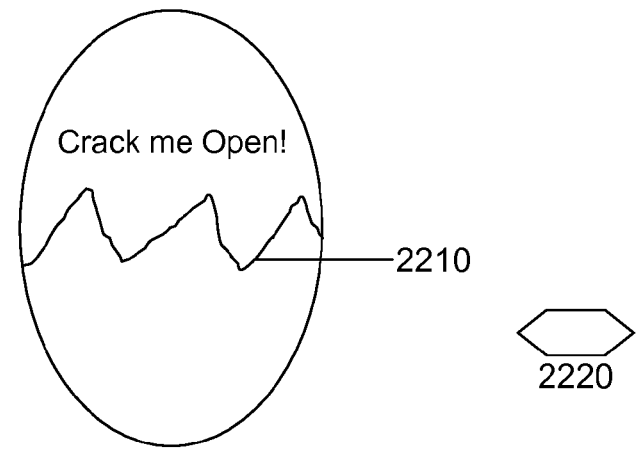
FIG. 22 comprises an example of an additive manufacturing object designed to be breakable, the object further designed to contain a hidden object or other content that is also (optionally) constructed utilizing additive manufacturing machinery.

Instead of depicting a locked or lockable object, FIG. 22 shows an object constructed to be deliberately-breakable. Although many other object designs are feasible, FIG. 22 represents an egg with an intentionally-weakened joint in the center 2210. Pulling or twisting or otherwise breaking this perforated or otherwise weakened joint then "opens" the egg, revealing a previously-hidden gemstone gift 2220 that had been concealed inside as part of the construction process. Instead of an egg, the object to be broken can comprise, for example, a piggy bank with a hidden treasure; or the object can be a piñata bearing edible surprises, financial transaction products, coupons, and/or other gifts for the recipient. For instance, a piñata created via additive manufacturing means can be constructed along with a stick that is then used to break-open the piñata, revealing the inner content. As with the other surprise-oriented objects constructed via additive manufacturing machinery 150, these deliberately-breakable objects can likewise optionally be constructed utilizing one or more barriers 2120 so that the inner content remains hidden from the recipient's view during the construction process. Similarly, in these examples the barrier 2120 can be the "eggshell" or piñata itself, with the inner surprise content constructed after at least a portion of the eggshell or piñata has been successfully constructed. Furthermore, these deliberately-breakable objects can comprise contests, lottery tickets, promotions, and/or they can help users to advance play in an associated computerized game. Finally, in lieu of—or in addition to—comprising separate objects, the breakable object's inner content can include information, designs, and/or functional elements.

Figure 23A:
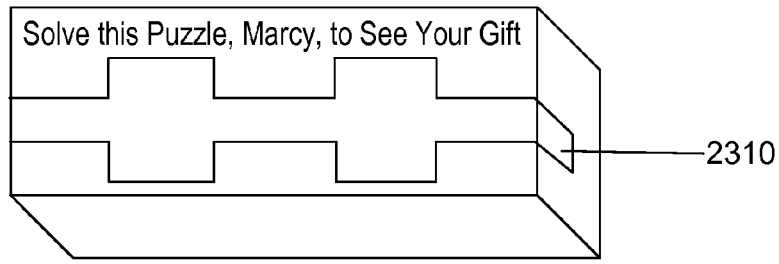
FIGS. 23A, 23B, 24A, and 24B illustrate examples of financial transaction products designed as various puzzle objects utilizing additive manufacturing machinery.
Figure 23B:
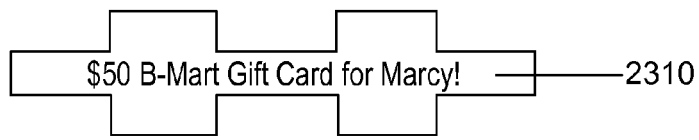

FIGS. 23A and 23B jointly represent an example of a puzzle object constructed via additive manufacturing machinery 150 to surprise the receiving party. In FIG. 23A, a financial transaction product is constructed into the unsolved puzzle object on the receiving party's additive manufacturing machinery 150. This same product can be manufactured on a sender or third-party's additive manufacturing machinery 150, and can optionally be manufactured in a solved position so these latter two parties can view the associated financial product information before maneuvering the object into the unsolved position shown in FIG. 23A.

The receiving party is then prompted to solve the unsolved puzzle gift to learn, for instance, the amount of the financial transaction product, the type of goods and/or services the product can purchase, and/or the identity of the sender. The object depicted in FIGS. 23A and 23B is a mechanical puzzle, and may further be specified as an interlocking puzzle. Other variations are likewise feasible, including assembly puzzles, disassembly puzzles, disentanglement puzzles, fold puzzles, dexterity puzzles, sequential movement puzzles, and/or other puzzle objects. Once the FIG. 23A mechanical puzzle is solved, the user sees that the piece 2310 shown in the unsolved puzzle includes a message on a previously-hidden portion. This message reveals the amount of the financial transaction product and where it can be redeemed. Other information can likewise be embedded in this and other financial transaction product puzzles, including, for instance, birthday messages, usage terms, bar codes, the identity of the sender, and/or the type of goods and/or services that can be purchased. Moreover, information pertaining to the financial transaction product can optionally be included on both solved and unsolved facets of the puzzle. As well, a hint or full solution to the puzzle object can be provided if the user encounters trouble, enabling the user to access the financial transaction product even if he or she is unable to solve the puzzle without assistance. Furthermore, the financial transaction product included within the puzzle can be an unusual shape (as is pictured in FIG. 23B), or that product can be shaped more like a traditional gift card that is then embedded into a mechanical or other puzzle in one or more challenging ways. In this latter example, the financial transaction card can be used in a novel manner while still retaining much of the shape and convenience of a traditional gift card. Along the same lines, a traditionally-shaped financial transaction card can be attached or built-in to an unusually-shaped non-puzzle object, such as those objects illustrated in FIGS. 11B and 16.

Figure 24A:
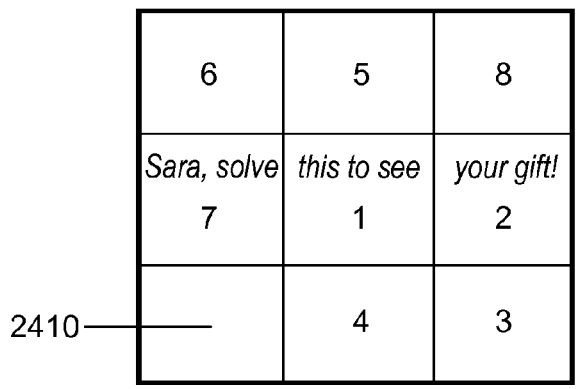
Figure 24B:
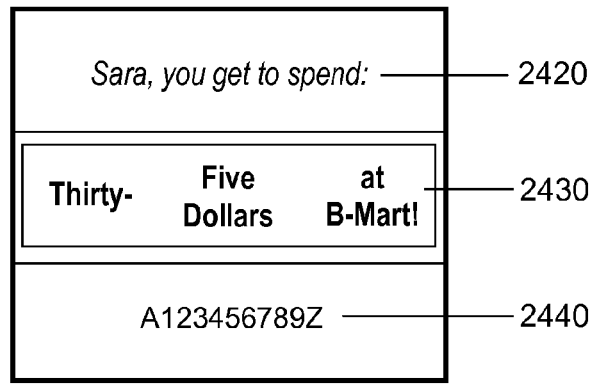

FIGS. 24A and 24B jointly represent an example of a sliding puzzle object constructed via additive manufacturing machinery 150 and utilized as a financial transaction product. In FIG. 24A, eight of the nine regions of the puzzle have embedded tiles with numbers. The ninth region 2410 is an empty space into which another tile is maneuvered as the user works to solve the sliding puzzle—causing the empty space to shift within the puzzle's framework. In this example, the user is tasked with positioning the eight tiles into the correct numerical order on the puzzle's face, from lowest to highest, with the number "1" eventually situated in the upper-left corner and the empty space finally situated in the lower-right corner. Once this sliding puzzle is solved, the user views the reverse side shown in the FIG. 24B example to see the amount of the financial transaction product and the identity of the retailer in the included window 2430. Above that information is an example of a personalized message 2420 and below that information is a depiction of an identification mark 2440 to assist in the redemption of the financial transaction product. Other variations are also feasible such as, for example, revealing the sender's identity in the included window 2430, revealing various gift card details on the tile side (before and/or as a result of solving the puzzle), or hiding the window's 2430 information displayed until all the tiles are placed in the correct order and a related mechanism is activated. As well, other single puzzle objects that include multiple elements may be substituted for the sliding puzzle.

Note that the puzzles depicted in FIGS. 23A, 23B, 24A, and 24B are all constructed with movable elements, wherein the movable elements are able to be manipulated by the recipient to disclose information associated with financial transaction products. As well, the FIG. 24A object is constructed as a single object with connected elements, with the receiving party tasked with manipulating elements of this single object to reveal a surprise. In turn, FIG. 23A is constructed so that the receiving party is tasked with disassembling the multiple separable portions of the single object to enable the disclosure of desired information.

FIGS. 25A and 25B jointly represent the same puzzle object depicted by FIGS. 23A and 23B—only FIGS. 25A and 25B demonstrate the embedding of at least one lottery feature into the object. In the FIG. 25A unsolved puzzle object example constructed via additive manufacturing machinery 150, an embedded puzzle piece 2510 is removed by the user upon solving the puzzle. This removal reveals the user has won a lottery's instant prize. In other variations, FIGS. 25A and 25B comprise part of a contest, coupon, promotion, and/or different wagering product, with the solving of the puzzle revealing the associated desired information.

FIGS. 26A and 26B jointly represent still another way to construct and utilize a three-dimensional wagering object via additive manufacturing. In this example, the object is a Rubik's cube or other "twisty puzzle" toy. The receiving party's additive manufacturing machinery 150 constructs the twisty puzzle object (or other puzzle) in the unsolved position, as is shown by FIG. 26A. That same constructed object tells the user her lottery numbers are embedded into the puzzle, and that the drawing for the winning numbers will be held that night at 11 p.m. Additional and/or alternative information can be included. In turn, portions of the lottery numbers can be depicted on multiple sides of the unsolved puzzle. The user then solves this puzzle example by "twisting" the cubed components and eventually placing all colors, numbers, and/or other information in their correct positions. For instance, when each side of the puzzle cube displays solely one color coupled with a particular pattern, the receiving party's lottery numbers also become displayed in the correct order. The numbers may be displayed on one side, as is demonstrated by the simplified FIG. 26B solved puzzle example, or they may be displayed on multiple sides of the solved puzzle. (Information displayed on the front face of the FIG. 26A example but not in FIG. 26B might optionally be displayed on other facets of the solved puzzle, and might even include "decoy" numbers.) The user can then match the revealed lottery numbers found in FIG. 26B to the numbers picked at the upcoming drawing. In lieu of applying this puzzle to a lottery, the twisty puzzle constructed in the unsolved position via additive manufacturing machinery 150 can instead comprise part of a wager, contest, coupon, and/or promotion. Solving the twisty puzzle then reveals the user's reward and/or other information. Or the puzzle can comprise a social occasion message, wherein the twisty puzzle is constructed in the unsolved position as a greeting card object. Solving the twisty puzzle then reveals the at least one message. Moreover, as mentioned in a prior financial transaction product example, the user can be permitted to gain access to puzzle solutions if he runs into difficulty solving the puzzle on his own; similarly, the user can be provided a way to completely bypass having to solve the puzzle if so desired. For instance, a bar code imprinted on the unsolved FIG. 26A object could be scanned by the user's smartphone to reveal the corresponding "Megaball" numbers prior to the upcoming lottery drawing.

FIGS. 27A, 27B, 27C, 27D, and 28 represent a variety of ways to construct indicia at least partially within—and very often entirely within—an unfinished object's interior using at least one additive manufacturing material during the additive manufacturing process. These "interior indicia" examples are constructed primarily on at least one exposed interior surface of the unfinished object using at least one additive manufacturing system 100. (As well, select temporarily-viewable indicia may instead be built on an unfinished exterior surface prior to being concealed by more additive manufacturing material.) In the illustrated examples, the indicia are depicted delivering visual messages to the receiving party while the object is being constructed on that party's additive manufacturing machinery 150. The indicia may alternatively be built on a sending party or third-party's additive manufacturing machinery 150, with the messages or other indicia constructed as appropriate for the sending, receiving, and/or third parties. As the following five illustrations demonstrate, all, most, or portions of the interior indicia are not visible on the finished object's exterior, making them temporary and/or "temporarily-viewable indicia" constructed and visible to the user during at least a portion of the object's build process to temporarily entertain and/or inform that user. In these examples, the indicia are constructed via additive manufacturing means as an integrated part of an object's build process.

Figure 27A:
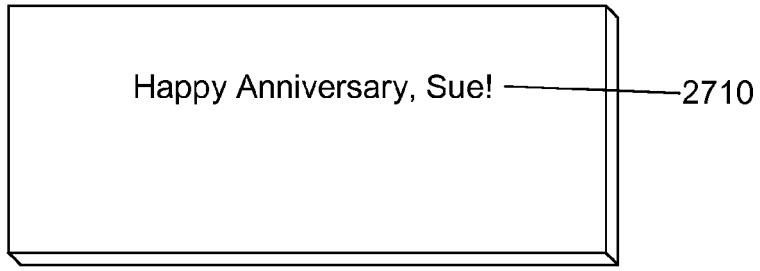

FIG. 27A shows a social occasion message 2710 comprised of text being constructed on the exposed interior surface of an object for view by the receiving party as the associated object is simultaneously being constructed via additive manufacturing means. This additive manufacturing system (e.g., 100 and 300) instructs the associated machinery (e.g., 150 and 395) to create indicia by utilizing at least one different color, build pattern, and/or build material than select adjacent region(s) of the object, thereby allowing the user to discern the indicia. The indicia may also optionally be created by constructing at least one empty cavity within the exposed interior surface of the object.

Figure 27B:
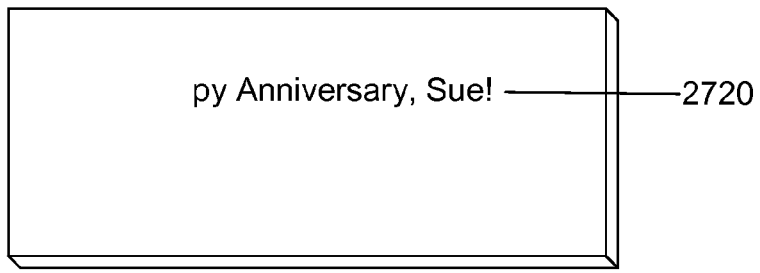

FIG. 27B illustrates a next layer being applied 2720 that then begins to erase the prior message, showing how interior indicia can optionally be made invisible to the user during at least a portion of the build process. This particular diagram is intended to demonstrate that messages and other temporarily-viewable indicia can be created, altered, and/or erased in a variety of ways to entertain and surprise users as object layers are added during the additive manufacturing process.

Figure 27C:
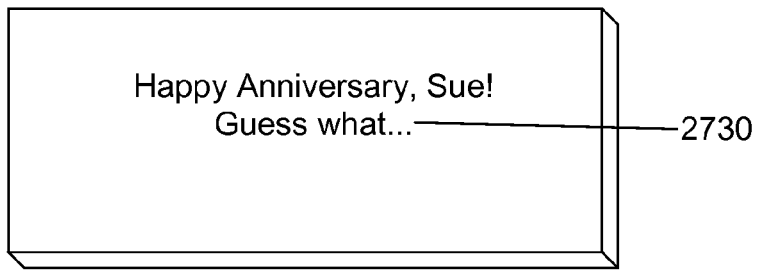

FIG. 27C demonstrates a way in which to supplement previously-constructed interior indicia. After the first message 2710 was constructed in FIG. 27A, in FIG. 27C the additive manufacturing machinery 150 then adds a second portion 2730 of the message to further engage the receiving party.

Figure 27D:
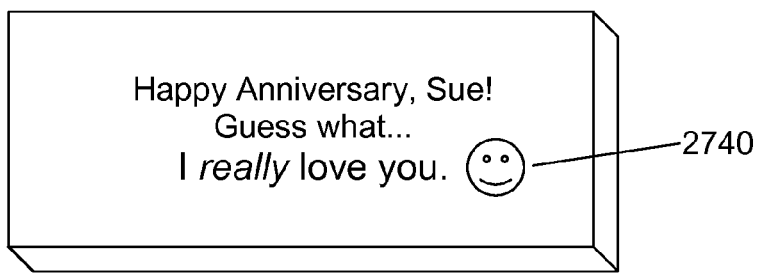

In FIG. 27D, a third portion 2740 of the message is added, with this third portion comprised in part of imagery. Note that each of these follow-up message portions can be constructed utilizing the same additive layer that was used to create the initial FIG. 27A message—and/or each follow-up portion of the message can be constructed on a new and separate additive layer, with the older portions of the same message optionally reprinted on the new layer. Alternatively, for instance, the older portions of the same message can continue to appear on one or more still-visible older layers. As another variation, instead of comprising portions of the same message, the new layers can present entirely distinct messages. Furthermore, the indicia illustrated in the various FIG. 27 diagrams can be constructed on consecutive additive layers and/or they can be built on non-consecutive layers. No matter the preferred build pattern, these examples demonstrate that differing temporarily-visible indicia can be presented successively to create a changing presentation on at least one unfinished surface of the object under construction—with a portion of the changing indicia optionally made into permanently visible indicia after the object's construction is complete.

Figure 28:

FIG. 28 is intended to show that a different build pattern—rather than a contrasting color or material—can be used to construct the interior indicia 2810. The indicia may be two-dimensional; or it may be three-dimensional for an enhanced effect. If the temporarily-viewable indicia is at least mainly three-dimensional, additive layers representing the interior indicia can optionally be built prior to (or after) construction of the same layers of adjoining regions of the object, allowing the interior message to be viewed prominently. Moreover, the three-dimensional messages can even be created at non-horizontal angles for enhanced viewing. While utilizing contrasting colors or build materials to construct indicia might in many cases make it easier for the user to visually discern the interior indicia, instead utilizing at least one different build pattern to construct the interior indicia has the advantage of not necessarily requiring additional materials than one might desire to use when constructing an additive manufacturing object.

Figure 29A:
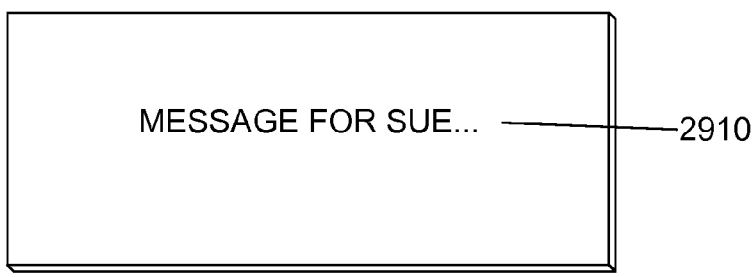
Figure 29B:
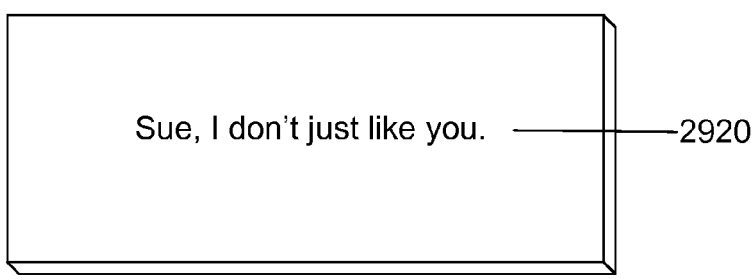
Figure 29C:
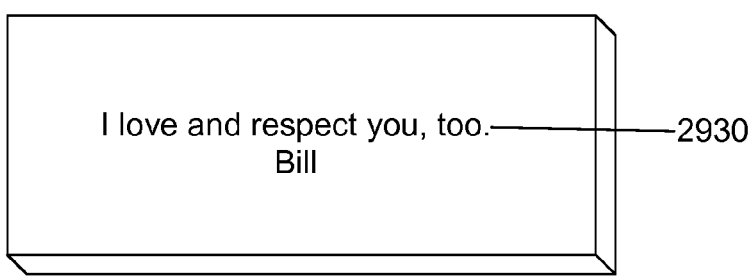

FIGS. 29A, 29B, 29C, 29D, and 29E further jointly illustrate utilizing temporarily-viewable indicia to surprise and/or entertain users. Each of these illustrations includes a message delivered one at a time to the receiving party. FIG. 29A alerts 2910 the receiving party that a message is forthcoming. FIG. 29B overwrites the prior alert 2910 and delivers a first personal message 2920. FIG. 29C overwrites the first message 2920 and delivers a second temporarily-visible message 2930.

Figure 29D:
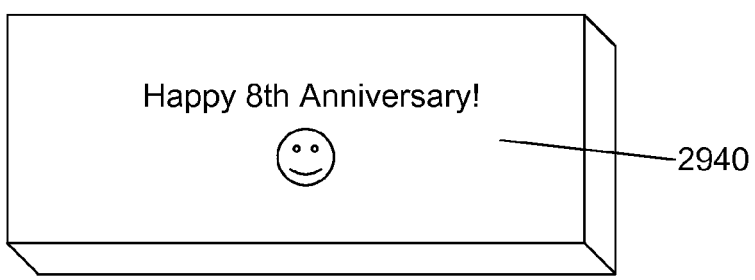
Figure 29E:
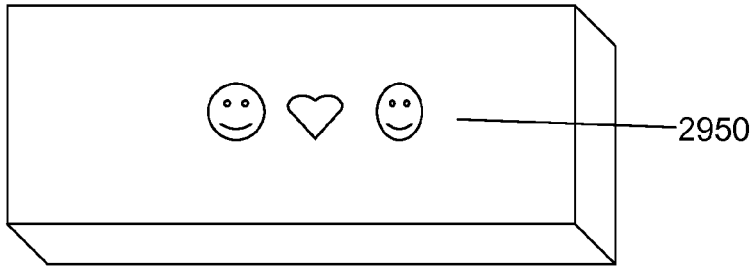

FIG. 29D overwrites the second message 2930 and delivers a third message 2940. And, finally, FIG. 29E overwrites the third message 2940 and delivers a fourth message 2950. As FIG. 29E demonstrates, in lieu of written messages, indicia can display changing designs, so that the smiling face of the sending party 2940 depicted in FIG. 29D is shifted and joined in FIG. 29E by a heart coupled with the face of the receiving party 2950. In a variation to the above, note that changing messages—or portions of messages—can be sent from and/or to multiple parties, with a message from a sending party, for instance, succeeding a message from a third-party vendor. These same messages from various parties can interact with one another to entertain the recipient.

As well, the temporarily-viewable indicia can optionally be printed only when input interface 110 sensors confirm the receiving party is watching the printing process and/or the receiving party is within a predetermined proximity of the machinery 150; similarly, in select cases the temporarily-viewable indicia is optionally saved for imprinting on future objects when the receiving party is confirmed as present and/or watching. In addition, this series of five FIG. 29 diagrams can be constructed on a sending party or third-party's additive manufacturing machinery 150, with the messages constructed as appropriate for the intended audience. As with the other interior indicia examples, the interior messages and other indicia can even comprise advertising geared as appropriate to the relevant user, instructions associated with using the object under construction, and/or text messages (e.g., SMS and MMS). Furthermore, by combining several of this inventor's interior indicia examples with this inventor's previously-described reimbursement embodiments, the sending and/or third-parties may, for instance, reimburse the receiving party for at least a portion of material costs incurred to construct an object—and/or object IP licensing costs—by enabling the receiving party (and/or a sending party) to watch "temporary advertising" constructed on at least one exposed interior surface of an unfinished object and visible during at least a portion of that object's build process.

Demonstrating another manner in which to utilize interior indicia constructed via additive manufacturing machinery 150, FIGS. 30 and 31 portray imagery of a person singing. The initial interior indicia depicted in FIG. 30 shows the person with a microphone in hand. The changed imagery depicted in FIG. 31 then shows the same person singing, wherein musical notes 3110 representing the singing are now imprinted via the additive manufacturing process. Moreover, all the musical notes 3110 can be added simultaneously—or the notes 3110 can be added by the machinery 150 in a more staggered manner, one at a time, to simulate the dynamics of singing. As well, new musical notes 3110 are easily imprinted atop prior notes 3110 to show additional "singing." To further engage the user via this temporarily-viewable indicia, the portrayed performer's arms and legs may also appear to "move" as new material layers are added to the object under construction.

Similar to the above two diagrams, the two interior layers of the object depicted in FIG. 32 show facial imagery changing from a first expression 3210 to a second expression 3220 as more additive manufacturing material is dispensed. As still more material is dispensed, a nose, hair, ears, and/or other facial features can be added, modified, and/or removed.

Collectively, FIGS. 30, 31, and 32 demonstrate how dynamically-changing imagery of any kind can be built onto the exposed interior surfaces of objects under construction via additive manufacturing machinery 150. This dynamic imagery serves to inform and/or entertain the receiving party, the sending party, and/or even a third-party. That imagery can deliver a message, a surprise, a story, and even dynamic advertising.

For each of the interior indicia examples described so far in this patent disclosure, the indicia can be displayed on the exposed interior surfaces of an unfinished object—with the indicia disappearing from view once the object's construction is finished. Conversely, at least a portion of the interior indicia might remain visible to users once the object is complete. In this latter case, and using FIGS. 27A, 27C, and 27D as examples, once the last layer of the object is built, only "Happy Anniversary, Sue!" might still show on the exterior layer, while the other two message portions (shown in FIG. 27D) are hidden from view by exterior layers of additive manufacturing materials.

FIGS. 33A, 33B, 33C, 33D, 34A, 34B, 34C, and 35 jointly show how interior indicia can help form useful identification marks at least partially within—and very often entirely within—the interior of objects built via the additive manufacturing process.

Figure 33A:
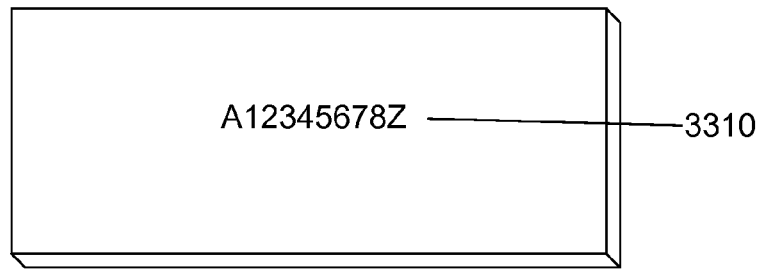
FIGS. 33A, 33B, 33C, 33D, 34A, 34B, 34C, 35, 36A, 36B, 36C, 37, and 38 illustrate a variety of examples specifically related to constructing identification marks at least partially within—and very often completely within—an additive manufacturing object's interior.

FIG. 33A shows a basic identification mark 3310 embedded into the interior of an object being constructed utilizing an additive manufacturing system 100. As with the prior interior indicia described, the identification mark 3310 in FIG. 33A is comprised of at least one different color, build material, and/or build pattern than select adjacent regions of the object. Alternatively—and as with the other interior indicia examples discussed in this disclosure—the identification mark 3310 may be comprised of at least one permanent empty cavity built into the interior of the object during the additive manufacturing process. (As such, the previously-discussed FIG. 28 can in this context be construed to instead represent an empty three-dimensional cavity comprising indicia embedded within an object.) As another option, the various constructed interior indicia may be comprised of at least one ingredient that is part of the prefinishing phase of the additive manufacturing process, including unfused granulars, unhardened polymers, support materials, and/or other materials customarily utilized. These prefinishing phase ingredients may optionally even be placed within the above-described at least one empty cavity to comprise the indicia.

If the identification mark 3310 in FIG. 33A is unseen from the finished object's exterior, in select instances it may be designed to be retrieved solely by destructive means such as breaking at least a portion of the object; in other instances, the identification can also—or instead—be retrieved by non-destructive means, including, for instance, ultrasound, x-rays, infrared imagery, and/or radio-frequency identification. Conversely, if the FIG. 33A identification mark 3310 is designed to also be displayed on the object's exterior, in one example that mark 3310 may optionally be designed to be displayed in a different manner on the exterior than in the object's interior, thereby distinguishing the interior and exterior versions of the mark 3310.

Figure 33B:
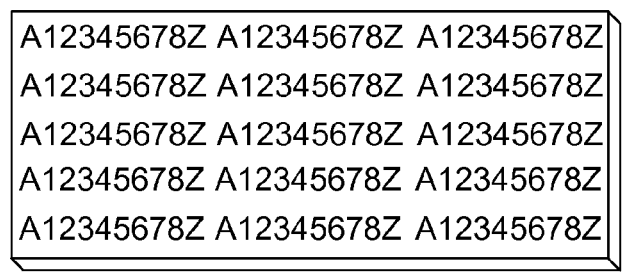

Advancing the prior concept, FIG. 33B demonstrates how that that simple identification mark 3310 illustrated in FIG. 33A can be replicated repeatedly within the object's interior—on the same layer and/or on separate additive manufacturing layers. This is particularly feasible if the identification mark 3310 is constructed utilizing at least one different color, build material, and/or build pattern than select adjacent regions of the object. If preferred for security purposes, the mark 3310 can be replicated throughout at least the majority of the object's interior, with even the entire interior of the object optionally comprised of identification mark 3310 imprints. Moreover, the same mark can be repeated and/or different marks can be imprinted—with select indicia optionally acting as non-functional, decoy marks for security purposes.

Figure 33C:
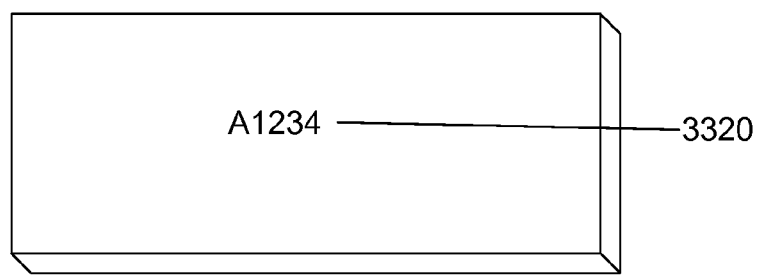
Figure 33D:
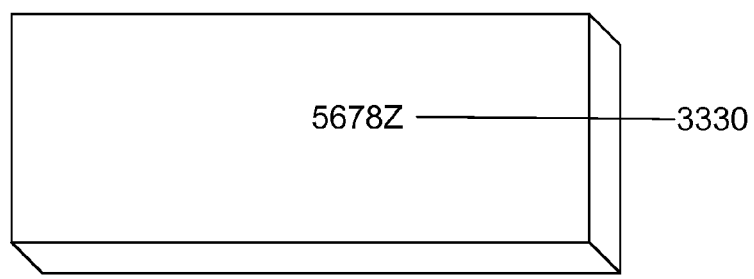

FIGS. 33C and 33D jointly demonstrate how a single identification mark can be constructed on more than one additive manufacturing layer. In the FIG. 33C example, the first portion 3320 of the mark is imprinted on a first layer in a different material color than the surrounding regions; in FIG. 33D, the second portion 3330 is likewise imprinted in the different material color but on a second layer that (optionally) hides the mark's first portion 3320 that was printed on the first layer. As a variation to this example, each letter of the overall mark 3310 can instead be imprinted on its own layer while also, optionally, sharing additional select imprinted layers. Similarly, predetermined portions of the repeated identification mark illustrated in FIG. 33B can likewise be imprinted on multiple additive manufacturing layers in a variety of ways. In fact, the letters and numbers of one repeated mark shown in FIG. 33B can optionally be imprinted on one or more different layers than the same letters and numbers of another repeated mark. To address one more issue relating to FIGS. 33C and 33D, in one variation, the first portion 3320 of the overall mark 3310 is printed on the exterior of the object, while the second portion 3330 is printed solely on one or more interior portions. Other adaptations and combinations are also feasible for displaying only portions of an identification mark 3310 on an object's exterior layer.

Figure 34A:
Figure 34B:
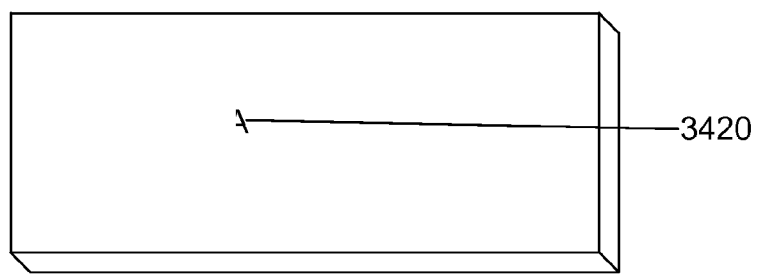
Figure 34C:
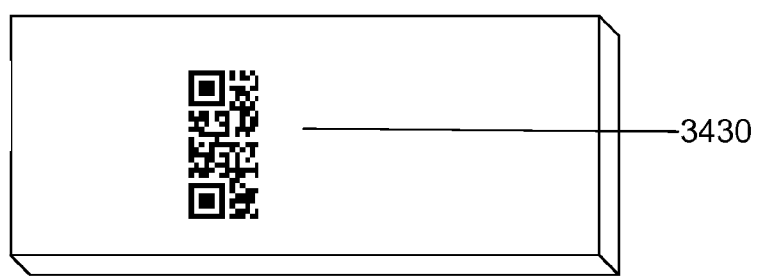

FIGS. 34A and 34B jointly show how even a single letter, number, or other character can be constructed across multiple additive manufacturing layers. In this example, the first part 3410 of the letter "A" in the overall identification mark 3310 is manufactured on one additive layer, while the second part 3420 of the letter "A" is manufactured on a separate layer. The single letter or other character can be divided between more than two layers, but this simplified example shows how an identification mark can be produced in the interior of the object in a manner that is potentially more secure than had the mark 3310 been produced on one layer. In select cases, if the identification mark 3310 had been produced on one layer, it's feasible that an unethical party could physically halt the manufacturing process and attempt to alter (or record for illegal copying) the identification mark 3310 being imprinted. Such action would be harder to accomplish if the imprint of each character within a single identification mark is separated by numerous layers and thus less able to be distinguished or altered by the user during the production process. Relating to the same issue, the identification mark 3310 could be printed at an angle other than horizontal, could be printed in select cases in a "stacked" vertical or near-vertical position, and/or could criss-cross with other marks. Interior markings can also change configuration so that, for example, the machinery's 150 vertical (or other non-horizontal) layering of an object could lead to a horizontal imprinting of an identification mark 3310 while the same machinery's 150 more traditional horizontal layering of an object could lead to a vertical imprinting of the identification mark 3310. Or the markings could be imprinted at angles other than horizontal and/or vertical in relation to the bottom surface of the object constructed. In other instances, the identification mark 3310 can be constructed at one or more diagonal positions for security purposes—including, for example, diagonal to the bottom surface of the object or diagonal to the layering process. Moreover, a combination of the identification methods described in this patent disclosure might be desired for select high-security and high-liability products.

Furthermore, modifying each of the identification methods referenced in this disclosure to include machine-readable representations of data (such as bar codes)—rather than purely numbers or letters—can further enhance the associated security. This concept is exemplified by FIG. 34C, which shows a portion of a basic "quick response code" 3430 on one additive layer. As a clarification relating to FIG. 34C, these machine-readable representations of data 3430 can optionally be enhanced so that select layers display representations of data that are machine-readable separately and/or solely in tandem with other accessed layers.

As a clarification to the above descriptions, one or more portions of an identification mark 3310 or other indicia can be printed repeatedly on multiple additive layers. Therefore, if the characters 3310 shown in FIG. 33A are printed on a first layer, they can also be printed on at least a second layer. For various security needs, the characters 3310 can be printed directly atop the first layer or shifted in location in relation to the previous layer(s). The characters 3310 on the additional layers can be of the same design or of a changed design as the characters 3310 on the first layer. Similarly, while one layer might have an identification mark 3310 comprised of a changed material color, the same or different identification marks 3310 on additional layers can optionally be comprised of, for instance, at least one other material color, at least one different build material, at least one different build pattern, and/or at least one empty cavity. Furthermore, two or more techniques can be combined within the single layer of a single mark 3310 to enhance security.

Figure 35:
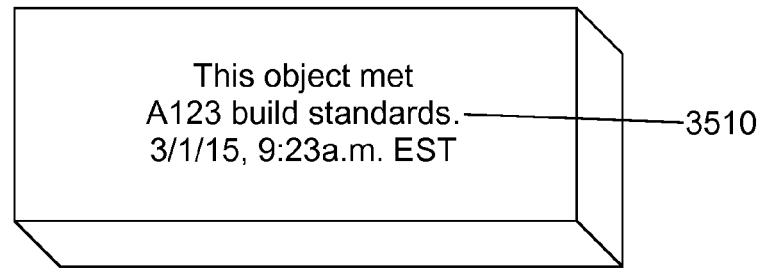

FIG. 35 demonstrates how indicia constructed in the interior of an object can confirm whether that object meets at least one predetermined build standard—with that build standard indicia 3510 constructed within a predetermined range of the completion of the additive manufacturing process for the associated object. As with the other indicia, the build standard indicia 3510 can be constructed horizontally, vertically, and/or diagonally—and can incorporate the other indicia features described above. Similarly, the build standard indicia 3510 can be retrieved by destructive means, non-destructive means, or both.

As a clarification to FIG. 35, the build standard indicia 3510 can alternatively be used to confirm a "failed build," with such a confirmation not necessarily having to be constructed within a predetermined range of the completion of the additive manufacturing process for an object. For example, immediately or soon after a failed build is detected by the additive manufacturing system 100, relevant build standard indicia 3510 can be inscribed within the object and/or across the object's exterior—branding the object as substandard. In this example, the object's customary construction process is then optionally halted at a predetermined point following the detection of the failed build and/or the inscribing of the failed build standard indicia 3510.

Figure 36A:
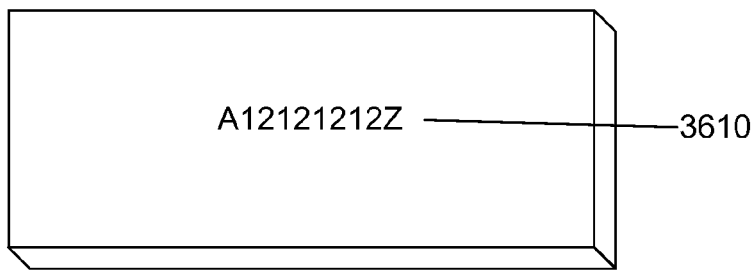
Figure 36B:
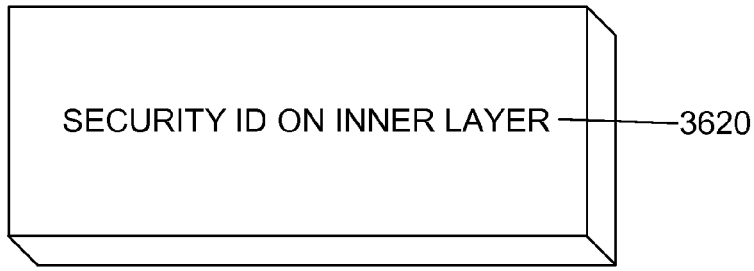
Figure 36C:
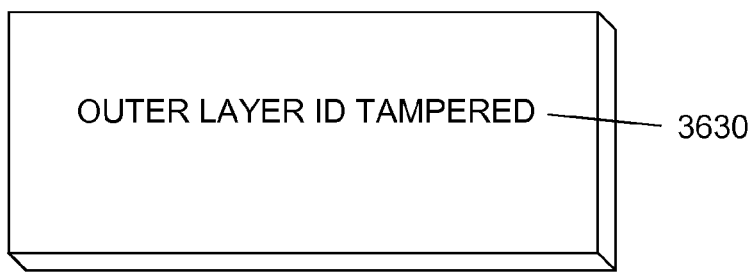

FIGS. 36A, 36B, and 36C demonstrate additional examples associated with creating identification marks 3310 and other indicia. FIG. 36A displays a simple identification mark 3610. FIG. 36B then shows a notification 3620 placed on a layer exterior to that identification mark 3610 displayed in FIG. 36A. In turn, FIG. 36C shows a different notification 3630 on a layer interior to that identification mark 3610 displayed in FIG. 36A. The FIGS. 36B and 36C notifications are intended to inform, and/or to dissuade various parties from making unauthorized changes to ID marks 3610. As well, notifications similar to these (3620 and 3630) can be combined with the other interior indicia examples and embodiments described within this disclosure.

Furthermore, multiple layers of each notification (3610, 3620, and 3630) shown in FIGS. 36A, 36B, and 36C can be built into the interior of an object as, for instance, a many-layered "sandwich" to additionally enhance identification security. In addition, one or more portions of the most exterior notification layer can be visible and/or invisible on the finished object's exterior.

Figure 37:
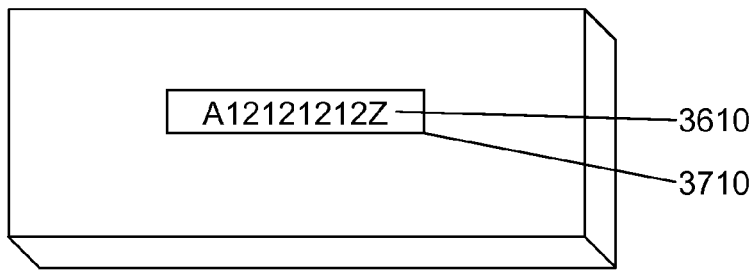

Taking a different approach, FIG. 37 demonstrates one way in which indicia—including identification marks—can be partially or even fully embedded into the interior of an object yet still be visible from the exterior as a result of at least one outer layer constructed of at least one additive manufacturing material that is transparent and/or translucent. Applying this embodiment to a specific example, a brightly-colored identification mark 3610 embedded in the interior of FIG. 37 can be fully viewed via non-destructive means from the exterior; yet the outer transparent and/or translucent layer(s) 3710 depicted by the inner rectangle in this example present a physical barrier that dissuades various parties from making unauthorized changes to the indicia. Along the same lines, machine-readable data and other indicia can be buried beneath the transparent and/or translucent layer(s) 3710 to ensure the data is likewise accessible yet protected. In another example, the identification 3610 or other indicia can remain invisible to the human eye, yet be visible through the outer transparent and/or translucent layer(s) 3710 to machinery capable of reading, for instance, data embedded in humanly invisible light such as infrared and/or ultraviolet imagery. Combining use of translucent and/or transparent additive layers with the other interior indicia examples and embodiments described in this patent disclosure will lead to especially useful identification products. For instance, constructing portions of a single quick response code on multiple, separate additive layers within an object, then constructing transparent layers to the exterior of the code, makes for indicia that is useful, accessible, and secure.

Figure 38:
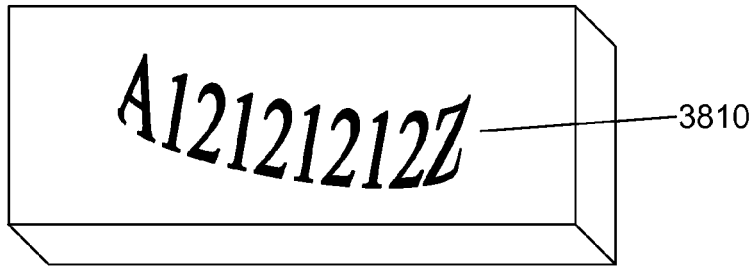

As one last related example, FIG. 38 demonstrates how interior indicia can be imprinted in a three-dimensional manner so that, for instance, the constructed identification mark 3810 is angled within the interior of an object both horizontally and vertically, making unauthorized physical changes more difficult. The indicia in FIG. 38 can be embedded fully or partially into the interior, and can incorporate many of the previous features described regarding identification marks and other interior indicia. Combining FIG. 38 with FIG. 37's translucent and/or transparent features is especially interesting.

Conversely, one may choose to build FIG. 38's indicia into an object's interior so that indicia is not visible on the finished object's exterior, followed by building FIG. 36A's indicia on the same finished object's exterior; this demonstrates one way in which a different version of indicia can be displayed on an object's exterior.

Among other uses, the identification mark embodiments described can be implemented to add security features to financial transaction products. For example, one or more identification marks are designed to span the entire breadth of a financial card; the financial card includes at least one identification mark comprising at least one physical hole spanning the entire breadth of the card; and/or the identification markings are embedded into the majority of the card's structure, on the majority of the card's edges, on the majority of the card's surface, and/or on interior layers supplemented by one or more removable exterior layers.

The identification mark and related indicia configurations described in this disclosure will help the growing 3D printing industry to address tracking products, product liability, recalls, quality assurance, preventing counterfeits, identifying and protecting intellectual property, and determining how to appropriately identify insured goods. The identification mark embodiments described above will be vital for many additive manufacturing products constructed by senders and third-parties, especially for customized additive manufacturing products as well as for the countless such products that will be constructed by receiving parties.

Figure 39A:
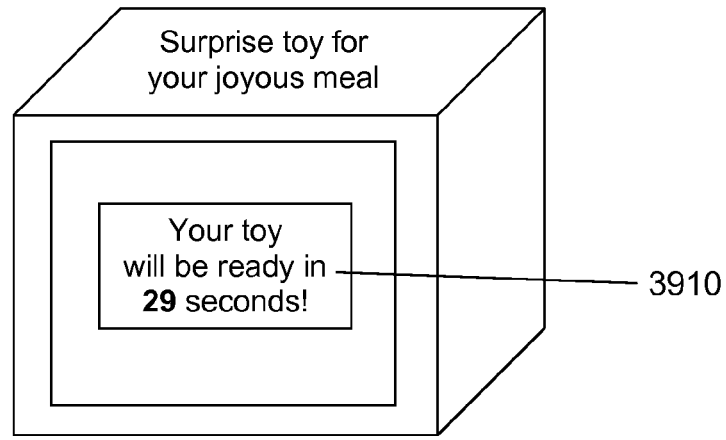
FIGS. 39A, 39B, and 39C jointly exemplify a business establishment's constructing a surprise object for a customer utilizing the business establishment's additive manufacturing machinery.
Figure 39B:
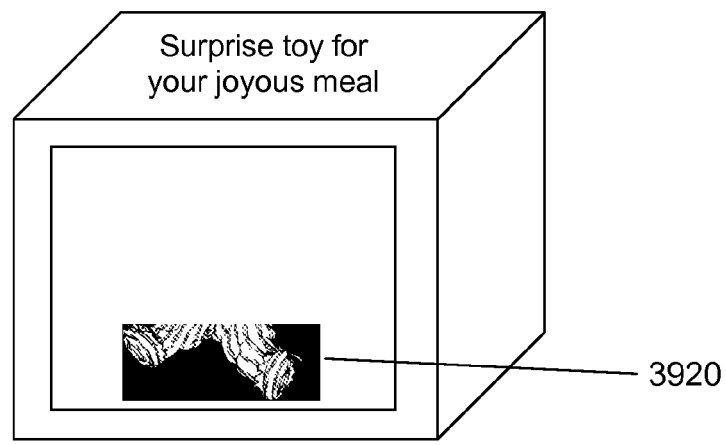
Figure 39C:
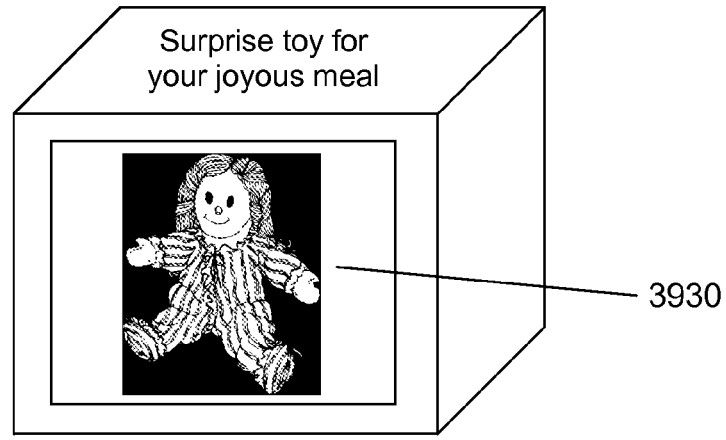

Another way to create surprises for users via the additive manufacturing process is shown jointly in FIGS. 39A, 39B, and 39C. These diagrams represent an example for constructing for at least one customer at least one object from additive manufacturing materials by at least one additive manufacturing device 150 at a retail establishment or other business establishment. As with many of the other prior examples shown in this patent disclosure, the object is at least partially unknown to the customer until construction reveals the object. The object may be a toy or other gift item, or the object may be a food item produced by utilizing edible additive manufacturing materials. The object may be constructed as a surprise in response to a customer's at least one action including, for example, the customer's making a purchase, entering a location, playing a game, and/or activating a computerized input relating to constructing objects.

The FIG. 39A example shows the exterior of an additive manufacturing machine 150. In this particular example, the customer views a special computerized display 3910 informing the customer that their toy created as a benefit for purchasing a "joyous meal" at a quick-service restaurant will be ready in "29 seconds." The display 3910 can optionally count down to zero before revealing to the customer the toy created via the additive manufacturing process. The customer is excited about having a toy constructed—and optionally customized—specifically for her on the spot at that business establishment.

The FIG. 39B example shows a different configuration, where an aperture displays for the customer the surprise product being constructed 3920 before the customer's eyes. In turn, FIG. 39C shows that completed object 3930 ready for removal by the excited customer or business representative.

As these three illustrations demonstrate, instead of being provided traditionally-manufactured toys at a quick-service restaurant as a benefit for buying select food products, customers can have products custom-made for them while they order and/or eat their food. Customers can even be authorized to select the type of toy preferred, the size of the toy, the brand or theme of the toy, and/or other parameters. The toy can be provided to the customer for free, at a subsidized cost, or at regular price. Moreover, the customer can be permitted to pay a separate fee to construct a more desirable toy and/or the customer can be allowed to order additional food products to qualify for a more desirable free or subsidized-cost toy. In lieu of associating the above-described construction of surprise products with food purchases, the surprise products constructed via additive manufacturing can be associated with non-food purchases at a multitude of business establishments.

As a related variation, the toy or other objects created utilizing the business establishment's additive manufacturing machinery 150 can be designed to be paired with products or other objects situated at that business location. The customer can then, for instance, take the at least one object created for her via additive manufacturing machinery 150 and pair it to the business location's at least one other object to see if she won a prize. The objects coupled in FIGS. 12, 13, 14, and 15 are helpful for exemplifying how this "pairing" might work. The at least one other object may likewise be constructed via additive manufacturing means; or it may be constructed through other means.

Building on the above examples, FIG. 40 shows a flow chart reflecting the computer-implemented processes involved in constructing an object at least partially unknown to the customer on a business establishment's additive manufacturing machinery 150. As mentioned in the flow chart, the object constructed may be a benefit resulting from the customer's purchase of at least one product and/or service; for instance, the customer's purchase of a home through a real estate broker could lead to the construction via that broker's additive manufacturing machinery 150 of a scaled model of the purchased home as a gift to the home-buyer.

Figure 41:
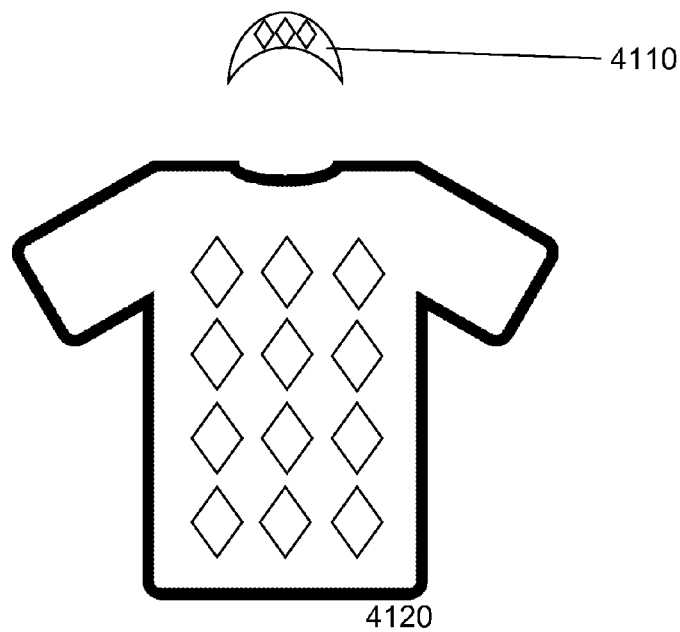
FIGS. 41, 42A, 42B, and 43 illustrate constructing additive manufacturing objects in coordination with traditionally-manufactured products.

In a related issue, objects constructed at least primarily of additive manufacturing materials by an additive manufacturing system 100 at a retail location could be designed to coordinate with one or more traditionally-manufactured items purchased by customers. A traditionally manufactured item is defined herein as an item not manufactured by the additive manufacturing system 100 at that retail site, and is very often manufactured by subtractive means or via other traditional means at a distant factory. (Objects produced using injected molds and clothing looms at distant factories are two of many "traditional means" examples.) The coordinated object constructed via additive manufacturing at a retail location could optionally be constructed as a free or subsidized benefit for the customer. FIG. 41 shows an example of a headband 4110 constructed utilizing a retail site's additive manufacturing machinery 150 to specifically coordinate with traditionally-manufactured apparel 4120 to be purchased by the customer at that retail establishment. The customer buys the apparel 4120 and the matching headband 4110 is purchased at normal cost by the customer (creating a new profit center for the retailer); or the retailer constructs the matching headband 4110 as a free or subsidized benefit for that customer. The cost of the headband 4110 can optionally depend upon the amount of merchandise and/or dollars spent with that retailer by the customer, on whether the customer is a member of a selected loyalty or rewards program, and/or other variables. Moreover, the customer can customize the headband's design before construction to emphasize, for example, certain colors and/or patterns on the apparel 4120. As yet another option, the customer could be authorized to construct the matching headband (and/or other matching products) at home following purchase of the apparel 4120.

Figure 42A:
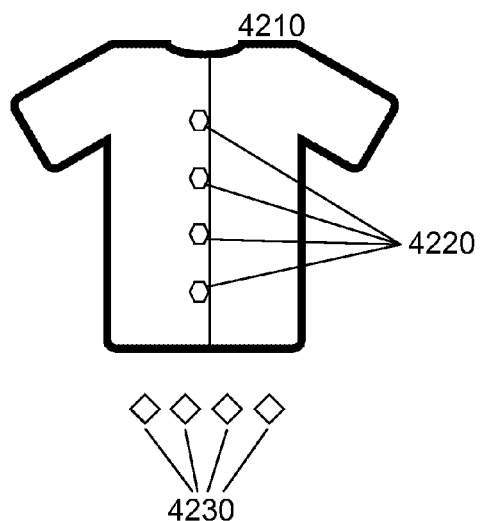
Figure 42B:
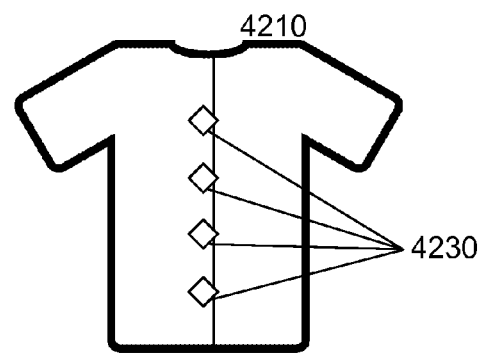

FIGS. 42A and 42B illustrate another way in which to construct at least one object via the additive manufacturing process to coordinate with at least one traditionally-manufactured product. In the FIG. 42A example, a traditionally-manufactured shirt 4210 is sold by the retailer with button connectors 4220—but no buttons. The customer tries on the shirt 4210, likes it, and decides to purchase it. The customer is then prompted at the store to choose and/or custom-design coordinating buttons 4230, which are then constructed on the retailer's additive manufacturing machinery 150. The retailer and/or the customer then attach the customized buttons 4230, so that the shirt 4210 in FIG. 42A is transformed into the diamond-buttoned shirt 4210 shown in FIG. 42B. Alternatively, the button attachments 4220 could instead be "starter" buttons over which the new buttons (or button covers) 4230 are attached. Or the starter buttons are removed to make way for the new buttons 4230. Other variations are likewise feasible, such as authorizing the customer to construct the diamond buttons on their home machine 150.

Figure 43:
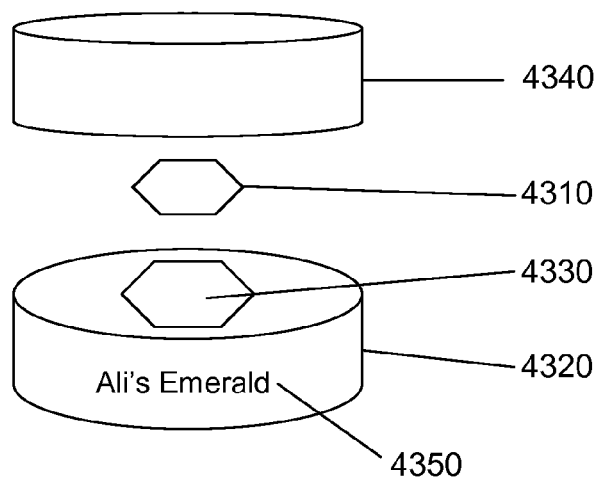

FIG. 43 shows how a customized container or display can be constructed via additive manufacturing means to hold or otherwise complement at least one traditionally-manufactured item purchased by the customer. In FIG. 43, the customer purchases a traditional gemstone 4310. As a result, the container depicted is constructed utilizing the retailer's additive manufacturing machinery 150. The container's bottom 4320 has a customized aperture 4330 to match the exact size and shape of the purchased gemstone 4310, as does the container's top 4340 (though the top aperture of the container is hidden from view in this perspective illustration). In addition, the container bottom 4320 bears a customized message 4350. Other variations are feasible, but this example shows how a container or display can be constructed via additive manufacturing tailored specifically to the traditional product purchased and/or to the customer making the purchase.

Figure 44:
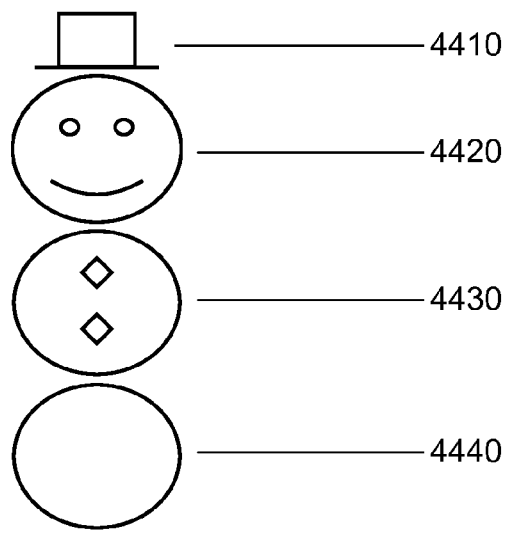
Figure 45:
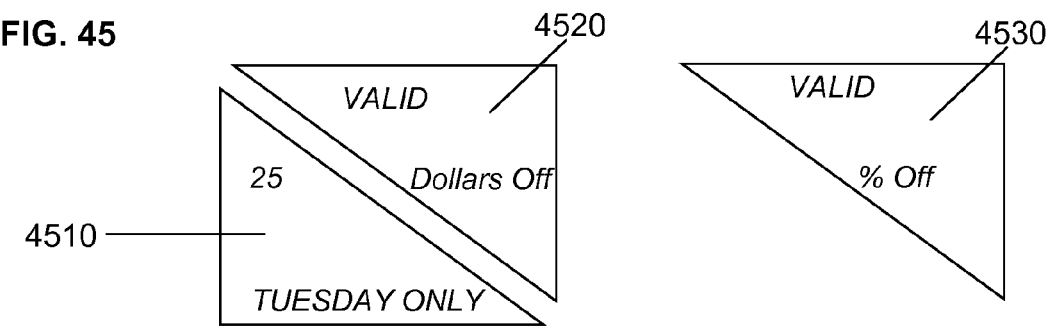

FIGS. 44, 45, and 46 demonstrate how an object can be constructed in multiple builds utilizing multiple additive manufacturing devices 150 and/or systems 100. Those multiple builds (i.e., multiple portions) are designed to be joined into a unified object by at least one user. This leads to an entertaining way to create and engage objects produced via additive manufacturing. The objects created in this manner may, for instance, be toys, puzzles, gifts, and/or be associated with at least one coupon, promotion, and/or sale. Portions of the unified object may be constructed at multiple locations within a single educational or business establishment. Alternatively, portions of these objects may be constructed at multiple educational and/or business establishments. The user is then tasked with traveling from, for instance, a first retail store to a second retail store to construct and assemble the various different portions of the single object as a form of entertainment.

Note that the additive manufacturing system 100 used to create the objects in FIGS. 44, 45, and 46 can be comprised of two or more additive manufacturing machines 150 similar to the three devices (220, 230, 240) depicted in FIG. 2. The machines 150 utilized can be designed to communicate with the overall system 100 and all or select machines 150 can optionally communicate with other associated devices.

FIG. 44 illustrates an example of an optionally customized toy created utilizing multiple additive manufacturing devices at one or more business establishments. During the winter holiday season, a parent and child engage one additive manufacturing machine 150 at a business establishment and receive the constructed hat 4410 shown in FIG. 44. Engaging a second additive manufacturing machine 150 at that same establishment, they receive the constructed snowman's head 4420 shown in FIG. 44. Engaging a third additive manufacturing machine 150 at that same establishment, they receive the constructed snowy torso 4430 shown in FIG. 44. Finally, engaging a fourth additive manufacturing machine 150 at that same business establishment, they receive the constructed snowman's bottom 4440 shown in FIG. 44. As mentioned above, the parent and child could alternatively be allowed to journey from one business establishment to another to construct via additive manufacturing means the full toy shown in FIG. 44, somewhat similar to Halloween trick-or-treating at a shopping mall. Or the parent and child could make a first purchase at one quick-service restaurant to get the initial snowman piece, and then make additional purchases at the same and/or other quick-service restaurants over the following days to receive the remaining snowman pieces constructed via additive manufacturing. As yet another option, multiple portions of the snowman could be received during a single visit by the parent and child, with those multiple portions optionally contingent upon one or more actions completed by the parent and/or child, such as the purchasing of select products and/or services.

FIG. 45 illustrates an example of a promotion created utilizing multiple additive manufacturing devices at one or more business establishments. More specifically, at a retail establishment's first additive manufacturing machine 150, the customer receives a first portion of a promotion 4510. This portion informs the customer something will happen on "Tuesday," but she knows little else. At the retailer's second additive manufacturing machine 150, the customer receives a second promotional portion 4520. Piecing together the two portions, the customer now sees she can get $25 off the following Tuesday at that store. Finally, at the retailer's third additive manufacturing machine 150, the customer optionally receives a third promotional portion 4530. The customer sees she can now choose between getting $25 off and 25% off merchandise at that retailer. As with FIG. 44, other variations are feasible and additional portions can augment the customer's choices.

Combining FIG. 44 with FIG. 46 demonstrates how multiple objects can be produced utilizing multiple additive manufacturing devices located at one or more educational, retail, or other business establishments. For instance, the parent and child who visit one retailer may receive the hat portion 4410 depicted in FIG. 44. When the parent and child then visit the same retailer the next day, they may receive the square head 4620 depicted in FIG. 46. During the third visit to another retailer in the same chain, they may receive the pentagonal hat 4610 and the square torso 4630 depicted in FIG. 46. In their fourth visit to the retailer, they may receive the square bottom 4640 depicted in FIG. 46 or a different portion depicted in FIG. 44. They may also optionally help choose the portions to be constructed by, for instance, informing the retailer via manual and/or automated means of prior portions received or requesting preferred portions (such as the round portions shown in FIG. 44 over the square portions displayed in FIG. 46). Optionally, the child may be enabled to customize portions constructed via additive manufacturing and/or be allowed to construct portions comprising three or more objects. As well, the explanation accompanying FIG. 15 can be adapted to demonstrate additional examples for utilizing multiple portions of multiple objects constructed with multiple additive manufacturing devices at one or more business or educational establishments.

Portions of objects constructed utilizing additive manufacturing machinery 150 can be coordinated with one or more media presentations, the one or more media presentations at least in part instructing the user on how to assemble the portions into a craft or other object. A craft is defined in this patent disclosure as a decorative handicraft, a functional handicraft, a jewelry handicraft, a buildable model, and/or food art assembled at least in part by hand.

For example, during a first portion of a televised program, a host tells the viewer how to build a craft project that will be constructed at least partially—and optionally completely—on that viewer's additive manufacturing machinery 150. The host then discusses information relating to at least a first build for that craft project, and the at least a first build is constructed on the user's machinery 150—optionally with the user's providing computer-implemented authorization via at least one additive manufacturing system 100. The media presentation continues, the host tells the viewer how at least a next build will connect with the first one or more builds, what the combined build looks like, various options for assembly, and then the at least a next build is constructed on the user's machinery 150—likewise optionally with the user's providing authorization. The aim in this example is to construct these successive builds (and/or series of builds) at multiple predetermined periods within the media presentation so as to synchronize the builds with the media presentation. Additional builds may be constructed in a similar manner.

As well, the user may override or modify one or more of the builds to customize the craft object in a preferred manner. And while the user may prefer to authorize each build, conversely, at least one input interface control 110 can be activated to at least partially automate the construction of the craft; as a result, if 50 pieces of the craft need to be constructed and then assembled by hand, all or select pieces are constructed automatically in conjunction with timed portions of the media presentation, without necessarily requiring the user to authorize the construction 50 times—or even at all. Taking another approach, if 25 pieces are similar in design and/or function, the user can collectively authorize their production with one action and then each of the 25 pieces are constructed automatically in coordination with the remainder of the media presentation. Furthermore, while the host shows the user how to affix the first piece by hand, a second and third piece could be under construction; while the host shows the user how to attach the second and third pieces, a fourth piece could be under construction. The build for each new piece could optionally finish when the host is done demonstrating how to affix the prior one or more pieces.

FIG. 47 shows one implementation for a craft project constructed on the user's additive manufacturing system 100 in coordination with a media presentation. In a coordinated video presentation, a host discusses building a planter as a craft project. In this example, the host gives the user a choice between a first planter 4710 (illustrated using a front view) and a second planter 4750 (shown from a perspective view). The user chooses the first planter 4710 by activating at least one input interface 110, and the user's additive manufacturing machinery 150 builds that first planter 4710. The host then discusses decorating the planter with designs, and the user is given the choice between three designs that can be attached to cross-shaped fasteners built into the exterior of the first planter 4710. Those three designs are shown in the illustration as diamonds 4720, circles 4730, and triangles 4740. In this hypothetical demonstration, the user chooses the circles 4730 by activating at least one input interface 110 and the user's additive manufacturing machinery 150 then builds the circles 4730. As one or more circles are constructed, the host shows the user how to affix by hand the circles to the planter, and various customization options may be provided. Moreover, these circle attachments are constructed concurrently and/or successively, depending upon the arrangement of the associated media presentation and/or on the user's preferences.

In lieu of providing two planter choices, the host could alternatively (or additionally) permit the user to choose other, completely different crafts. For example, the second planter depicted 4750 in FIG. 47 could instead represent a bracelet, and the user could be allowed to choose between constructing the first planter 4710 and the bracelet 4750, with the size and number of the constructed designs (4720, 4730, and 4740) programmed to change to fit the small bracelet 4750. Assuming the user selects constructing the bracelet 4750, in select instances the remainder of the media presentation could be programmed to change to focus on constructing bracelets rather than planters. In other examples, such as a general TV broadcast by Martha Stewart, the media presentation might optionally remain the same to uniformly address millions of live viewers.

The instructional media presentation further optionally senses when one or even multiple builds of at least one object are each completed on the user's machine 150, with the media presentation able to adapt, lengthening (for instance) the host's prior main presentation or adding a bonus presentation if the user's machine 150 is taking longer than the norm to construct a particular build. Conversely, the host's presentation can optionally be truncated if the user's machine 150 finishes more quickly than the norm. The host can even be enabled to comment on the speed of the particular user's machine 150. Furthermore, the length and/or content of the media presentation can be recalibrated prior to transmitting (or in the early stages of transmitting) to better accommodate the known speed of the user's particular machine 150 as detected by sensor input(s) associated with the media presentation.

As another option, the craft constructed in FIG. 47 could incorporate at least one craft supply (such as a craft kit) purchased by the user from at least one external party, such as a retailer or even a supply outlet affiliated with the media company producing the media presentation. Therefore, while the base for the first planter 4710 is constructed on the user's additive manufacturing machinery 150, the designs (4720, 4730, and 4740) might have been purchased in advance by the user from the Home Shopping Network in anticipation of building the craft in coordination with the upcoming media presentation. Optionally, the craft supplies could be sent to the user in advance of each anticipated media presentation, such as through a subscription service, so that the user has the appropriate supplies on hand when the related media presentation is broadcast or otherwise transmitted.

In another example related to media presentations, at least one object constructed on the user's additive manufacturing machinery 150 could include information not yet revealed to that user based on the user's current position in that media presentation. This concept is especially useful for fictional media presentations—including stories, wherein, for instance, the at least one object constructed via additive manufacturing means by the user includes at least one indication about what will subsequently occur in the story or other fictional media presentation.

More broadly, the media presentation described in the above paragraph is optionally associated with a printed book, an electronic book, a magazine, an e-zine, a television program, a motion picture, a video presentation, a computerized game, and/or an audio presentation.

Figure 48A:
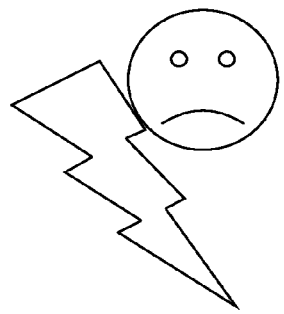
FIGS. 48A, 48B, 49, 50, and 51 illustrate ways in which to construct additive manufacturing objects in association with media presentations, the objects divulging, for instance, supplemental information and/or information not yet revealed to a user based on the user's current position in the associated fictional media presentation or other media presentation.
Figure 48B:
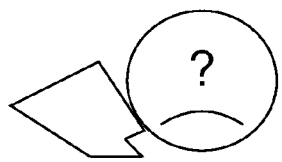

FIGS. 48A and 48B show two examples of objects built to include information not yet revealed to the user based on that user's current position in a fictional media presentation. These examples pertain to the user's reading a hypothetical "Percy Jackson" novel. FIG. 48A is constructed manually or in at least a partially automated manner on the user's additive manufacturing machinery 150 to reveal to the user information helping to identify the thief and/or the item stolen in the hypothetical Percy Jackson novel. The thief and/or item can be revealed in full—as per the FIG. 48A example—or the object constructed can provide at least one clue, as indicated via the FIG. 48B example. (In FIG. 48B, the culprit's face is partially concealed, as is the stolen item.) The user could even be authorized to decide how much of a clue should be provided via the object constructed, using input interface controls 110 to help direct the additive manufacturing system 100. Providing hints and clues by creating associated objects via additive manufacturing serves to elevate the suspense for a story's reader or a video presentation's viewer.

Figure 49:
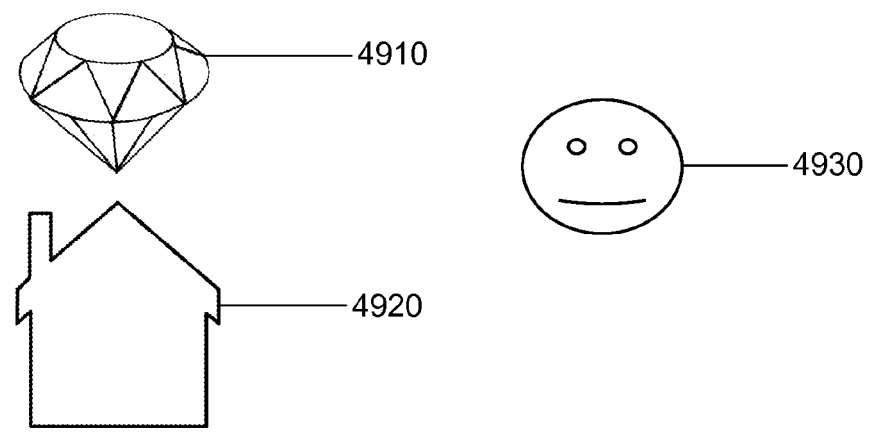

FIG. 49 is intended to further demonstrate how the user can be provided multiple choices for objects constructed in association with media presentations. For example, if the user is watching a fictional media presentation that is a "whodunit" mystery, optionally the user can choose to construct on the user's additive manufacturing machinery 150 one or more pieces of information not yet revealed in that presentation. In this illustrated example, the user is permitted to choose to construct just one of the following: the stolen object 4910, where the object is now hidden 4920, or the person burglarized 4930. The user can optionally further modify the pending construction of the chosen object to customize the information provided. For instance, in FIG. 49, the user can, prior to construction, request the removal of select features of the face of the person burglarized 4930, or add features to the building currently housing the stolen object 4920.

Select or all constructions of an object can commence in at least a partly automated manner during a predetermined portion of the media presentation and/or the user can be prompted to approve or deny select or all constructions. In either case, at least one input interface control 110 is integrated to achieve the desired goal. Moreover, as was touched-on earlier in relation to FIGS. 12, 13, 14, 15, 44, 45, 46 and 47, one or more objects can be constructed in multiple builds at one or more predetermined periods in coordination with the media presentation. As a result, at least one portion of an object can fit with at least one other portion to provide information not yet revealed in the presentation. Those portions are constructed concurrently and/or successively. As well, the at least one portion can be physically combined by the user with the at least one other portion to construct a physical object (e.g., a car or a building), wherein that newly-created physical object is optionally itself a clue to the user about what will later transpire in the media presentation. Similarly, multiple portions constructed can lead to the assembly of multiple objects providing clues to the user about what will occur later in the media presentation.

Combining several previously-discussed features into one specific example, multiple discrete portions of at least one object are constructed through successive and/or consecutive builds on the user's additive manufacturing system 100, with the at least one object associated with events in a fictional media presentation (e.g., a novel), with the at least one object further including information not yet revealed to that user based on the user's current position in the fictional media presentation, and with the information revealed including at least one indication about what will subsequently occur in that fictional media presentation.

Figure 50:
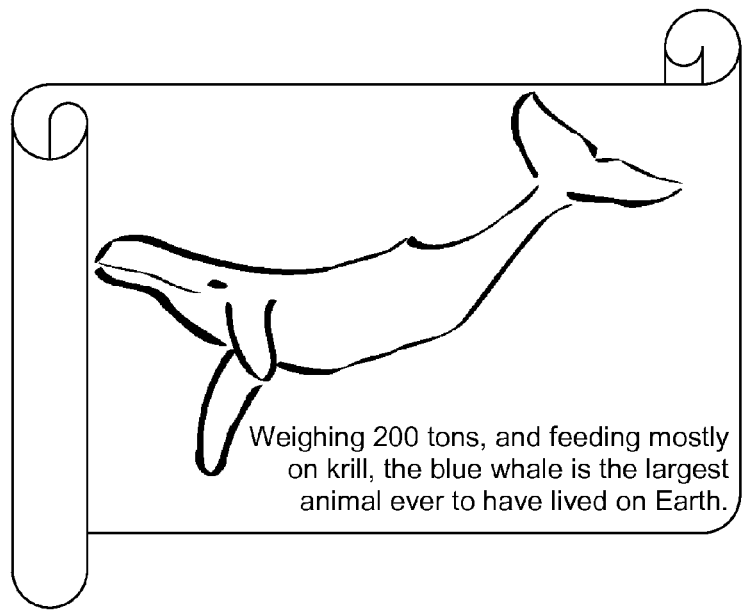
Figure 51:
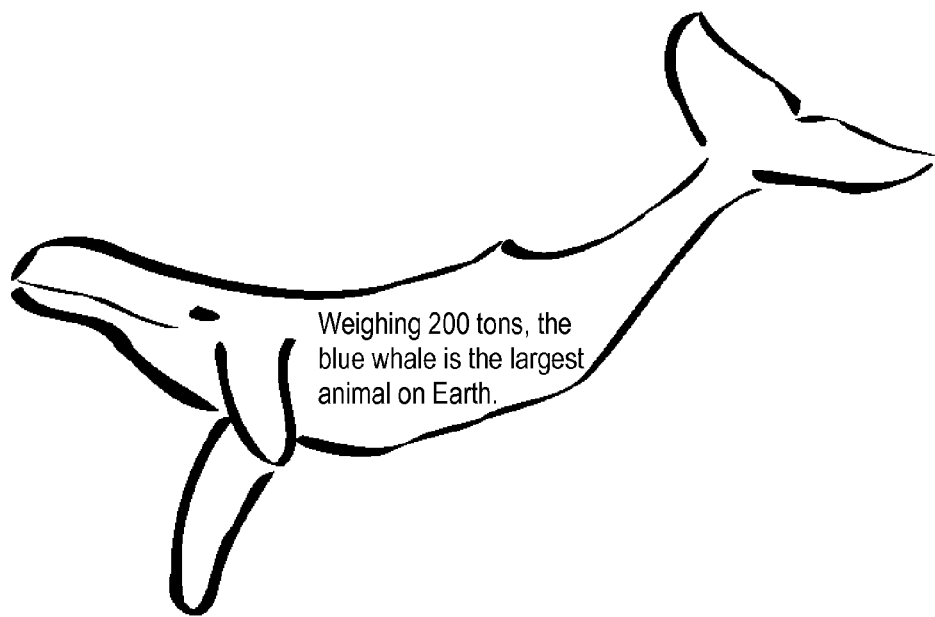

As a variation to the above, FIG. 50 demonstrates how objects constructed by the user can reveal additional information to supplement that provided by an associated media presentation. For example, a media presentation about the Pacific Ocean could mention the blue whale without providing further details; yet the associated standard or optional printing of the object in FIG. 50 on the user's additive manufacturing machinery 150 then reveals to the user additional information about the whale not contained anywhere in the viewed media presentation. FIG. 51, in turn, shows that the user can be authorized to customize as desired the object constructed—in this example choosing less information coupled with a three-dimensional blue whale object (rather than the two dimensional whale on the three-dimensional scroll depicted in FIG. 50).

Building upon the various prior object examples, FIG. 52 is a flow chart exemplifying several computer-implemented processes for creating additive manufacturing products in coordination with media presentations. Note that at least one related input interface 110 serves to at least partially automate the construction process so that the at least a first portion of the desired object is constructed at least partly automatically to match the associated media presentation. For example, when a hypothetical TV show host says "Let's now build the first and second portions," an input interface 110 prompted by the media presentation helps to initiate the build of those portions on the receiving party's machinery 150. Optional additional portions are similarly constructed to coordinate with additional instructions provided by, for instance, the hypothetical TV show host. Moreover, prior to the at least partly automated construction of one or more object portions, the receiving party is optionally allowed to decline, authorize, choose, substitute, and/or customize a construction. The media presentation may comprise a video presentation and/or an audio presentation. Among other examples, the media presentation may specifically comprise a televised program, a motion picture, and/or an electronic book. This computer-implemented method may be utilized to unite additive manufacturing with entertainment and informational programming, transforming formerly passive viewers of HGTV, the Food Network, and "The Martha Stewart Show" into creative participants.

Addressing the Use and Avoidance of Support Structures During Object Builds

Various embodiments in this application describe, among other examples, locked and lockable objects, breakable objects, puzzle objects, and/or other surprise-oriented objects.

Ideally, such surprise-oriented objects are constructed without support structures, or the extensive post-construction curing or cleaning of powders or other unwanted substances. This allows the surprise objects to be retrieved and used immediately by the recipient in a fresh, spontaneous manner. New technologies are continuously being developed to enable this preferred outcome. For example, with newer stereolithography apparatus (SLA) techniques, digital light processors (DLPs) use ultraviolet rays to solidify light-sensitive resins emerging from a vat. These processes generally have the surprise-oriented object emerging above a vat of the resin that is used to build the object, with the object continually rising above the vat as it's constructed—or the vat descending to make room for the growing object. As a result, breakable objects such as the egg design depicted in FIG. 22 can potentially be constructed without extensive post-construction preparations, and with surprises contained within the breakable object—such as hidden messages or secondary objects—created as part of the normal build process. Similarly, puzzle objects, locked objects, and lockable objects can potentially be constructed without having the recipient necessarily worry about removing powders, detaching support structures, and/or other extensive post-production challenges.

Alternative additive manufacturing processes can be utilized wherein, for instance, the additive manufacturing system 100 depicted in FIG. 1 further includes one or more customizable, reusable molds. As a result, once the machinery's customized mold(s) are adjusted and heated, resins, plastics, and/or other materials are poured into the mold(s) to construct at least a portion of an object. Once that at least a portion of an object has hardened to a predetermined degree, the machinery automatically removes (and optionally self-cleans) its mold(s). The object is then complete or other additive manufacturing techniques are optionally implemented to add more features to the object under construction. With this reusable mold technique, no powders, post-production challenges, or disposable support structures are necessarily needed when constructing the aforementioned surprise-oriented objects.

For additive manufacturing processes that do require the use of support structures, as one option, at least one component of the additive manufacturing system 100 can be programmed to automatically remove any needed supports during and/or after construction, thereby enabling the finished object to be presented to the user. For example, once the supported object cures, exterior supports can be mechanically removed by the system 100, vacuumed, melted, liquefied, and/or otherwise eliminated.

One commonly-used additive manufacturing technique mentioned previously in this application is fused deposition modeling (FDM), which is also referred to as fused filament fabrication. This technique generally uses a nozzle to melt a plastic filament or metal wire that is deposited onto a build platform to create an object layer by layer. Support structures are often used for portions of an object that overhang "empty space," with those disposable support structures removed once the plastic or metal hardens to strength.

When implementing the FDM build process to build surprise-oriented objects discussed herein, the computerized design file can deliberately be created to avoid support structures as much as possible. For instance, for objects designed to be broken by the recipient to reveal a surprise within, the object's shape, the verticality of the walls, and/or the build process can be arranged so that no interior supports are required, and no or only minimal exterior supports are needed to support the object under construction. Therefore, if only minimal exterior supports are needed, and those supports are designed to be "snapped-off" and/or otherwise easily removed by the recipient (or removed automatically by the system 100), this will avoid extensive efforts by the recipient to finish the object prior to the recipient's being able to "break" open and access the surprise. Moreover, an object optionally constructed to be hidden within the breakable egg depicted in FIG. 22 can, for instance, be constructed separately on the FDM-related build platform; when cooled and hardened to a predetermined degree, that separate object can then be placed by an optional robotic arm component of the additive manufacturing system 100 into the egg before constructing the top of the egg to seal the object within. Alternatively, the separate object can be constructed within the egg as the egg is constructed, with the separate object constructed apart from the egg—separated, for instance, by a non-binding layer of material—or attached via, for instance, a break-away support. Once the separate object is constructed, the optional non-binding layer of material can if desired be removed via drainage, vacuuming, and/or another disposal method.

As another FDM-related example, following this technique's construction of the bottom face of a hollow box on the build platform the walls of the at least partially hollow box are optionally constructed in a vertical or near vertical position to potentially avoid the need for any supports. The top face of the box is then optionally constructed adjacent to the rest of the box on the build platform. Once the constructed top face hardens to a predetermined degree, the aforementioned optional robotic component of the additive manufacturing system 100 shown in FIG. 1 may physically maneuver the lid to the top of the newly-constructed box and fuse it by, for instance, using the FDM nozzle(s) to heat select parts of the joined material(s) and/or by dispensing more heated materials to bind the top face to the walls of the box. This top face can, for instance, be joined to hinges, allowing the newly-created lid to open and/or close, or the top face can be affixed to the entire top portion of the box to create a sealed container. This example enables a sealed object—including a locked box—to be created with a minimum of required supports.

As an alternative, any supports required for construction by FDM or other methods can deliberately be created from materials that are engineered to dissolve in, for instance, a liquid solution. Thus, for example, the system 100 pours a dissolving solution into at least one aperture within the locked, lockable, breakable, puzzle-oriented, and/or other object that includes interior supports; the solution secondly dissolves those supports and thirdly the system 100 removes those dissolved supports as the liquid is drained.

More traditional stereolithography apparatus (SLA) processes can also be used to build the aforementioned locked, breakable, puzzle, and/or other surprise-oriented objects. Using SLA techniques, ultraviolet lasers solidify selected regions in a vat of UV-curable resin. Those selected regions harden into finished elements for a particular layer of the desired object. The object is lowered by a predetermined degree within the vat and the process is repeated to build the next layer. The finished object is then, for instance, chemically cleaned and/or cured in an ultraviolet oven. The various surprise-oriented objects can therefore be constructed similar to that described previously for fused deposition modeling techniques. For example, the CAD design for SLA-produced objects can be created and/or altered to avoid or minimize selected support structures; break-away or otherwise easily removable support structures can be constructed; and/or robotic arms can be utilized to join multiple portions of an object to create the various surprise-objects described. In addition, the additive manufacturing system 100 for the SLA process can optionally automatically clean and cure the part prior to releasing the object to the recipient, once again providing the recipient with a completed product surprise, rather than one requiring extensive finishing by the recipient.

Relating to other newer SLA methods, in October 2012, a robot-armed, 3D digital light processing printing process was publicized by Liz and Kyle Van Hassein at the Southern California Institute of Architecture. This process depicts the creation of additive manufacturing objects that are far larger than the associated vat of liquid resin from which the objects arise; this method (which is derived from other well-known DLP-related processes) is quite compatible with the surprise-object methods discussed herein.

The above discussion related to traditional SLA processes can also apply to the polyjet matrix printing additive manufacturing process. In this process, tiny droplets of material are jetted onto the build platform to construct an object, supports are often required, and the material is similarly cured using UV light.

Figure 53:
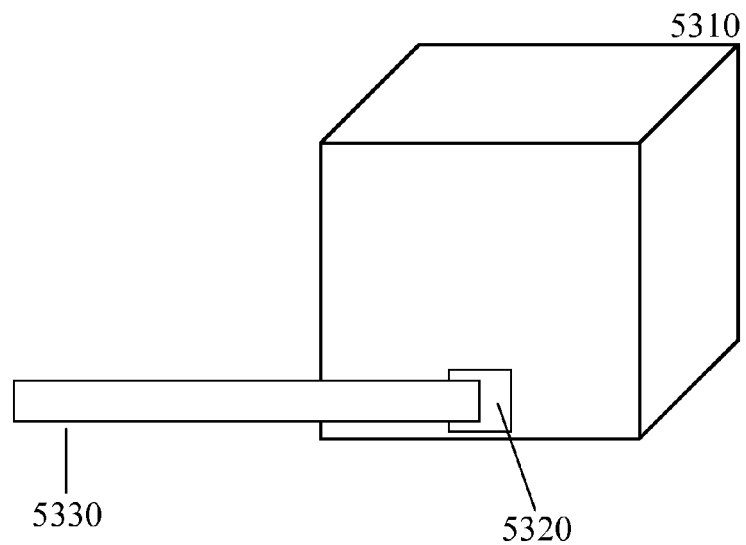
FIG. 53 depicts an example for removing undesired elements from a hollow object constructed via additive manufacturing.

The selective laser sintering method discussed previously may alternatively be used to construct the aforementioned locked, breakable, puzzle, and or other surprise-oriented objects. Selective laser sintering begins with a bed of unbound powder in a vat or other build platform and uses a laser to fuse powdery particles of metal, plastic, glass, ceramic, and/or other materials into an object. As regions of each layer of loose powder are fused, the unfused powder acts as a support for optional overhangs. Therefore, other support structures aren't needed. Traditionally, the object created via selective laser sintering is lifted out of the container of excess "powder" by a human, cleansed of loose powder, and finished. In the hollow, locked box example discussed herein, using traditional laser sintering techniques the finished (constructed) locked box would normally be filled with loose powder. As a result, to appropriately construct the hollow locked box at least one aperture may be created to allow the loose powder to subsequently be removed after the object is built. In one example, following construction the human recipient uses traditional techniques to drain the locked box of loose powder by vacuuming the inside and/or by soaking the box in a liquid solution that dissolves the powder from within the hollow box. This post-production requirement does, however, lessen the immediacy of the surprise to the recipient, as opening the locked box is preceded by ample preparation. As a result, if utilizing an additive manufacturing technique that requires the use of powder, prior to the additive manufacturing system's 100 release of the surprise-oriented object (or other object) to the recipient, the additive manufacturing system 100 can insert one or more integrated components into the at least one aperture to automatically vacuum the powder from within the object and/or the system 100 can automatically inject a liquid solution to dissolve the powder or other undesired elements. In the attached FIG. 53 example, a hollow three-dimensional box 5310 has an aperture 5320 through which a tube 5330 is inserted to vacuum the aforementioned powder and/or to inject a liquid solution. As a result of this mechanical cleansing of any interior (and exterior) loose powder, the locked box or other surprise object created via selective laser sintering is automatically finished and ready to be accessed by the recipient without significant additional preparation. This same information may apply to breakable, puzzle-oriented, and other surprise-oriented objects as discussed in this application. Alternatively, an optional robotic arm component of the additive manufacturing system 100 can be implemented to automatically remove the undesired powder or other elements in a way that at least in part simulates the processes used by human hands to cleanse objects created through selective laser sintering.

Similar to the discussion above for selective laser sintering, the "3DP" or three-dimensional printing method commercialized by Z Corporation can be applied to locked, breakable, puzzle-oriented, and other objects as disclosed in this application. The 3DP process glues powder together using a binder that is distributed by a print head, layer by layer. As with selective laser sintering, 3DP uses unbound powder as a support structure. As a result, the same techniques discussed for selective laser sintering can apply here.

When locked, breakable, and other surprise-oriented objects are constructed with apertures to remove support materials, strategically placed apertures optionally remain as part of the final design. Alternatively, once the undesired powdered or liquefied material is drained from those apertures, or the interior is otherwise cleaned, the additive manufacturing process can manually or automatically restart to "plug" those apertures with additional material prior to releasing the finished surprise-oriented object to the recipient.

With regard to locked objects, another option includes constructing the objects in an unlocked position, programming the additive manufacturing system 100 to automatically clean them in the necessary manner for the particular additive manufacturing technique utilized, and then lock the object(s) while they are still located within the additive manufacturing system 100. Alternatively, objects can be locked, and then cleansed via an aperture—after which time the aperture is optionally sealed. Similarly, breakable objects are optionally constructed, cleaned as necessary, and then sealed for subsequent deliberate "breaking" by the recipient. Likewise, surprise puzzle-oriented objects are optionally constructed, cleaned as necessary, and then assembled by the system 100 so as to be disassembled later by the human recipient.

The various technical details in the current section of the disclosure may be applied to other additive manufacturing processes—as well as to the other objects and/or computer-implemented methods disclosed in this application. For example, various computer-implemented methods are described that involve reimbursement for materials used by at least one recipient to construct objects "received" as gifts; in this example, selected additive manufacturing systems 100 may optionally be programmed to construct the object gifted to the recipient with as few interior and/or exterior supports as possible. This—and/or the other optional modifications and enhancements of the construction process described herein—will allow the recipient to receive gifts in as complete a manner as possible to preserve spontaneity. If, in contrast, the object gifted to a recipient is instead constructed by at least one third-party remote to the recipient, the aforementioned modifications by selected systems 100 can optionally be bypassed, since spontaneity isn't necessarily an issue. As a second example, objects built by the recipient in multiple successive and/or consecutive portions are similarly optionally programmed to be constructed in as finished a manner as possible to enhance the recipient's excitement. As a third example, objects with select interior indicia can optionally be built by selected systems 100 so that the construction materials and/or processes do not obscure the recipient's view of the temporarily-visible indicia. Finally, select various technical details in this current section may likewise be applied to the objects and associated methods discussed in the next section of this application.

Additional Advances Related to Constructing and Delivering 3D Printed Objects

The surprise-oriented objects discussed in this disclosure may alternatively include flexible and expandable portions that are buttoned, zipped, tied, snapped, attached via Velcro, and/or fastened via another method as part of the additive manufacturing process.

As such, an object created of rubber, textiles, and/or another flexible, stretchable, and/or expandable material can likewise be constructed as a "sealed" surprise to a recipient on an additive manufacturing system 100 such that the flexible, stretchable, and/or expandable object is constructed in the buttoned, zipped, snapped, tied, velcroed, and/or otherwise fastened position. Or, as discussed previously for locked objects, the flexible, stretchable, and/or expandable object is optionally constructed, cleaned or otherwise finished, and then fastened in the appropriate manner by at least one component associated with the additive manufacturing system 100. This way, the recipient receives the flexible, stretchable, and/or expandable object in the closed position, preserving the surprise.

Additionally, stretchable or otherwise expandable objects can be manufactured to be completed in the stretched or otherwise expanded position. For example, the stretchable material is poured by at least one nozzle or other dispenser and initially cooled in the unstretched (i.e., not stretched) position. Once the unstretched material is cooled or otherwise cured, optionally at least one component associated with the additive manufacturing system 100 automatically stretches the material, and then maintains that material in the stretched position by fastening it to an adjacent and comparatively rigid material, e.g., a hard plastic, resin, and/or metal. If that comparatively rigid additional material is also being constructed by the additive manufacturing system 100, the system 100 optionally waits until the comparatively rigid material has hardened and/or otherwise strengthened enough to be able to hold the stretchable material in the stretched position prior to attachment. Optionally, the comparatively rigid (additive manufacturing) material is constructed first, then the stretchable material is constructed in the unstretched or otherwise expanded position, and finally the unstretched (or otherwise expanded) material is stretched and then fastened in the stretched position to the adjacent comparatively rigid materials. Thus, for example, a bow object is created by building a bow "string" via additive manufacturing and then cooling or otherwise curing the string; once cured, the string is stretched by the system 100 and then adhered to flexible hard plastic bow limbs that were also created (prior to the bow string) via additive manufacturing. Since the bow limbs had been given time to cure, the string is able to be held tautly without unduly warping the shape of the bow.

As yet one more option for expandable objects, at least one stretchable component being constructed can be attached to at least one rigid component being constructed while the at least one stretchable component is in the unstretched position, and while one or more comparatively rigid components are constructed in a compacted position. Then, once the components cool and strengthen as preferred, the comparatively rigid component(s) can be elongated mechanically by the system 100 (or manually by the user) into a non-compacted position, causing the at least one stretchable component to lengthen to the desired stretched position and tautness. The rigid component may be snapped and/or otherwise fastened in place in the elongated position, including via the optional application of more additive manufacturing materials. As a result, the bow limbs mentioned in the example above can be constructed in a bent "V" position, with a mechanical joint built at the bottom of the "V"; the ends of the bow limbs are then pulled apart and snapped into place in the elongated position, thereby also stretching the bow string to the proper position and tautness. For expandable objects without stretchable characteristics, at least one expandable component may be attached to at least one other non-expandable component in the expandable and/or non-expanded positions, followed by any optional preferred adjustments.

Furthermore, springs—as well as objects with springs—may be constructed similar to the previously-described stretchable objects. As a result, an extension spring is initially constructed via additive manufacturing in the unstretched (or "compacted") position. Then, for instance, once the rigid material to which the spring is intended to be connected is constructed and cured via the additive manufacturing process, the system 100 stretches the extension spring and fastens it to the rigid material in the stretched position. Alternatively, the extension spring and the part to which it attaches are built as one piece. Both described objects and their corresponding methods allow completed repair parts to be constructed entirely by the additive manufacturing system 100, rather than forcing the user to manually stretch and/or compress springs to attach them to portions of another part before using the assembled part to fix household appliances and other items. Alternatively, as was described with the stretchable material in the prior paragraph, the hardened rigid material is connected to the spring prior to being elongated; the elongation of the rigid material then stretches the spring as needed for appropriate usage. With regard to compression springs, the above method will work in the reverse manner, with the compression spring initially constructed in the stretched position, and the compression spring automatically compacted as preferred once the spring and/or the associated rigid materials strengthen and/or otherwise cure to a predetermined degree.

Figure 54:
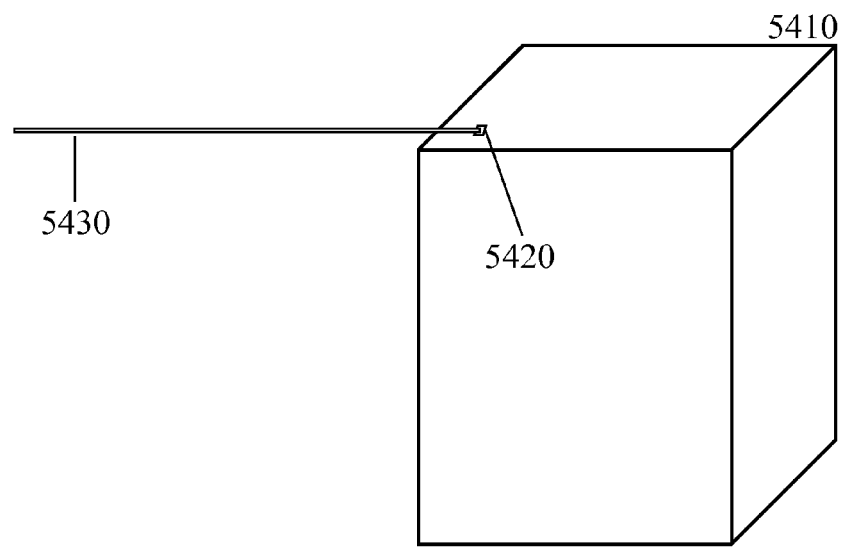
FIG. 54 shows an additive manufacturing object configured to be either vacuum-sealed or pressurized.
Figure 58:
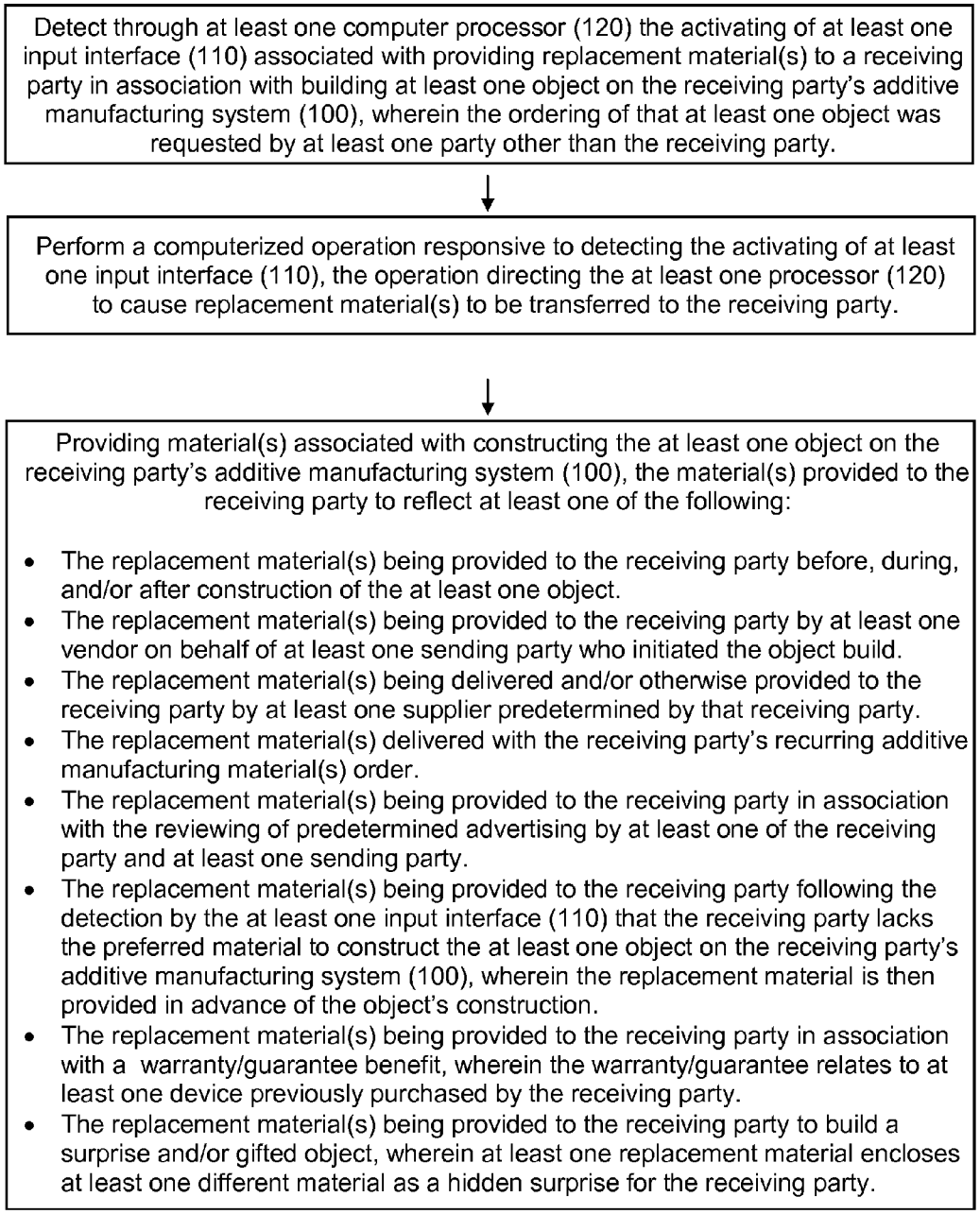
FIG. 58's flow chart exemplifies the computer-implemented methods involved in providing replacement material(s) to the receiving party for at least one object whose build was requested by someone other than the receiving party.

Inflatable stretchable objects may be constructed via additive manufacturing and at least mostly sealed in the non-inflated position. Once the constructed object is cooled and/or otherwise strengthened to a predetermined degree, at least one pump-oriented component optionally associated with the additive manufacturing system 100 inflates the object via, for instance, at least one needle inserted into at least one valve-like aperture within the constructed object. (Reversing how the vacuum hoses suck air from the containers depicted in FIG. 53—and FIG. 54—in this present example a very narrow tube blows air into the associated object.) The inflated object is then presented to the user by the system 100 as a finished object ready for use. Alternatively, the object constructed via additive manufacturing is later inflated separately by the user, retailer, or other party using an unassociated pump. Whether inflating the object as an integral part of the additive manufacturing process, or as a separate procedure, balls, balloons, and other inflatable objects can be constructed via additive manufacturing in a variety of customized ways that had been practically and/or economically unachievable via prior art methods. For instance, inflatable balloons with three-dimensional sculptures of the recipient's name or face or other customized aspects can be constructed and inflated by the sender or retailer as gifts. Alternatively, multiple balloons can be constructed to join with one another as a single-inflatable puzzle object. To prevent various portions of an inflatable object from sticking together during the additive manufacturing construction, the inflatable object is optionally constructed utilizing at least one mold, support structure, and/or other means to separate the portions. At the same time, this extra step is not necessarily needed for many additive manufacturing processes, such as with some DLP versions of the stereolithography process.

FIG. 55 is a simple flow chart example demonstrating a few of the options for a computer-implemented method that may be utilized to construct the previously-described objects with stretchable, inflatable, and/or otherwise expandable components. The method shown in FIG. 55 may optionally be modified to include the variations discussed previously in this section of the disclosure, e.g., inflatable objects that utilize molds, and the construction of objects that include compression springs.

In addition, the aforementioned objects with inflatable component(s) and/or wherein at least the majority of the objects constructed is comprised of at least one expandable component (e.g., an expandable sphere ball), may be expanded following construction into at least one unknown design as a surprise for the receiving party. For example, an inflatable object at least partially unknown to the receiving party and ordered by the sending party is constructed on the receiving party's machinery 150, with the inflating of that object revealing a previously hidden holiday greeting to that receiving party.

Selected objects built via traditional manufacturing methods may optionally be vacuum-sealed or, conversely, pressurized. In the example of traditional vacuum-sealed bags, air is forcibly removed from the inside of the bag to preserve the integrity of perishable contents prior to sealing. In the case of jars and other rigid containers, air is likewise forcibly expelled from the container—or the local manufacturing environment is depressurized when the container is sealed.

Based on this inventor's understanding, the potential for vacuum-sealing has not been explored to date in the field of additive manufacturing. As one promising embodiment disclosed herein, a container object with a lid is constructed via additive manufacturing. The lid may, for instance, be screw-on, flip-top, or similar to the lid on a can of vegetables. Or it may be designed to resemble the pop-top lid of a soda can. Whatever the lid's design, the container object (and/or the lid) is constructed via additive manufacturing, leaving at least one small aperture to allow the subsequent vacuuming of air. The desired contents are then inserted manually by hand, and/or automatically by at least one component associated with the system 100 into the constructed container object. Depending upon their nature, the contents may likewise be constructed via additive manufacturing processes or they may be created via traditional processes, e.g., the traditional growing and cooking of foods. Once the additive manufacturing container is constructed and the desired contents are inserted, the user or system 100 seals the constructed lid of the container into place to close the container. At least one aperture, however, optionally remains open to allow at least one component associated with the additive manufacturing system 100 to vacuum air from the container. The at least one aperture may be in the lid and/or in the container itself. In one example, at least one one-way valve is implemented as part of the at least one aperture; thus, once the air is vacuumed through the one-way valve to a predetermined degree, the manufacturing process is optionally complete. Alternatively, once the air is vacuumed from the container object, the system 100 can be programmed to place supplementary additive manufacturing material over the aperture to cause the irreversible closure of the now vacuum-sealed object. To address other variations, an optional lid can be manufactured simultaneous to the rest of the container or, for instance, the lid can be manufactured after the contents are inserted; relating to this latter example, the lid can be manufactured directly onto the top of the container following insertion of the contents (similar to how a traditionally-manufactured soda can is sealed). As another option, the container's contents can be manually inserted by the user or other party and then returned to the system 100 for closing and/or vacuum-sealing. As yet one more option, a lid-free container can be constructed via manufacturing, similar in concept to a cardboard milk or juice box container. The desired contents are then inserted automatically (or manually by the user) into this lidless container, and the container is subsequently vacuum-sealed; this vacuum-sealing could occur using the same aperture through which the contents were inserted; or it could occur through a separate (optionally much smaller) aperture. Once the vacuum-sealing is complete, the chosen aperture is optionally permanently closed via the insertion of additional additive manufacturing material, e.g., a cardboard-oriented substance for half-gallon milk and orange juice containers. Referring back to FIG. 54, that diagram illustrates an example of a lidless cardboard, metal, or plastic container 5410 with a small secondary aperture 5420 (with an optional one-way valve) into which a needle 5430 is inserted to vacuum-seal the container 5410.

Related to the above disclosure, soda and select other products are pressurized—as opposed to vacuum-sealed. As a result, the aperture 5420 depicted in FIG. 54 would in this example instead allow a narrow needle or tube 5430 to inject carbon dioxide or another substance into a one-way valve or other sealable aperture to pressurize the container 5410.

Regarding incorporating additive manufacturing techniques into the playing of electronic games, selected portions of a single object can be constructed by the system 100 in a standard, staggered, unconventional, and/or even random manner as the user meets predetermined objectives in one or more associated games. For instance, select portions are optionally constructed in typical construction order, such as first building the feet of an avatar statue, then the legs, then the torso and head. Or predetermined portions are constructed out-of-order or otherwise in a non-traditional arrangement to help build excitement, and/or to leave the user guessing about the nature of the object under construction. Moreover, combinations of vertical, diagonal, and/or horizontal "slices" of a single object are optionally constructed in consecutive, successive, and/or seemingly haphazard ways via the additive manufacturing system 100 until the object is fully constructed for the user. As another example, at least a first portion of a one-piece sculpture is partially built after the user completes at least a first task in an electronic game, and then at least a second portion of that one-piece sculpture can be built after the user completes at least a second task, with the sculpture finally finished once the user completes selected predetermined tasks. The reward for successfully completing the tasks is therefore receipt of the finished sculpture or other object. The same above-described methods could be utilized to build multiple additive manufacturing objects while playing an electronic game, with portions of multiple objects built concurrently and/or, for instance, in a staggered order.

As a related alternative, the object constructed traditionally—and/or through any combination of the aforementioned vertical, diagonal, and/or horizontal "slices"—is optionally tied to an electronic game whereby the user is challenged to guess the nature of the one or more additive manufacturing objects under construction (prior to the one or more objects' completion). Just like the old game show "Name That Tune," the sooner the user guesses information associated with the object(s) the better the user does in the electronic game. Moreover, at least one sending party and at least one receiving party may take turns competing in this game; in fact, jumping briefly to the FIG. 57 flow chart example, the at least one sending party may initiate the request to print the game object on the at least one receiving party's machinery 150, but the sending party may optionally not know what that object is and the object may have been selected by at least one third-party. Likewise, similar or identical game objects constructed by both the receiving party and the sending party may be selected by the third-party, with the receiving and sending parties competing to beat the other in more quickly identifying the game object(s) constructed on their own respective systems (e.g., 100).

Combining the above "Name That Tune" features with those discussed in FIGS. 12 to 15, additive manufacturing material may optionally be transformed through successive and/or consecutive builds into at least one object that the user is tasked with identifying as quickly as possible during and/or after the build process, utilizing the system's 100 at least one input interface 110 as part of a game. In this example, the user is tasked with identifying the potentially-unified at least one object—without connecting the portions—and/or the user is tasked with assembling multiple portions to help determine the at least one object's identity.

Furthermore, the "Name That Tune" configurations described in this application may be combined with the interior indicia innovations also disclosed, as well as with the three-dimensional structure innovations explained below. For instance, users may be tasked with identifying as quickly as possible indicia (or interior structures) that are temporarily-viewable on the exposed interior of an object being constructed on a 3D printer. Or, for instance, users may be tasked with answering quiz questions posed by the indicia, with the user's responses detected by an associated computerized input interface 110.

As another embodiment, during construction of a main three-dimensional object, at least one three-dimensional structure is constructed within (or as a portion of) that main object, with that at least one three-dimensional interior structure subsequently surrounded by more additive manufacturing material so that the at least one three-dimensional structure dissolves fully (or at least in part) into the main object once that main object is more fully constructed. In other words, the additive manufacturing material is transformed into a temporary and/or temporarily-viewable three-dimensional structure, with that structure presented during at least a portion of the main object's construction process, and with that structure subsequently at least partly hidden to the user once the main object's construction is complete. For instance, if a girl is constructing a castle object on her family's additive manufacturing system 100, during the construction process a three-dimensional figurine of Snow White is initially built into the center of that castle object under construction, with the interior Snow White figurine later surrounded by more additive manufacturing material so that her figurine is transfigured into the final castle object that was originally intended to be built via additive manufacturing. Optionally, prior to being transfigured into the final desired castle object, more material is deposited so that the Snow White figurine is surrounded by a dark forest, shown holding a three-dimensional apple, and/or is transfigured into figurines of the seven dwarves, demonstrating that multiple successive and/or concurrent temporarily-viewable interior structures can be constructed within the aforementioned unfinished main object. Finally, for instance, the last material is deposited by the 3D printer and the castle object is optionally finished with no visible trace of the interior Snow White figurine or any of the other interior three-dimensional structures. As one alternative, the figurine of Snow White is configured to be partly visible through a physical aperture in the castle wall—or is visible via transparent exterior additive manufacturing material. As another alternative, a portion of that Snow White figurine is optionally visible on the castle object's exterior while the rest of her figurine is hidden by additive manufacturing material that represents the exterior of that castle object.

This interior structure building process can be implemented for the user's amusement while the main object is being constructed. Moreover, for example, the process is optionally used to help tell stories, wherein related text is constructed of additive manufacturing materials on the exposed interior surface of the unfinished object by the system 100 to complement the one or more interior structures being built during the main object's manufacture. Alternatively, the story text can be presented through at least one computerized projector.

The interior structure building process can also be utilized to display temporarily-viewable advertising, with at least a portion of the three-dimensional ad—and in many cases the entire ad—hidden once the main object's build is complete. Optionally, this same build process can be blended into an electronic game; for instance, the user's completion of selected game tasks leads to the corresponding building of selected successive and/or concurrent additional three-dimensional interior structures within the main object; then, when the user has completed the game or selected portions thereof, the construction of the main object is finished and the one or more interior structures are fully (or at least partially) hidden within the main object. From another perspective, one or more temporarily-viewable three-dimensional structures may comprise at least one object sample the user is invited to order. Or, for instance, the interior structure(s) comprise at least one temporarily-visible social occasion greeting from the sending party, while the overall object constructed comprises a permanent gift from that same sending party. Taking another approach, only portions of a three-dimensional interior structure is constructed so that, for instance, only part of an apple juts out of the Snow White castle object during construction, with the temporarily-visible apple portion then disappearing completely within the castle's material once the castle is complete.

Next, separate objects that include temporary and/or temporarily-viewable interior three-dimensional structures may be constructed at least partly concurrently, wherein all or select interior structures within each separate object are constructed in synchronization with one another to effect a performance and/or to otherwise display coordinated entertainment between separate objects. This approach generates a synchronized presentation of temporarily-viewable structures in different main objects.

To avoid potential production issues related to, for example, applying hot melted material to previously cooled material in the fused filament fabrication method, in select cases it may be desired to construct the main and temporarily-viewable three-dimensional objects with differing materials that have differing melting points. Or, for instance, differing print methods may optionally be utilized to help ensure the integrity of select materials. In other cases, no special materials and/or preparation are required.

Further building upon these interior three-dimensional structure examples, optionally at least one input interface 110 senses the nearby user's physical movement, leading at least one processor 120 and the overall additive manufacturing system 100 to analyze the user's one or more physical movements and then dynamically change the design of at least one temporarily-visible three-dimensional structure as a result of those physical movements. As a result, a dancing nearby user may, for example, lead to the building of a 'dancing' Mickey Mouse as an interior structure within the unfinished main object. In a similar example, at least one overall additive manufacturing system 100 senses and analyzes the physical proximity of at least a part of the user's body through at least one input interface 110, leading to the presentation of at least one temporarily-viewable interior three-dimensional structure in a direction proximate to the location of that at least a portion of the user; thus, for example, an advertisement is presented facing the sitting user's chair and/or angled toward that user's current eye level. As another example, an additive manufacturing system's 100 input interface(s) 110 and processor(s) 120 may be associated with at least one predetermined parameter to evaluate when the user is in proximate physical distance, watching, and/or is otherwise attentive to the object build; failure to meet the attentiveness parameter(s) delays the building of the at least one temporarily-viewable three-dimensional structure; in contrast, the user's current and/or subsequent meeting of the attentiveness parameter(s) activates the building of the temporarily-viewable structure(s). In fact, if the user is not proximate, watching, and/or otherwise attentive to the building of the main object, the building of one or more of the temporarily-viewable structures is optionally delayed until one or more future objects are constructed and the corresponding attentiveness parameters are met. This is especially helpful for the advertising industry. The examples in this paragraph may also be applied to the temporarily-viewable indicia embodiments discussed previously in this patent application. For instance, at least one associated input interface 110 connected to a computerized analysis of the user's physical movement, proximity, and/or attentiveness to the build process dynamically causes the system 100 to activate, change, and/or delay at least one temporarily-viewable indicia to reflect that detected physical movement, proximity, and/or attentiveness to the build process—and/or even to delay the presentation of some or all of the indicia until the parameter(s) are met in at least one future object's construction. As one last related specific example, if the additive manufacturing system 100 senses and analyzes the user is yawning that morning, temporarily-viewable indicia and/or three-dimensional structures may be built on the exposed interior of the unfinished main object to advertise a coffee product.

The FIG. 56 flow chart illustrates an example of a basic computer-implemented method utilized to construct one or more three-dimensional interior structures within an unfinished main three-dimensional object utilizing the receiving party's additive manufacturing machinery 150. The interior structures described are at least in part only temporarily-viewable. As an alternative to this flow chart, a retailer or other third-party's system 100 can be utilized to construct the interior structures discussed in FIG. 56 to entertain customers or other users. In addition, this basic method can be further modified to accomplish the various other interior structure embodiments and variations described above.

As a final note related to temporarily-visible three-dimensional structures, perceiving the previously-discussed FIGS. 30, 31, and 32 as including three-dimensional characters that are built onto at least one exposed interior surface of unfinished main objects—rather than just two-dimensional indicia—helps to further exemplify the above-described temporarily-viewable three-dimensional structures.

As another game-oriented embodiment, if the user captures an opponent's game pieces or other elements in an electronic game, those captured elements are optionally printed on the user's 3D printer as the elements are won and/or as desired by the user. Optionally, those captured elements are connectable: when a sufficient quantity is gathered a desired puzzle or other object is able to be assembled, with the successful assembly optionally enabling the user to win the game or portions thereof.

Alternatively, an electronic game is configured to enable the user to print elements of at least one associated physical puzzle or other object via additive manufacturing as the user completes selected corresponding electronic game tasks. The complete, successful assembly of the physical puzzle or other object is then optionally detected by game sensors, leading the user to win the game or selected portions thereof. As another variation, the user employs the assembled physical puzzle to gain information and/or tools to subsequently advance in the related electronic game.

The FIG. 57 flow chart example discussed previously leads to another feature related to constructing additive manufacturing objects that are at least partly unknown to the at least one sending party. Assume, for example, the at least one sending party initiates the request to build at least one object on at least one receiving party's machinery 150. Next, the at least one third-party selects the specific at least one object to build, with that at least one object to be built at least partly unknown to the at least one sending party. Then, as one option, the one or more portions of the object(s) are electronically revealed to the at least one sending party proximate to the object(s)—and/or discrete portions thereof—being physically constructed by the receiving party on the receiving party's additive manufacturing system. In other words, at least one portion of the at least one object constructed is optionally revealed to the sender and recipient at the same time (or within a predetermined time-range of one another)—only the recipient sees the actual object(s) built while the sender receives electronic data revealing information pertaining to those same object(s).

Constructing 3D printed objects in association with social networks was likewise indicated earlier in this application. For instance, 3D printing functions may be fused with Facebook postings and/or other functions on the social network so that a posting, for example, may at least in part cause an object to be printed on a recipient or service bureau's 3D printer. Taking this a step further, however, a single object (or multiple objects) may be created collaboratively for a recipient by multiple Facebook users. This "social" creation of objects may lead to uniquely-satisfying gifts constructed for recipients. For example, on the morning of a Facebook user's birthday select connected friends may use the social network to order the building of at least one birthday cake "sculpture" on the recipient's 3D printer—while optionally chipping-in to reimburse the recipient for material costs. Moreover, messages and/or designs from multiple friends may optionally be imprinted on different facets of the same plastic cake (or actual food cake, if built on a food 3D printer), so that this single object becomes a gift created jointly on Facebook by multiple senders. Moreover, optionally different detachable segments of this gift object may be ordered and/or designed by different friends, so that the various segments can be connected to form, for instance, the single cake object previously mentioned—or, conversely, a "friend tree" or other gift object whose "completeness" is not necessarily dependent upon a certain number of willing Facebook senders. These latter object segments printed by the recipient may be connected to one another to form a unique gift, with the recipient then able to post on Facebook a depiction of the "joined" printed object created by her friends.

Finally, building upon the interior indicia embodiments described previously in this application, messages or other indicia within food objects created via similar 3D printing methods may change as the recipient eats discrete portions of at least one object. For example, after a consumer takes a bite of a first designated segment of candy, the word "I" appears in the interior of that first candy segment; following a bite from a second designated segment, the word "love" is visible; after a bite from the third segment, the word "you" appears; and following the fourth bite, the recipient's name within a heart graphic is displayed. This embodiment therefore enables unique forms of edible entertainment.

Several Advantages of the Embodiments Described in this Disclosure

Several embodiments and corresponding features shown in this patent disclosure have the advantage of surprising and exciting the receiving party and/or the sending party through the novel construction of objects—or portions of objects—utilizing additive manufacturing machinery 150.

With the recipient in charge of her own home "product factory," and with this product factory connected in innovative ways to sending parties and third-parties, the recipient will be able to accomplish much more than simply construct products. Instead—as is explained throughout this patent disclosure—the construction process will itself provide new forms of entertainment and new ways to interact. As just one example described herein, the receiving party is enabled to construct multiple portions of objects concurrently and/or successively in novel ways, creating challenging toys, lottery tickets, and gift cards distinct from the prior art. As a second example, receiving parties will be able to construct objects on their additive manufacturing machinery 150 to reveal what will occur next in a fictional media presentation, enhancing the excitement and anticipation for receiving parties as they engage a novel or movie. As a third example, receiving parties will be entertained watching objects gain temporarily-viewable indicia and/or temporarily-viewable three-dimensional structures during portions of the additive manufacturing process. As a fourth example, surprise objects are constructed by the receiving party in a strategic order—or at least partly hidden behind barriers made from additive manufacturing materials—to ensure the included surprises are preserved until ready for unveiling. As a fifth example that builds excitement for the sender, object builds may be initiated by sending parties through third-parties, with the nature of the objects at least partly unknown to the senders until a predetermined unveiling. Sixth, and to enhance the object delivery process, a gift digitally ordered by a sender through a third-party that meets a receiving party's desired parameters is optionally built automatically by the recipient's machinery 150 even though the gift is initially unknown to the recipient—whereas undesirable objects are barred from being built on that recipient's machinery 150.

Related embodiments and features enable receiving parties to be reimbursed for material costs in a variety of distinctive ways for building objects "gifted" to them via their additive manufacturing systems 100. Furthermore, compensation may be provided in a unique manner to third-party printers for objects "gifted" by sending parties to receiving parties. These and other embodiments related to reimbursement and/or the replacement of materials used by recipients lead to a novel form of "PayPal" designed specifically to enhance payment procedures for the 3D printing industry.

In sum, various embodiments in this patent disclosure have the advantage of advancing the user's ability to interact with manufactured goods in distinctive ways. They turn a basic 3D printer into an engaging entertainment platform intended to help grow the home-based 3D printing niche into an omnipresent sector capable of transforming the industrial age's vision of manufacturing. Additional advantages of these additive manufacturing embodiments are described, indicated, and inferred throughout this disclosure.

While the various embodiments and their related features include many specifics that are detailed in this patent disclosure, these should not be construed as limitations on the scope of the embodiments but as merely providing illustrations of some of the present embodiments. Additional advantages and modifications for the various embodiments will readily occur to those skilled in the art, and some of the features described herein may be accomplished without all of the specific details outlined, or with additional details, and/or in a different suitable order than the exemplary steps shown, without departing from the scope of the innovations. Similarly, various embodiments may be utilized by those skilled in the art with different configurations for software, hardware, and/or other components—while likewise remaining within the scope of the innovations. Therefore, the present patent disclosure in its broader aspects is not limited to the specific embodiments, details, and representative devices shown and described herein. Accordingly, various changes, substitutions, and alterations may be made to such embodiments without departing from the spirit or scope of the general innovative concept as defined by the appended claims. Similarly, headers are listed in this specification for ease of use, rather than an intended limiting of the patent disclosure. Finally, the scope of the embodiments should be determined by the appended claims and their legal equivalents, rather than by the examples given.

What is claimed is:

1. A method for a user to manufacture a three-dimensional object at least in part as entertainment, the three-dimensional object constructed through an additive manufacturing system, the additive manufacturing system comprised of a three-dimensional printer, one or more input interfaces, a non-transitory computer storage medium, and a computer processor, the additive manufacturing system configured to operate in conjunction with one or more electronic games, the method comprising:

(a) detecting, by at least one of the one or more input interfaces, one or more game-related inputs caused, at least in part, by one or more predetermined game task results being attained by the user in the one or more electronic games, the one or more predetermined game task results being attained instead of one or more alternative game task results; and (b) performing, by the computer processor, at least one game-related operation in response to the detecting of the one or more game-related inputs, the at least one game-related operation retrieving data from the non-transitory computer storage medium, the data including at least one determined construction configuration used to build one or more game-related portions of the three-dimensional object, the at least one game-related operation implementing the three-dimensional printer to use one or more additive manufacturing materials to build the one or more game-related portions of the three-dimensional object using the at least one determined construction configuration instead of at least one alternative construction configuration;

(c) wherein the finished three-dimensional object is comprised of the one or more game-related portions, and wherein the building of the one or more game-related portions of the three-dimensional object through the at least one game-related operation includes using the at least one determined construction configuration due, at least in part, to the attaining by the user of the one or more predetermined game task results instead of the one or more alternative game task results.

2. The method of claim 1, wherein the one or more game-related portions described in claim 1 are built using the at least one determined construction configuration instead of the at least one alternative construction configuration due, at least in part, to the attaining by the user of the one or more predetermined game task results instead of the one or more alternative game task results, wherein the one or more alternative game task results are configured to lead to the at least one alternative construction configuration, wherein the at least one alternative construction configuration is configured to lead to a construction of an alternatively-configured three-dimensional object, and wherein the three-dimensional object is configured to differ in design from the alternatively-configured three-dimensional object.

3. The method of claim 1, wherein the one or more game-related portions described in claim 1 are built using the at least one determined construction configuration instead of the at least one alternative construction configuration due, at least in part, to the attaining by the user of the one or more predetermined game task results instead of the one or more alternative game task results, wherein the one or more alternative game task results are configured to lead to the at least one alternative construction configuration, wherein the at least one alternative construction configuration is configured to lead to a construction of an alternatively-configured three-dimensional object, and wherein the three-dimensional object differs from the alternatively-configured three-dimensional object in at least one of the following ways that include the completed three-dimensional object has at least one different function than the completed alternatively-configured three-dimensional object, the completed three-dimensional object has a different number of distinct portions than the completed alternatively-configured three-dimensional object, and/or the three-dimensional object has a different number of distinct portions constructed in a single build phase compared to the alternatively-configured three-dimensional object.

4. The method of claim 1, wherein the one or more electronic games are configured to be played by the user, at least in part, through the additive manufacturing system, with the additive manufacturing system including one or more interfaces configured, at least in part, to operate as one or more electronic-game-play interfaces, the one or more electronic-game-play interfaces configured to advance game play, in part, by delivering game-play output signals from the computer processor to the user during at least one electronic-game-play operation, the one or more electronic-game-play interfaces further configured to advance electronic game play, in part, by delivering game-play input signals from the user to the computer processor, wherein the at least one electronic-game-play operation performed by the computer processor leads the user to respond, through at least one of the one or more electronic-game-play interfaces, to at least one game task challenge, and wherein the responding by the user to the at least one game task challenge is, at least in part, configured to cause the one or more predetermined game task results described in claim 1.

5. The method of claim 1, with the additive manufacturing system further arranged to operate in conjunction with one or more electronic components configured, at least in part, to transmit game-play output signals to the user from at least one electronic-game-related computer processor operating in conjunction with the additive manufacturing system, with the game-play output signals configured, at least in part, through game-play data being stored on at least one electronic-game-related computer storage medium operating in conjunction with the additive manufacturing system, and with at least one electronic-game-related input interface, operating in conjunction with the additive manufacturing system, configured to transmit game-play input signals from the user to the at least one electronic-game-related computer processor, thereby leading to the one or more predetermined game task results described in claim 1.

6. The method of claim 1, with the additive manufacturing system further configured to utilize at least one communications network to operate in conjunction with at least one electronic-game-related computerized system, the at least one electronic-game-related computerized system comprised of at least one electronic-game-related computer processor, at least one electronic-game-related interface to process input-output signals, and at least one electronic-game-related non-transitory computer storage medium, the at least one electronic-game-related computerized system configured to enable the user to play the one or more electronic games, with the attaining by the user of the predetermined game task results through the at least one electronic-game-related computerized system communicated to the additive manufacturing system via the at least one communications network, thereby advancing construction of the three-dimensional object as described in claim 1.

7. The method of claim 1, wherein the additive manufacturing system configured to construct the three-dimensional object further comprises at least one of the following group consisting of multiple three-dimensional printers, multiple non-transitory computer storage mediums, and/or multiple computer processors.

8. The method of claim 1, wherein the one or more game-related portions described in claim 1 are further defined as one game-related portion, and wherein the three-dimensional object consists of the one game-related portion.

9. The method of claim 1, wherein the three-dimensional object is further configured to include one or more additional portions, the one or more additional portions built through at least one additional operation performed by the computer processor, the at least one additional operation activated in response to a detecting, by at least one of the one or more input interfaces, of one or more additional inputs, the at least one additional operation retrieving additional data from the non-transitory computer storage medium, the additional data including at least one additional determined construction configuration used to guide the building of the one or more additional portions of the three-dimensional object, the at least one additional operation implementing the three-dimensional printer to use one or more additional additive manufacturing materials to build the one or more additional portions of the three-dimensional object as guided by the at least one additional determined construction configuration, wherein at least one of the one or more additional portions of the three-dimensional object is built before or after construction of at least one of the one or more game-related portions described in claim 1.

10. The method of claim 1, wherein the one or more predetermined game task results include a winning by the user of at least one of the one or more electronic games.

11. The method of claim 1, wherein at least part of the three-dimensional object is further configured to include a revealing of at least part of at least one wager outcome, the at least one wager outcome at least partially determined by at least one of the one or more predetermined game task results.

12. The method of claim 1, wherein the one or more game-related portions are further defined as being comprised of multiple separate game-related portions, wherein the multiple separate game-related portions are constructed at least one of concurrently and/or consecutively, and wherein the multiple separate game-related portions are further configured to be assembled into the three-dimensional object by the user, at least in part, as a puzzle challenge.

13. The method of claim 1, wherein the three-dimensional object is comprised of a plurality of distinct portions, wherein the attaining by the user of the one or more predetermined game task results is further defined as an attaining by the user of at least one earlier predetermined game task result followed by an attaining by the user of at least one subsequent predetermined game task result, wherein the at least one game-related operation is further defined as a plurality of successive game-related operations configured to successively build at least two of the plurality of distinct portions, and wherein the attaining by the user of the at least one earlier predetermined game task result leads to an earlier building of at least one of the plurality of distinct portions while the attaining by the user of the at least one subsequent predetermined game task result leads to a subsequent building of at least one other of the plurality of distinct portions.

14. The method of claim 1, further comprising, prior to finishing construction of the three-dimensional object, a detecting, by at least one of the one or more input interfaces, of one or more next game-related inputs caused, at least in part, by an attaining by the user of one or more next predetermined game task results instead of one or more next alternative game task results, the attaining of the one or more next predetermined game task results leading to at least one next operation performed by the computer processor, the at least one next operation retrieving a next set of data from the non-transitory computer storage medium, the next set of data including at least one next construction configuration used to guide a building of one or more next portions of the three-dimensional object, the at least one next operation implementing the three-dimensional printer to use one or more next additive manufacturing materials to build the one or more next portions of the three-dimensional object as guided by the at least one next construction configuration, wherein a succession of construction configurations used to help build the three-dimensional object are caused, at least in part, by a corresponding succession of attained game task results.

15. The method of claim 1, wherein the at least one determined construction configuration is included in one or more computer-aided design files, wherein the at least one alternative construction configuration is included in the same one or more computer-aided design files and/or in at least one different computer-aided design file, and wherein the at least one game-related operation retrieves the at least one determined construction configuration from the one or more computer-aided design files to construct the one or more game-related portions of the three-dimensional object.

16. The method of claim 1, wherein the at least one determined construction configuration for the three-dimensional object is at least partly predetermined prior to the detecting of the one or more game-related inputs, the at least one determined construction configuration being stored as at least part of the data on the non-transitory computer storage medium, and wherein the at least one determined construction configuration is modified at least once at least partly as a result of the detecting of the one or more game-related inputs.

17. The method of claim 1, wherein at least a majority of the completed three-dimensional object consists of one inseparable piece constructed in two or more successive portions, wherein the one or more game-related portions are further defined as two or more game-related portions, and wherein the two or more game-related portions comprise at least two of the two or more successive portions.

18. The method of claim 1, wherein at least one of the one or more electronic games is configured to be played, at least in part, through the additive manufacturing system, with at least one electronic game operation performed by the computer processor leading the user to respond, through at least one of the one or more input interfaces, to at least one knowledge question, wherein a correct answering by the user of a predetermined combination of the at least one knowledge question is, at least in part, configured to cause the at least one determined construction configuration through the process described in claim 1.

19. The method of claim 1, with the additive manufacturing system further configured to utilize at least one communications network to operate in conjunction with at least one other computerized system, the at least one other computerized system comprised of one or more other computer processors, one or more other non-transitory computer storage mediums, and one or more knowledge-question-related interfaces configured to process input-output signals, the at least one other computerized system configured to enable the user to play at least one of the one or more electronic games by interacting with at least one of the one or more knowledge-question-related interfaces, this interacting by the user communicated to and from at least one of the one or more other computer processors, with at least one of the one or more other computer processors further configured to retrieve knowledge-question-related data from at least one of the one or more other non-transitory computer storage mediums, with the playing of the at least one of the one or more electronic games by the user on the at least one other computerized system communicated to the additive manufacturing system through the at least one communications network, wherein the at least one of the one or more electronic games is configured to enable the user, through at least one of the one or more knowledge-question-related interfaces, to respond to at least one knowledge question, and wherein a correct answering by the user of a predetermined combination of the at least one knowledge question is, at least in part, configured to be communicated to the additive manufacturing system through the at least one communications network, thereby at least in part causing the one or more predetermined game task results described in claim 1.

20. An additive manufacturing system enabling a user to manufacture a three-dimensional object at least in part as entertainment, the additive manufacturing system comprised of one or more three-dimensional printers, one or more input interfaces, one or more non-transitory computer storage mediums, and one or more computer processors, the additive manufacturing system configured to operate in conjunction with one or more electronic games, the additive manufacturing system configured to perform a process as follows:

(a) detecting, by at least one of the one or more input interfaces, one or more game-related inputs caused, at least in part, by one or more predetermined game task results being attained by the user in the one or more electronic games, the one or more predetermined game task results being attained instead of one or more alternative game task results; and (b) performing, by at least one of the one or more computer processors, at least one game-related operation in response to the detecting of the one or more game-related inputs, the at least one game-related operation retrieving data from at least one of the one or more non-transitory computer storage mediums, the data including at least one determined construction configuration used to build one or more game-related portions of the three-dimensional object, the at least one game-related operation implementing at least one of the one or more three-dimensional printers to use one or more additive manufacturing materials to build the one or more game-related portions of the three-dimensional object using the at least one determined construction configuration instead of at least one alternative construction configuration;

(c) wherein the finished three-dimensional object is comprised of the one or more game-related portions, and wherein the building of the one or more game-related portions of the three-dimensional object through the at least one game-related operation includes using the at least one determined construction configuration due, at least in part, to the attaining by the user of the one or more predetermined game task results instead of the one or more alternative game task results.

21. The additive manufacturing system of claim 20, wherein the one or more game-related portions described in claim 20 are built using the at least one determined construction configuration instead of the at least one alternative construction configuration due, at least in part, to the attaining by the user of the one or more predetermined game task results instead of the one or more alternative game task results, wherein the one or more alternative game task results are configured to lead to the at least one alternative construction configuration, wherein the at least one alternative construction configuration is configured to lead to a construction of an alternatively-configured three-dimensional object, and wherein the three-dimensional object is configured to differ in design from the alternatively-configured three-dimensional object.

22. The additive manufacturing system of claim 20, wherein the one or more game-related portions described in claim 20 are built using the at least one determined construction configuration instead of the at least one alternative construction configuration due, at least in part, to the attaining by the user of the one or more predetermined game task results instead of the one or more alternative game task results, wherein the one or more alternative game task results are configured to lead to the at least one alternative construction configuration, wherein the at least one alternative construction configuration is configured to lead to a construction of an alternatively-configured three-dimensional object, and wherein the three-dimensional object differs from the alternatively-configured three-dimensional object in at least one of the following ways that include the completed three-dimensional object has at least one different function than the completed alternatively-configured three-dimensional object, the completed three-dimensional object has a different number of distinct portions than the completed alternatively-configured three-dimensional object, and/or the three-dimensional object has a different number of distinct portions constructed in a single build phase compared to the alternatively-configured three-dimensional object.

23. The additive manufacturing system of claim 20, wherein the one or more electronic games are configured to be played by the user, at least in part, through the additive manufacturing system, with the additive manufacturing system further including one or more components configured, at least in part, to transmit game-play input-output signals between the user and at least one of the one or more computer processors, with this configuration enabling at least one game-play input signal transmitted from the user to lead to the one or more predetermined game task results described in claim 20.

24. The additive manufacturing system of claim 20, wherein the one or more electronic games are configured to be played by the user, at least in part, through the additive manufacturing system, with the additive manufacturing system further including one or more electronic-game-play interfaces, the one or more electronic-game-play interfaces configured, at least in part, to transmit game-play input-output signals between the user and at least one of the one or more computer processors during at least one electronic-game-play operation, wherein the at least one electronic-game-play operation performed by the at least one of the one or more computer processors, using electronic game data retrieved from at least one of the one or more non-transitory computer-storage mediums, leads the user to respond, through at least one of the one or more electronic-game-play interfaces, to at least one game task challenge, and wherein the responding by the user to the at least one game task challenge is, at least in part, configured to cause the one or more predetermined game task results described in claim 20.

25. The additive manufacturing system of claim 20, with the additive manufacturing system further configured to utilize at least one communications network to operate in conjunction with at least one other computerized system, the at least one other computerized system comprised of at least one other computer processor, at least one other input interface, at least one other non-transitory computer storage medium, and at least one computer-implemented display, the at least one other computerized system configured to enable the user to play the one or more electronic games, with the attaining by the user of the predetermined game task results through the at least one other computerized system communicated to the additive manufacturing system via the at least one communications network, thereby advancing construction of the three-dimensional object as described in claim 20.

26. The additive manufacturing system of claim 20, wherein the one or more game-related portions described in claim 20 are further defined as one game-related portion, and wherein the three-dimensional object consists of the one game-related portion.

27. The additive manufacturing system of claim 20, wherein the three-dimensional object is further configured to include one or more additional portions, the one or more additional portions built through at least one additional operation performed by at least one of the one or more computer processors, the at least one additional operation activated in response to a detecting, by at least one of the one or more input interfaces, of one or more additional inputs, the at least one additional operation retrieving additional data from at least one of the one or more non-transitory computer storage mediums, the additional data including at least one additional determined construction configuration used to build the one or more additional portions of the three-dimensional object, the at least one additional operation implementing at least one of the one or more three-dimensional printers to use one or more additional additive manufacturing materials to build the one or more additional portions of the three-dimensional object using the at least one additional determined construction configuration, wherein at least one of the one or more additional portions of the three-dimensional object is built before or after construction of at least one of the one or more game-related portions described in claim 20.

28. The additive manufacturing system of claim 20, wherein the one or more predetermined game task results include a winning by the user of at least one of the one or more electronic games.

29. The additive manufacturing system of claim 20, wherein at least part of the three-dimensional object is further configured to include a revealing of at least part of at least one wager outcome, the at least one wager outcome at least partially determined by at least one of the one or more predetermined game task results.

30. The additive manufacturing system of claim 20, wherein the one or more game-related portions are further defined as being comprised of multiple separate game-related portions, wherein the multiple separate game-related portions are constructed at least one of concurrently and/or consecutively, and wherein the multiple separate game-related portions are further configured to be assembled into the three-dimensional object by the user, at least in part, as a puzzle challenge.

31. The additive manufacturing system of claim 20, wherein the three-dimensional object is comprised of a plurality of distinct portions, wherein the attaining by the user of the one or more predetermined game task results is further defined as an attaining by the user of at least one earlier predetermined game task result followed by an attaining by the user of at least one subsequent predetermined game task result, wherein the at least one game-related operation is further defined as a plurality of successive game-related operations configured to successively build at least two of the plurality of distinct portions, and wherein the attaining by the user of the at least one earlier predetermined game task result leads to an earlier building of at least one of the plurality of distinct portions while the attaining by the user of the at least one subsequent predetermined game task result leads to a subsequent building of at least one other of the plurality of distinct portions.

32. The additive manufacturing system of claim 20, further comprising, prior to finishing construction of the three-dimensional object, a detecting, by at least one of the one or more input interfaces, of one or more next game-related inputs caused, at least in part, by an attaining by the user of one or more next predetermined game task results instead of one or more next alternative game task results, the attaining of the one or more next predetermined game task results leading to at least one next operation performed by at least one of the one or more computer processors, the at least one next operation retrieving a next set of data from at least one of the one or more non-transitory computer storage mediums, the next set of data including at least one next construction configuration used to guide a building of one or more next portions of the three-dimensional object, the at least one next operation implementing at least one of the one or more three-dimensional printers to use one or more next additive manufacturing materials to build the one or more next portions of the three-dimensional object as guided by the at least one next construction configuration, wherein a succession of construction configurations used to help build the three-dimensional object are caused, at least in part, by a corresponding succession of attained game task results.

33. The additive manufacturing system of claim 20, wherein the at least one determined construction configuration is included in one or more computer-aided design files, wherein the at least one alternative construction configuration is included in the same one or more computer-aided design files and/or in at least one different computer-aided design file, and wherein the at least one game-related operation retrieves the at least one determined construction configuration from the one or more computer-aided design files to construct the one or more game-related portions of the three-dimensional object.

34. The additive manufacturing system of claim 20, wherein the at least one determined construction configuration for the three-dimensional object is at least partly predetermined prior to the detecting of the one or more game-related inputs, the at least one determined construction configuration being stored as at least part of the data, the data stored on the at least one of the one or more non-transitory computer storage mediums, and wherein the at least one determined construction configuration is modified at least once at least partly as a result of the detecting of the one or more game-related inputs.

35. The additive manufacturing system of claim 20, wherein at least a majority of the completed three-dimensional object consists of one inseparable piece constructed in two or more successive portions, wherein the one or more game-related portions are further defined as two or more game-related portions, and wherein the two or more game-related portions comprise at least two of the two or more successive portions.

36. The additive manufacturing system of claim 20, wherein the one or more electronic games are configured to be played, at least in part, through the additive manufacturing system, with at least one electronic game operation performed by at least one of the one or more computer processors leading the user to respond, through at least one of the one or more input interfaces, to at least one knowledge question, wherein a correct answering by the user of a predetermined combination of the at least one knowledge question is, at least in part, configured to cause the at least one determined construction configuration through the process described in claim 20.

37. The additive manufacturing system of claim 20, with the additive manufacturing system further configured to utilize at least one communications network to operate in conjunction with at least one other computerized system, the at least one other computerized system comprised of one or more other computer processors, one or more other non-transitory computer storage mediums, and one or more knowledge-question-related interfaces configured to process input-output signals, the at least one other computerized system configured to enable the user to play at least one of the one or more electronic games by interacting with at least one of the one or more knowledge-question-related interfaces, this interacting by the user communicated to and from at least one of the one or more other computer processors, with at least one of the one or more other computer processors further configured to retrieve knowledge-question-related data from at least one of the one or more other non-transitory computer storage mediums, with the playing of the at least one of the one or more electronic games by the user on the at least one other computerized system communicated to the additive manufacturing system through the at least one communications network, wherein the at least one of the one or more electronic games is configured to enable the user, through at least one of the one or more knowledge-question-related interfaces, to respond to at least one knowledge question, and wherein a correct answering by the user of a predetermined combination of the at least one knowledge question is, at least in part, configured to be communicated to the additive manufacturing system through the at least one communications network, thereby at least in part causing the one or more predetermined game task results described in claim 20.

38. A method for a user to manufacture a three-dimensional object at least in part as entertainment, the three-dimensional object constructed through an additive manufacturing system, the additive manufacturing system comprised of a three-dimensional printer, one or more input interfaces, a non-transitory computer storage medium, and a computer processor, the additive manufacturing system configured to operate in conjunction with one or more game-related events, the method comprising:

(a) detecting, by at least one of the one or more input interfaces, one or more game-related inputs caused, at least in part, by one or more predetermined game task results being attained by the user in the one or more game-related events; and (b) performing, by the computer processor, at least one game-related operation in response to the detecting of the one or more game-related inputs, the at least one game-related operation retrieving data from the non-transitory computer storage medium, the data including at least one determined construction configuration used to build one or more game-related portions of the three-dimensional object, the at least one game-related operation implementing the three-dimensional printer to use one or more additive manufacturing materials to build the one or more game-related portions of the three-dimensional object using the at least one determined construction configuration;

(c) wherein the finished three-dimensional object is comprised of the one or more game-related portions, and wherein the building of the one or more game-related portions of the three-dimensional object through the at least one game-related operation includes using the at least one determined construction configuration due, at least in part, to the attaining by the user of the one or more predetermined game task results.

39. The method of claim 38, wherein the one or more game-related portions described in claim 38 are built using the at least one determined construction configuration instead of at least one alternative construction configuration due, at least in part, to the attaining by the user of the one or more predetermined game task results instead of one or more alternative game task results, wherein the one or more alternative game task results are configured to lead to the at least one alternative construction configuration, wherein the at least one alternative construction configuration is configured to lead to a construction of an alternatively-configured three-dimensional object, and wherein the three-dimensional object is configured to differ in design from the alternatively-configured three-dimensional object.

40. The method of claim 38, wherein the one or more game-related portions described in claim 38 are built using the at least one determined construction configuration instead of at least one alternative construction configuration due, at least in part, to the attaining by the user of the one or more predetermined game task results instead of one or more alternative game task results, wherein the one or more alternative game task results are configured to lead to the at least one alternative construction configuration, wherein the at least one alternative construction configuration is configured to lead to a construction of an alternatively-configured three-dimensional object, and wherein the three-dimensional object differs from the alternatively-configured three-dimensional object in at least one of the following ways that include the completed three-dimensional object has a different number of distinct portions than the completed alternatively-configured three-dimensional object, the three-dimensional object has a different number of distinct portions constructed in a single build stage compared to the alternatively-configured three-dimensional object, and/or the three-dimensional object has a different number of build stages compared to the alternatively-configured three-dimensional object.

41. The method of claim 38, wherein the additive manufacturing system is further configured to be part of at least one computerized system that includes one or more time-related input interfaces, the at least one computerized system configured to calculate time, and further comprising configuring the one or more predetermined game task results to be attained, at least in part, as a result of a selecting by the user, through at least one of the one or more time-related input interfaces, of at least one determined time period to construct at least part of the three-dimensional object, the at least one determined time period calculated through the at least one computerized system, the at least one determined time period selected instead of at least one alternative time period, the at least one determined time period selected, at least in part, for entertainment-related purposes, the at least one determined time period selected as part of the one or more game-related events, the at least one alternative time period linked to using at least one alternative construction configuration, with the selecting of the at least one determined time period, at least in part, directing the additive manufacturing system to use the at least one determined construction configuration, instead of the at least one alternative construction configuration, to build the one or more game-related portions of the three-dimensional object as described in claim 38.

42. The method of claim 38, wherein the additive manufacturing system is further configured to be part of at least one computerized system that includes one or more time-related input interfaces, the at least one computerized system configured to calculate time, and further comprising configuring the one or more predetermined game task results to be attained, at least in part, as a result of at least a partial arranging of construction by the user of the three-dimensional object during at least one predetermined time period, the at least partial arranging of construction occurring through at least one of the one or more time-related input interfaces, the at least one determined time period calculated through the at least one computerized system, the at least one determined time period selected instead of at least one alternative time period, the at least one determined time period selected, at least in part, for entertainment-related purposes, the at least one determined time period selected as part of the one or more game-related events, the at least one alternative time period linked to using at least one alternative construction configuration, with the selecting of the at least one determined time period, at least in part, directing the additive manufacturing system to use the at least one determined construction configuration, instead of the at least one alternative construction configuration, to build the one or more game-related portions of the three-dimensional object as described in claim 38.

43. The method of claim 38, wherein the three-dimensional object is comprised of a plurality of distinct portions, wherein the one or more game-related portions are further defined as three or more game-related portions, wherein the three or more game-related portions comprise at least three of the plurality of distinct portions, wherein constructing the plurality of distinct portions includes constructing one or more current distinct portions, one or more next successive distinct portions, and one or more later successive distinct portions, and further comprising configuring at least one of the constructed one or more current distinct portions to be unable to join with at least one of the constructed one or more next successive distinct portions, with the at least one of the constructed one or more current distinct portions further configured to be able to join with at least one of the constructed one or more later successive distinct portions, this arrangement for assembling the plurality of distinct portions of the three-dimensional object configured to create an enhanced puzzle challenge for the user.

44. The method of claim 38, wherein the three-dimensional object is comprised of a plurality of distinct portions, wherein the one or more game-related portions comprise at least two of the plurality of distinct portions, wherein the one or more predetermined game task results are further defined as a plurality of predetermined game task results, wherein the additive manufacturing system further includes a plurality of three-dimensional printers, the plurality of three-dimensional printers collectively operating at a plurality of locations, and further comprising constructing at least one distinct portion of the three-dimensional object on at least one three-dimensional printer in a first location following an attaining by the user of at least one of the plurality of predetermined game task results, with at least one other distinct portion of the three-dimensional object constructed on at least one different three-dimensional printer in at least one different location following an attaining by the user of at least one other of the plurality of predetermined game task results, with the user tasked with traveling from the first location to the at least one different location to obtain the plurality of distinct portions comprising the three-dimensional object, and with the user tasked with assembling the plurality of distinct portions obtained from the plurality of locations as an enhanced puzzle challenge.

45. The method of claim 38, wherein the three-dimensional object is comprised of a plurality of distinct portions, wherein the one or more game-related portions are further defined as two or more game-related portions, wherein the two or more game-related portions comprise at least two of the plurality of distinct portions, and further comprising supplementing the plurality of distinct portions with a plurality of accompanying distinct portions, with the plurality of accompanying distinct portions being components of at least one other three-dimensional object, with the plurality of accompanying distinct portions being constructed through the additive manufacturing system through at least one accompanying operation, the at least one accompanying operation performed by the computer processor, the at least one accompanying operation including a retrieval of accompanying data from the non-transitory computer storage medium, the at least one accompanying operation implementing the three-dimensional printer to use the accompanying data, and to use at least one accompanying additive manufacturing material, to build the plurality of accompanying distinct portions, wherein at least one of the plurality of accompanying distinct portions is constructed by the additive manufacturing system after the three-dimensional object commences construction and before the three-dimensional object completes construction, and wherein the user is tasked with joining the plurality of distinct portions and the plurality of accompanying distinct portions to their respective objects for correct assembly as an enhanced puzzle challenge.

46. The method of claim 38, wherein the three-dimensional object is comprised of a plurality of inseparable portions, wherein the one or more game-related portions are further defined as two or more game-related portions, wherein the two or more game-related portions include two or more of the plurality of inseparable portions, and wherein the at least one game-related operation therefore leads to constructing at least two of the plurality of inseparable portions.

47. The method of claim 38, wherein the additive manufacturing system configured to construct the three-dimensional object further comprises at least one of the following group consisting of multiple three-dimensional printers, multiple non-transitory computer storage mediums, and/or multiple computer processors.

48. The method of claim 38, wherein the three-dimensional object is comprised of a plurality of distinct portions, wherein the one or more game-related portions are further defined as two or more game-related portions, wherein the two or more game-related portions include two or more distinct game-related portions, and further comprising configuring at least one of the one or more input interfaces to detect at least one partial assembly by the user, in at least one predetermined manner, of at least two of the constructed two or more distinct game-related portions, the detecting of the at least one partial assembly in the at least one predetermined manner, at least in part, causing a performing by the computer processor of at least one next game-related operation, the at least one next game-related operation retrieving a next set of data from the non-transitory computer storage medium, the next set of data including at least one next determined construction configuration used to guide a building of one or more next distinct game-related portions of the three-dimensional object, the at least one next game-related operation implementing the three-dimensional printer to use at least one next additive manufacturing material to build the one or more next distinct game-related portions of the three-dimensional object as guided by the at least one next determined construction configuration, wherein the three-dimensional object, assembled by the user from the plurality of distinct portions, is comprised of the two or more distinct game-related portions and the one or more next distinct game-related portions.

49. The method of claim 38, wherein the additive manufacturing system is further comprised of one or more computer processors and one or more non-transitory computer storage mediums, wherein the three-dimensional object is constructed in conjunction with at least one electronic game played, at least in part, through the additive manufacturing system, wherein the one or more game-related portions are further defined as two or more distinct game-related portions, and further comprising configuring at least one of the one or more input interfaces to detect at least one partial assembly by the user, in at least one predetermined manner, of at least two of the constructed two or more distinct game-related portions, the detecting of the at least one partial assembly in the at least one predetermined manner, at least in part, causing a performing, by at least one of the one or more computer processors, of at least one next game-related operation, the at least one next game-related operation retrieving a next set of data from at least one of the one or more non-transitory computer storage mediums, with the next set of data implemented to change at least one aspect of the electronic game played, at least in part, through the additive manufacturing system.

50. The method of claim 38, wherein the three-dimensional object is comprised of a plurality of distinct portions, wherein the one or more game-related portions are further defined as two or more game-related portions, wherein the two or more game-related portions include two or more distinct game-related portions, and further comprising configuring at least one of the one or more input interfaces to detect at least one partial assembly by the user of at least two of the constructed two or more distinct game-related portions, the at least one partial assembly occurring in at least one determined assembled configuration instead of in at least one alternative assembled configuration, the detecting of the at least one partial assembly in the at least one determined assembled configuration, at least in part, causing a performing by the computer processor of at least one next game-related operation, the at least one next game-related operation retrieving a next set of data from the non-transitory computer storage medium, the next set of data including at least one next determined construction configuration used to build one or more next distinct game-related portions of the three-dimensional object, the at least one next determined construction configuration used instead of at least one next alternative construction configuration as a result of the attaining of the at least one determined assembled configuration instead of the at least one alternative assembled configuration, the at least one next game-related operation implementing the three-dimensional printer to use at least one next additive manufacturing material, and the at least one next determined construction configuration, to build the one or more next distinct game-related portions of the three-dimensional object, wherein the three-dimensional object, assembled by the user from the plurality of distinct portions, is comprised of the two or more distinct game-related portions and the one or more distinct next game-related portions.

51. The method of claim 38, wherein the three-dimensional object is further comprised of two or more distinct prior portions, the two or more distinct prior portions constructed prior to the at least one game-related operation described in claim 38, and further comprising configuring the one or more predetermined game task results to be attained, at least in part, by a detecting, through at least one of the one or more input interfaces, of at least one partial assembly by the user, in at least one predetermined manner, of at least two of the constructed two or more distinct prior portions, with the construction of the two or more distinct prior portions being caused by a performing by the computer processor of at least one prior operation, the at least one prior operation retrieving prior-portion-related data from the non-transitory computer storage medium, the prior-portion-related data including at least one prior determined construction configuration used to guide the building of the two or more distinct prior portions, the at least one prior operation implementing the three-dimensional printer to use at least one prior-portion-related additive manufacturing material to build the two or more distinct prior portions of the three-dimensional object as guided by the at least one prior determined construction configuration.

52. The method of claim 38, wherein the three-dimensional object is further comprised of a plurality of distinct prior portions, the plurality of distinct prior portions constructed prior to the at least one game-related operation described in claim 38, and further comprising configuring the one or more predetermined game task results to be attained, at least in part, by a detecting, through at least one of the one or more input interfaces, of at least one partial assembly by the user of at least two of the constructed plurality of distinct prior portions, the at least one partial assembly occurring in at least one predetermined manner instead of in at least one alternative manner, with the construction of the plurality of distinct prior portions being caused by a performing by the computer processor of at least one prior operation, the at least one prior operation retrieving prior-portion-related data from the non-transitory computer storage medium, the prior-portion-related data including at least one prior determined construction configuration used to guide the building of the plurality of distinct prior portions of the three-dimensional object, the at least one prior determined construction configuration used instead of at least one alternative prior construction configuration as a result of the at least one partial assembly occurring in the at least one predetermined manner instead of in the at least one alternative manner, the at least one prior operation implementing the three-dimensional printer to use at least one prior-portion-related additive manufacturing material to build the plurality of distinct prior portions of the three-dimensional object as guided by the at least one prior determined construction configuration, wherein, as a result of the detecting of the at least one partial assembly occurring in the at least one predetermined manner instead of in the at least one alternative manner, the at least one game-related operation is configured to cause at least one of the following results: a determined number of the one or more game-related portions of the three-dimensional object is constructed instead of an alternative number, at least one determined design is chosen instead of at least one alternative design for at least one of the one or more game-related portions, at least one determined function is chosen instead of at least one alternative function for at least one of the one or more game-related portions, and/or at least one determined complexity is chosen instead of at least one alternative complexity for at least one of the one or more game-related portions.

53. The method of claim 38, wherein the additive manufacturing system is further arranged to be part of at least one computerized system configured to calculate time, wherein the three-dimensional object is further comprised of a plurality of distinct prior portions, the plurality of distinct prior portions constructed prior to the at least one game-related operation described in claim 38, and further comprising configuring the one or more predetermined game task results to be attained, at least in part, by a detecting, through at least one of the one or more input interfaces in conjunction with the at least one computerized system configured to calculate time, of at least one partial assembly by the user of at least two of the constructed plurality of distinct prior portions, the at least one partial assembly detected to occur in at least one predetermined time-period instead of in at least one alternative time-period, with the construction of the plurality of distinct prior portions being caused by a performing by the computer processor of at least one prior operation, the at least one prior operation retrieving prior-portion-related data from the non-transitory computer storage medium, the prior-portion-related data including at least one prior determined construction configuration used to guide the building of the plurality of distinct prior portions of the three-dimensional object, the at least one prior operation implementing the three-dimensional printer to use at least one prior-portion-related additive manufacturing material to build the plurality of distinct prior portions of the three-dimensional object as guided by the at least one prior determined construction configuration, wherein, as a result of the detecting of the at least one partial assembly in the at least one predetermined time-period instead of in the at least one alternative time period, the at least one game-related operation is configured to cause at least one of the following results: a determined number of the one or more game-related portions of the three-dimensional object is constructed instead of an alternative number, at least one determined design is chosen instead of at least one alternative design for at least one of the one or more game-related portions, at least one determined function is chosen instead of at least one alternative function for at least one of the one or more game-related portions, at least one determined complexity is chosen instead of at least one alternative complexity for at least one of the one or more game-related portions, and/or at least one determined time is chosen to complete construction of at least one of the one or more game-related portions instead of at least one alternative time.

54. The method of claim 38, wherein the three-dimensional object is further comprised of a plurality of distinct prior portions, the plurality of distinct prior portions constructed prior to the at least one game-related operation described in claim 38, and further comprising configuring the one or more predetermined game task results to be attained, at least in part, by a detecting, through at least one of the one or more input interfaces, of at least one partial assembly by the user of at least two of the constructed plurality of distinct prior portions, the at least one partial assembly occurring in at least one predetermined manner instead of in at least one alternative manner, with the construction of the plurality of distinct prior portions being caused by a performing by the computer processor of at least one prior operation, the at least one prior operation retrieving prior-portion-related data from the non-transitory computer storage medium, the prior-portion-related data including at least one prior determined construction configuration used to guide the building of the plurality of distinct prior portions of the three-dimensional object, the at least one prior operation implementing the three-dimensional printer to use at least one prior-portion-related additive manufacturing material to build the plurality of distinct prior portions of the three-dimensional object as guided by the at least one prior determined construction configuration, wherein the at least one partial assembly by the user, in the at least one predetermined manner instead of in the at least one alternative manner, of the at least two of the constructed plurality of distinct prior portions, causes at least one predetermined wager outcome instead of at least one alternative wager outcome, and wherein the at least one predetermined wager outcome is revealed at least in part through at least one of the constructed one or more game-related portions of the three-dimensional object.

55. The method of claim 38, wherein the three-dimensional object is further configured to include one or more additional portions, the one or more additional portions built through at least one additional operation performed by the computer processor, the at least one additional operation activated in response to a detecting, by at least one of the one or more input interfaces, of one or more additional inputs, the at least one additional operation retrieving additional data from the non-transitory computer storage medium, the additional data including at least one additional determined construction configuration used to guide the building of the one or more additional portions of the three-dimensional object, the at least one additional operation implementing the three-dimensional printer to use one or more additional additive manufacturing materials to build the one or more additional portions of the three-dimensional object as guided by the at least one additional determined construction configuration, wherein at least one of the one or more additional portions of the three-dimensional object is built before or after construction of at least one of the one or more game-related portions described in claim 38.

56. The method of claim 38, wherein at least one constructed game-related portion of the three-dimensional object is further configured to divulge information not yet revealed to the user in the one or more game-related events.

57. An additive manufacturing system enabling a user to manufacture a three-dimensional object at least in part as entertainment, the additive manufacturing system comprised of one or more three-dimensional printers, one or more input interfaces, one or more non-transitory computer storage mediums, and one or more computer processors, the additive manufacturing system configured to operate in conjunction with one or more game-related events, the additive manufacturing system configured to perform a process as follows:

(a) detecting, by at least one of the one or more input interfaces, one or more game-related inputs caused, at least in part, by one or more predetermined game task results being attained by the user in the one or more game-related events; and (b) performing, by at least one of the one or more computer processors, at least one game-related operation in response to the detecting of the one or more game-related inputs, the at least one game-related operation retrieving data from at least one of the one or more non-transitory computer storage mediums, the data including at least one determined construction configuration used to build one or more game-related portions of the three-dimensional object, the at least one game-related operation implementing at least one of the one or more three-dimensional printers to use one or more additive manufacturing materials to build the one or more game-related portions of the three-dimensional object using the at least one determined construction configuration;

(c) wherein the finished three-dimensional object is comprised of the one or more game-related portions, and wherein the building of the one or more game-related portions of the three-dimensional object through the at least one game-related operation includes using the at least one determined construction configuration due, at least in part, to the attaining by the user of the one or more predetermined game task results.

58. The additive manufacturing system of claim 57, wherein the one or more game-related portions described in claim 57 are built using the at least one determined construction configuration instead of at least one alternative construction configuration due, at least in part, to the attaining by the user of the one or more predetermined game task results instead of one or more alternative game task results, wherein the one or more alternative game task results are configured to lead to the at least one alternative construction configuration, wherein the at least one alternative construction configuration is configured to lead to a construction of an alternatively-configured three-dimensional object, and wherein the three-dimensional object is configured to differ in design from the alternatively-configured three-dimensional object.

59. The additive manufacturing system of claim 57, wherein the one or more game-related portions described in claim 57 are built using the at least one determined construction configuration instead of at least one alternative construction configuration due, at least in part, to the attaining by the user of the one or more predetermined game task results instead of one or more alternative game task results, wherein the one or more alternative game task results are configured to lead to the at least one alternative construction configuration, wherein the at least one alternative construction configuration is configured to lead to a construction of an alternatively-configured three-dimensional object, and wherein the three-dimensional object differs from the alternatively-configured three-dimensional object in at least one of the following ways that include the completed three-dimensional object has a different number of distinct portions than the completed alternatively-configured three-dimensional object, the three-dimensional object has a different number of distinct portions constructed in a single build stage compared to the alternatively-configured three-dimensional object, and/or the three-dimensional object has a different number of build stages compared to the alternatively-configured three-dimensional object.

60. The additive manufacturing system of claim 57, wherein the additive manufacturing system is further configured to be part of at least one computerized system that includes one or more time-related input interfaces, the at least one computerized system configured to calculate time, and further comprising configuring the one or more predetermined game task results to be attained, at least in part, as a result of a selecting by the user, through at least one of the one or more time-related input interfaces, of at least one determined time period to construct at least part of the three-dimensional object, the at least one determined time period calculated through the at least one computerized system, the at least one determined time period selected instead of at least one alternative time period, the at least one determined time period selected, at least in part, for entertainment-related purposes, the at least one determined time period selected as part of the one or more game-related events, the at least one alternative time period linked to using at least one alternative construction configuration, with the selecting of the at least one determined time period, at least in part, directing the additive manufacturing system to use the at least one determined construction configuration, instead of the at least one alternative construction configuration, to build the one or more game-related portions of the three-dimensional object as described in claim 57.

61. The additive manufacturing system of claim 57, wherein the additive manufacturing system is further configured to be part of at least one computerized system that includes one or more time-related input interfaces, the at least one computerized system configured to calculate time, and further comprising configuring the one or more predetermined game task results to be attained, at least in part, as a result of at least a partial arranging of construction by the user of the three-dimensional object during at least one predetermined time period, the at least partial arranging of construction occurring through at least one of the one or more time-related input interfaces, the at least one determined time period calculated through the at least one computerized system, the at least one determined time period selected instead of at least one alternative time period, the at least one determined time period selected, at least in part, for entertainment-related purposes, the at least one determined time period selected as part of the one or more game-related events, the at least one alternative time period linked to using at least one alternative construction configuration, with the selecting of the at least one determined time period, at least in part, directing the additive manufacturing system to use the at least one determined construction configuration, instead of the at least one alternative construction configuration, to build the one or more game-related portions of the three-dimensional object as described in claim 57.

62. The additive manufacturing system of claim 57, wherein the three-dimensional object is comprised of a plurality of distinct portions, wherein the one or more game-related portions are further defined as three or more game-related portions, wherein the three or more game-related portions comprise at least three of the plurality of distinct portions, wherein constructing the plurality of distinct portions includes constructing one or more current distinct portions, one or more next successive distinct portions, and one or more later successive distinct portions, and further comprising configuring at least one of the constructed one or more current distinct portions to be unable to join with at least one of the constructed one or more next successive distinct portions, with the at least one of the constructed one or more current distinct portions further configured to be able to join with at least one of the constructed one or more later successive distinct portions, this arrangement for assembling the plurality of distinct portions of the three-dimensional object configured to create an enhanced puzzle challenge for the user.

63. The additive manufacturing system of claim 57, wherein the three-dimensional object is comprised of a plurality of distinct portions, wherein the one or more game-related portions are further defined as two or more game-related portions, wherein the two or more game-related portions comprise at least two of the plurality of distinct portions, wherein the one or more predetermined game task results are further defined as a plurality of predetermined game task results, wherein the one or more three-dimensional printers are further defined as a plurality of three-dimensional printers, the plurality of three-dimensional printers collectively operating at a plurality of locations, and further comprising constructing at least one distinct portion of the three-dimensional object on at least one three-dimensional printer in a first location following an attaining by the user of at least one of the plurality of predetermined game task results, with at least one other distinct portion of the three-dimensional object constructed on at least one different three-dimensional printer in at least one different location following an attaining by the user of at least one other of the plurality of predetermined game task results, with the user tasked with traveling from the first location to the at least one different location to obtain the plurality of distinct portions comprising the three-dimensional object, and with the user tasked with assembling the plurality of distinct portions obtained from the plurality of locations as an enhanced puzzle challenge.

64. The additive manufacturing system of claim 57, wherein the three-dimensional object is comprised of a plurality of distinct portions, wherein the one or more game-related portions are further defined as two or more game-related portions, wherein the two or more game-related portions comprise at least two of the plurality of distinct portions, and further comprising supplementing the plurality of distinct portions with a plurality of accompanying distinct portions, with the plurality of accompanying distinct portions being components of at least one other three-dimensional object, with the plurality of accompanying distinct portions being constructed through the additive manufacturing system through at least one accompanying operation, the at least one accompanying operation performed by at least one of the one or more computer processors, the at least one accompanying operation including a retrieval of accompanying data from at least one of the one or more non-transitory computer storage mediums, the at least one accompanying operation implementing at least one of the one or more three-dimensional printers to use the accompanying data, and to use at least one accompanying additive manufacturing material, to build the plurality of accompanying distinct portions, wherein at least one of the plurality of accompanying distinct portions is constructed by the additive manufacturing system after the three-dimensional object commences construction and before the three-dimensional object completes construction, and wherein the user is tasked with joining the plurality of distinct portions and the plurality of accompanying distinct portions to their respective objects for correct assembly as an enhanced puzzle challenge.

65. The additive manufacturing system of claim 57, wherein the three-dimensional object is comprised of a plurality of inseparable portions, wherein the one or more game-related portions are further defined as two or more game-related portions, wherein the two or more game-related portions include two or more of the plurality of inseparable portions, and wherein the at least one game-related operation therefore leads to constructing at least two of the plurality of inseparable portions.

66. The additive manufacturing system of claim 57, wherein the three-dimensional object is comprised of a plurality of distinct portions, wherein the one or more game-related portions are further defined as two or more game-related portions, wherein the two or more game-related portions include two or more distinct game-related portions, and further comprising configuring at least one of the one or more input interfaces to detect at least one partial assembly by the user, in at least one predetermined manner, of at least two of the constructed two or more distinct game-related portions, the detecting of the at least one partial assembly in the at least one predetermined manner, at least in part, causing a performing by at least one of the one or more computer processors of at least one next game-related operation, the at least one next game-related operation retrieving a next set of data from at least one of the one or more non-transitory computer storage mediums, the next set of data including at least one next determined construction configuration used to guide a building of one or more next distinct game-related portions of the three-dimensional object, the at least one next game-related operation implementing at least one of the one or more three-dimensional printers to use at least one next additive manufacturing material to build the one or more next distinct game-related portions of the three-dimensional object as guided by the at least one next determined construction configuration, wherein the three-dimensional object, assembled by the user from the plurality of distinct portions, is comprised of the two or more distinct game-related portions and the one or more next distinct game-related portions.

67. The additive manufacturing system of claim 57, wherein the three-dimensional object is constructed in conjunction with at least one electronic game played, at least in part, through the additive manufacturing system, wherein the one or more game-related portions are further defined as two or more distinct game-related portions, and further comprising configuring at least one of the one or more input interfaces to detect at least one partial assembly by the user, in at least one predetermined manner, of at least two of the constructed two or more distinct game-related portions, the detecting of the at least one partial assembly in the at least one predetermined manner, at least in part, causing a performing, by at least one of the one or more computer processors, of at least one next game-related operation, the at least one next game-related operation retrieving a next set of data from at least one of the one or more non-transitory computer storage mediums, with the next set of data implemented to change at least one aspect of the electronic game played, at least in part, through the additive manufacturing system.

68. The additive manufacturing system of claim 57, wherein the three-dimensional object is comprised of a plurality of distinct portions, wherein the one or more game-related portions are further defined as two or more game-related portions, wherein the two or more game-related portions include two or more distinct game-related portions, and further comprising configuring at least one of the one or more input interlaces to detect at least one partial assembly by the user of at least two of the constructed two or more distinct game-related portions, the at least one partial assembly occurring in at least one determined assembled configuration instead of in at least one alternative assembled configuration, the detecting of the at least one partial assembly in the at least one determined assembled configuration, at least in part, causing a performing, by at least one of the one or more computer processors, of at least one next game-related operation, the at least one next game-related operation retrieving a next set of data from at least one of the one or more non-transitory computer storage mediums, the next set of data including at least one next determined construction configuration used to build one or more next distinct game-related portions of the three-dimensional object, the at least one next determined construction configuration used instead of at least one next alternative construction configuration as a result of the attaining of the at least one determined assembled configuration instead of the at least one alternative assembled configuration, the at least one next game-related operation implementing at least one of the one or more three-dimensional printers to use at least one next additive manufacturing material, and the at least one next determined construction configuration, to build the one or more next distinct game-related portions of the three-dimensional object, wherein the three-dimensional object, assembled by the user from the plurality of distinct portions, is comprised of the two or more distinct game-related portions and the one or more next distinct game-related portions.

69. The additive manufacturing system of claim 57, wherein the three-dimensional object is further comprised of two or more distinct prior portions, the two or more distinct prior portions constructed prior to the at least one game-related operation described in claim 57, and further comprising configuring the one or more predetermined game task results to be attained, at least in part, by a detecting, through at least one of the one or more input interfaces, of at least one partial assembly by the user, in at least one predetermined manner, of at least two of the constructed two or more distinct prior portions, with the construction of the two or more distinct prior portions being caused by a performing, by at least one of the one or more computer processors, of at least one prior operation, the at least one prior operation retrieving prior-portion-related data from at least one of the one or more non-transitory computer storage mediums, the prior-portion-related data including at least one prior determined construction configuration used to guide the building of the two or more distinct prior portions, the at least one prior operation implementing at least one of the one or more three-dimensional printers to use at least one prior-portion-related additive manufacturing material to build the two or more distinct prior portions of the three-dimensional object as guided by the at least one prior determined construction configuration.

70. The additive manufacturing system of claim 57, wherein the three-dimensional object is further comprised of a plurality of distinct prior portions, the plurality of distinct prior portions constructed prior to the at least one game-related operation described in claim 57, and further comprising configuring the one or more predetermined game task results to be attained, at least in part, by a detecting, through at least one of the one or more input interfaces, of at least one partial assembly by the user of at least two of the constructed plurality of distinct prior portions, the at least one partial assembly occurring in at least one predetermined manner instead of in at least one alternative manner, with the construction of the plurality of distinct prior portions being caused by a performing, by at least one of the one or more computer processors, of at least one prior operation, the at least one prior operation retrieving prior-portion-related data from at least one of the one or more non-transitory computer storage mediums, the prior-portion-related data including at least one prior determined construction configuration used to guide the building of the plurality of distinct prior portions of the three-dimensional object, the at least one prior determined construction configuration used instead of at least one alternative prior construction configuration as a result of the at least one partial assembly occurring in the at least one predetermined manner instead of in the at least one alternative manner, the at least one prior operation implementing at least one of the one or more three-dimensional printers to use at least one prior-portion-related additive manufacturing material to build the plurality of distinct prior portions of the three-dimensional object as guided by the at least one prior determined construction configuration, wherein, as a result of the detecting of the at least one partial assembly occurring in the at least one predetermined manner instead of in the at least one alternative manner, the at least one game-related operation is configured to cause at least one of the following results: a determined number of the one or more game-related portions of the three-dimensional object is constructed instead of an alternative number, at least one determined design is chosen instead of at least one alternative design for at least one of the one or more game-related portions, at least one determined function is chosen instead of at least one alternative function for at least one of the one or more game-related portions, and/or at least one determined complexity is chosen instead of at least one alternative complexity for at least one of the one or more game-related portions.

71. The additive manufacturing system of claim 57, wherein the additive manufacturing system is further arranged to be part of at least one computerized system configured to calculate time, wherein the three-dimensional object is further comprised of a plurality of distinct prior portions, the plurality of distinct prior portions constructed prior to the at least one game-related operation described in claim 57, and further comprising configuring the one or more predetermined game task results to be attained, at least in part, by a detecting, through at least one of the one or more input interfaces in conjunction with the at least one computerized system configured to calculate time, of at least one partial assembly by the user of at least two of the constructed plurality of distinct prior portions, the at least one partial assembly detected to occur in at least one predetermined time-period instead of in at least one alternative time-period, with the construction of the plurality of distinct prior portions being caused by a performing, by at least one of the one or more computer processors, of at least one prior operation, the at least one prior operation retrieving prior-portion-related data from at least one of the one or more non-transitory computer storage mediums, the prior-portion-related data including at least one prior determined construction configuration used to guide the building of the plurality of distinct prior portions of the three-dimensional object, the at least one prior operation implementing at least one of the one or more three-dimensional printers to use at least one prior-portion-related additive manufacturing material to build the plurality of distinct prior portions of the three-dimensional object using the at least one prior determined construction configuration, wherein, as a result of the detecting of the at least one partial assembly in the at least one predetermined time-period instead of in the at least one alternative time period, the at least one game-related operation is configured to cause at least one of the following results: a determined number of the one or more game-related portions of the three-dimensional object is constructed instead of an alternative number, at least one determined design is chosen instead of at least one alternative design for at least one of the one or more game-related portions, at least one determined function is chosen instead of at least one alternative function for at least one of the one or more game-related portions, at least one determined complexity is chosen instead of at least one alternative complexity for at least one of the one or more game-related portions, and/or at least one determined time is chosen to complete construction of at least one of the one or more game-related portions instead of at least one alternative time.

72. The additive manufacturing system of claim 57, wherein the three-dimensional object is further comprised of a plurality of distinct prior portions, the plurality of distinct prior portions constructed prior to the at least one game-related operation described in claim 57, and further comprising configuring the one or more predetermined game task results to be attained, at least in part, by a detecting, through at least one of the one or more input interfaces, of at least one partial assembly by the user of at least two of the constructed plurality of distinct prior portions, the at least one partial assembly occurring in at least one predetermined manner instead of in at least one alternative manner, with the construction of the plurality of distinct prior portions being caused by a performing, by at least one of the one or more computer processors, of at least one prior operation, the at least one prior operation retrieving prior-portion-related data from at least one of the one or more non-transitory computer storage mediums, the prior-portion-related data including at least one prior determined construction configuration used to guide the building of the plurality of distinct prior portions of the three-dimensional object, the at least one prior operation implementing at least one of the one or more three-dimensional printers to use at least one prior-portion-related additive manufacturing material to build the plurality of distinct prior portions of the three-dimensional object as guided by the at least one prior determined construction configuration, wherein the at least one partial assembly by the user, in the at least one predetermined manner instead of in the at least one alternative manner, of the at least two of the constructed plurality of distinct prior portions, causes at least one predetermined wager outcome instead of at least one alternative wager outcome, and wherein the at least one predetermined wager outcome is revealed at least in part through at least one of the constructed one or more game-related portions of the three-dimensional object.

73. The additive manufacturing system of claim 57, wherein the three-dimensional object is further configured to include one or more additional portions, the one or more additional portions built through at least one additional operation performed by at least one of the one or more computer processors, the at least one additional operation activated in response to a detecting, by at least one of the one or more input interfaces, of one or more additional inputs, the at least one additional operation retrieving additional data from at least one of the one or more non-transitory computer storage mediums, the additional data including at least one additional determined construction configuration used to guide the building of the one or more additional portions of the three-dimensional object, the at least one additional operation implementing at least one of the one or more three-dimensional printers to use one or more additional additive manufacturing materials to build the one or more additional portions of the three-dimensional object as guided by the at least one additional determined construction configuration, wherein at least one of the one or more additional portions of the three-dimensional object is built before or after construction of at least one of the one or more game-related portions described in claim 57.

74. The additive manufacturing system of claim 57, wherein at least one constructed game-related portion of the three-dimensional object is further configured to divulge information not yet revealed to the user in the one or more game-related events.

* * * * *